(12) United States Patent
Jung et al.

(10) Patent No.: US 9,082,456 B2
(45) Date of Patent: Jul. 14, 2015

(54) SHARED IMAGE DEVICE DESIGNATION

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I LLC, Bellevue, WA (US)

( * ) Notice: Subject to any disclaimer, the term of this patent is extended or adjusted under 35 U.S.C. 154(b) by 2867 days.

(21) Appl. No.: 11/190,516

(22) Filed: Jul. 26, 2005

(65) Prior Publication Data

US 2006/0171695 A1 Aug. 3, 2006

Related U.S. Application Data

(63) Continuation-in-part of application No. 11/048,644, filed on Jan. 31, 2005, now abandoned, and a continuation-in-part of application No. 11/048,629, filed on Feb. 1, 2005, and a continuation-in-part of (Continued)

(51) Int. Cl.
*G11B 27/11* (2006.01)
*G06T 3/40* (2006.01)

(Continued)

(52) U.S. Cl.
CPC .............. *G11B 27/11* (2013.01); *G06T 3/4023* (2013.01); *H04N 1/00005* (2013.01);

(Continued)

(58) Field of Classification Search
CPC .............. H04N 5/225; H04N 5/23203; H04N 4/23232; H04N 5/23235; H04N 5/23293; H04N 7/173; H04N 21/63

USPC .................. 725/105; 348/143, 207.1–207.11, 348/211.99–211.4, 211.14, 207.1–207.99, 348/211.1–211.99
See application file for complete search history.

(56) References Cited

U.S. PATENT DOCUMENTS 4,124,871 A 11/1978 Morrin, II
4,249,218 A 2/1981 Davis et al.
(Continued)

FOREIGN PATENT DOCUMENTS

JP 5064225 3/1993
JP H09-018762 1/1997
(Continued)

OTHER PUBLICATIONS

2Tiff.com; "Introduction to 2TIFF"; pp. 1-3; located at http://www.2tiff.com/help/; bearing a date of 2004; printed on Feb. 16, 2005.
(Continued)

*Primary Examiner* — Lin Ye
*Assistant Examiner* — Marly Camargo

(57) ABSTRACT

In certain aspects, receiving at least one motivating event at least partially at a processing shared image device. At least one designated attribute is transmitted at least partially from the processing shared image device, wherein the at least one designated attribute can be effected at least partially in response to the receiving the at least one motivating event at least partially at the processing shared image device. An obtained shared image is obtained at the processing shared image device that is obtained in accordance with the at least one motivating event, and is obtained at least partially in response to the transmitting the at least one designated attribute. The obtained shared image is processed to derive an at least one processed shared image at least partially at the processing shared image device.

41 Claims, 24 Drawing Sheets

Related U.S. Application Data application No. 11/064,787, filed on Feb. 23, 2005, now abandoned, and a continuation-in-part of application No. 11/069,909, filed on Feb. 28, 2005, now abandoned, and a continuation-in-part of application No. 11/089,530, filed on Mar. 23, 2005, now abandoned, and a continuation-in-part of application No. 11/095,768, filed on Mar. 30, 2005, now abandoned, and a continuation-in-part of application No. 11/115,078, filed on Apr. 26, 2005, now Pat. No. 7,920,169, and a continuation-in-part of application No. 11/122,274, filed on May 4, 2005, now abandoned, and a continuation-in-part of application No. 11/129,045, filed on May 13, 2005, and a continuation-in-part of application No. 11/143,970, filed on Jun. 2, 2005, now Pat. No. 7,876,357, and a continuation-in-part of application No. 11/153,868, filed on Jun. 14, 2005, now Pat. No. 8,902,320, and a continuation-in-part of application No. 11/173,166, filed on Jul. 1, 2005, now abandoned.

(51) Int. Cl.
  *H04N 1/00* (2006.01)
  *H04N 1/40* (2006.01)
  *H04N 5/232* (2006.01)
  *H04N 5/247* (2006.01)
  *H04N 1/42* (2006.01)

(52) U.S. Cl.
  CPC ...... *H04N 1/00127* (2013.01); *H04N 1/00137* (2013.01); *H04N 1/00148* (2013.01); *H04N 1/00161* (2013.01); *H04N 1/00167* (2013.01); *H04N 1/00172* (2013.01); *H04N 1/00183* (2013.01); *H04N 1/00188* (2013.01); *H04N 1/00347* (2013.01); *H04N 1/40* (2013.01); *H04N 1/42* (2013.01); *H04N 5/23232* (2013.01); *H04N 5/23235* (2013.01); *H04N 5/23293* (2013.01); *H04N 5/247* (2013.01); *H04N 1/00132* (2013.01); *H04N 1/00204* (2013.01); *H04N 1/00278* (2013.01); *H04N 2201/001* (2013.01); *H04N 2201/0015* (2013.01); *H04N 2201/0041* (2013.01); *H04N 2201/0043* (2013.01); *H04N 2201/0084* (2013.01); *H04N 2201/33328* (2013.01)

(56) References Cited

U.S. PATENT DOCUMENTS

| | | | |
|---|---|---|---|
| 4,747,143 A | 5/1988 | Kroeger et al. | |
| 5,164,831 A | 11/1992 | Kuchta et al. | |
| 5,341,192 A | 8/1994 | Wally, Jr. et al. | |
| 5,388,197 A | 2/1995 | Rayner | |
| 5,410,343 A | 4/1995 | Coddington et al. | |
| 5,418,565 A | 5/1995 | Smith | |
| 5,444,476 A | 8/1995 | Conway | |
| 5,467,288 A | 11/1995 | Fasciano et al. | |
| 5,477,546 A | 12/1995 | Shibata et al. | |
| 5,546,145 A | 8/1996 | Bernardi et al. | |
| 5,561,883 A | 10/1996 | Landry et al. | |
| 5,588,029 A | 12/1996 | Maturi et al. | |
| 5,612,715 A | 3/1997 | Karaki et al. | |
| 5,629,778 A | 5/1997 | Reuman | |
| 5,633,678 A | 5/1997 | Parulski et al. | |
| 5,655,144 A | 8/1997 | Milne et al. | |
| 5,659,662 A | 8/1997 | Wilcox et al. | |
| 5,675,789 A | 10/1997 | Ishii et al. | |
| 5,689,343 A | 11/1997 | Loce et al. | |
| 5,689,442 A | 11/1997 | Swanson et al. | |
| 5,701,163 A | 12/1997 | Richards et al. | |
| 5,715,487 A | 2/1998 | McIntyre et al. | |
| 5,738,522 A | 4/1998 | Sussholz et al. | |
| 5,751,338 A | 5/1998 | Ludwig, Jr. | |
| 5,764,800 A | 6/1998 | Yamagata | |
| 5,793,630 A | 8/1998 | Theimer et al. | |
| 5,796,879 A | 8/1998 | Wong et al. | |
| 5,806,005 A | 9/1998 | Hull et al. | |
| 5,809,161 A | 9/1998 | Auty et al. | |
| 5,822,440 A | 10/1998 | Oltman et al. | |
| 5,825,506 A | 10/1998 | Bednar et al. | |
| 5,845,166 A | 12/1998 | Fellegara et al. | |
| 5,867,614 A | 2/1999 | Ito | |
| 5,884,039 A | 3/1999 | Ludwig et al. | |
| 5,889,895 A | 3/1999 | Wong et al. | |
| 5,892,509 A | 4/1999 | Jakobs et al. | |
| 5,917,958 A | 6/1999 | Nunally et al. | |
| 5,917,962 A | 6/1999 | Chen et al. | |
| 5,926,605 A | 7/1999 | Ichimura | |
| 5,949,484 A | 9/1999 | Nakaya et al. | |
| 5,956,081 A | 9/1999 | Katz et al. | |
| 5,959,622 A | 9/1999 | Greer et al. | |
| 5,977,867 A | 11/1999 | Blouin | |
| 5,995,095 A | 11/1999 | Ratakonda | |
| 5,999,214 A | 12/1999 | Inagaki | |
| 6,011,901 A | 1/2000 | Kirsten | |
| 6,021,403 A | 2/2000 | Horvitz et al. | |
| 6,028,585 A | 2/2000 | Ishii et al. | |
| 6,034,786 A | 3/2000 | Kwon | |
| 6,035,323 A | 3/2000 | Narayen et al. | |
| 6,046,762 A | 4/2000 | Sonesh et al. | |
| 6,092,670 A | 7/2000 | Marriott | |
| 6,107,918 A | 8/2000 | Klein et al. | |
| 6,115,341 A | 9/2000 | Hirai | |
| 6,122,003 A | 9/2000 | Anderson | |
| 6,122,411 A | 9/2000 | Shen et al. | |
| 6,128,446 A | 10/2000 | Schrock et al. | |
| 6,134,345 A | 10/2000 | Berman et al. | |
| 6,157,406 A | 12/2000 | Iura et al. | |
| 6,157,935 A | 12/2000 | Tran et al. | |
| 6,167,350 A | 12/2000 | Hiramatsu et al. | |
| 6,167,469 A | 12/2000 | Safai et al. | |
| 6,188,383 B1 | 2/2001 | Tamura | |
| 6,188,431 B1 | 2/2001 | Oie | |
| 6,198,526 B1 | 3/2001 | Ohtsuka | |
| 6,204,877 B1 | 3/2001 | Kiyokawa | |
| 6,222,465 B1 | 4/2001 | Kumar et al. | |
| 6,226,672 B1 | 5/2001 | DeMartin et al. | |
| 6,229,565 B1 | 5/2001 | Bobry | |
| 6,229,850 B1 | 5/2001 | Linzer et al. | |
| 6,275,260 B1 | 8/2001 | Anderson | |
| 6,285,794 B1 | 9/2001 | Georgiev et al. | |
| 6,332,139 B1 | 12/2001 | Kaneko et al. | |
| 6,332,666 B1 | 12/2001 | Ikeda | |
| 6,333,792 B1 | 12/2001 | Kimura | |
| 6,342,887 B1 | 1/2002 | Munroe | |
| 6,351,762 B1 | 2/2002 | Ludwig et al. | |
| 6,356,868 B1 | 3/2002 | Yuschik et al. | |
| 6,359,649 B1 | 3/2002 | Suzuki | |
| 6,366,577 B1 | 4/2002 | Donovan | |
| 6,380,972 B1* | 4/2002 | Suga et al. | 348/211.99 |
| 6,384,862 B1 | 5/2002 | Brusewitz et al. | |
| 6,400,848 B1 | 6/2002 | Gallagher | |
| 6,411,742 B1 | 6/2002 | Peterson | |
| 6,433,818 B1 | 8/2002 | Steinberg et al. | |
| 6,437,797 B1 | 8/2002 | Ota | |
| 6,445,822 B1 | 9/2002 | Crill et al. | |
| 6,446,095 B1 | 9/2002 | Mukai | |
| 6,452,974 B1 | 9/2002 | Menon et al. | |
| 6,453,336 B1* | 9/2002 | Beyda et al. | 709/204 |
| 6,456,339 B1 | 9/2002 | Surati et al. | |
| 6,459,823 B2 | 10/2002 | Altunbasak et al. | |
| 6,466,253 B1 | 10/2002 | Honjoh | |
| 6,466,264 B1 | 10/2002 | Shioji | |
| 6,476,858 B1 | 11/2002 | Ramirez Diaz et al. | |
| 6,493,028 B1 | 12/2002 | Anderson et al. | |
| 6,499,016 B1 | 12/2002 | Anderson | |
| 6,509,931 B1 | 1/2003 | Mizosoe et al. | |
| 6,512,541 B2 | 1/2003 | Dunton et al. | |
| 6,515,704 B1 | 2/2003 | Sato | |

(56) References Cited

U.S. PATENT DOCUMENTS

| | | | |
|---|---|---|---|
| 6,516,154 B1 | 2/2003 | Parulski et al. | |
| 6,519,612 B1 | 2/2003 | Howard et al. | |
| 6,522,418 B2 | 2/2003 | Yokomizo et al. | |
| 6,535,228 B1 | 3/2003 | Bandaru et al. | |
| 6,538,692 B2 | 3/2003 | Niwa | |
| 6,539,169 B1 | 3/2003 | Tsubaki et al. | |
| 6,542,183 B1 | 4/2003 | DeAngelis et al. | |
| 6,546,189 B1 | 4/2003 | Koda | |
| 6,564,380 B1 | 5/2003 | Murphy | |
| 6,567,122 B1 | 5/2003 | Anderson et al. | |
| 6,573,927 B2 | 6/2003 | Parulski et al. | |
| 6,577,311 B1 | 6/2003 | Crosby et al. | |
| 6,577,336 B2 | 6/2003 | Safai | |
| 6,583,813 B1 | 6/2003 | Enright et al. | |
| 6,587,602 B2 | 7/2003 | Wakisawa et al. | |
| 6,611,293 B2 | 8/2003 | Tarnoff et al. | |
| 6,628,899 B1 | 9/2003 | Kito | |
| 6,629,104 B1 | 9/2003 | Parulski et al. | |
| 6,633,309 B2 | 10/2003 | Lau et al. | |
| 6,646,676 B1 | 11/2003 | DaGraca et al. | |
| 6,650,366 B2 | 11/2003 | Parulski et al. | |
| 6,650,704 B1 | 11/2003 | Carlson et al. | |
| 6,657,667 B1 | 12/2003 | Anderson | |
| 6,678,413 B1 | 1/2004 | Liang et al. | |
| 6,680,748 B1 | 1/2004 | Monti | |
| 6,687,877 B1 | 2/2004 | Sastry et al. | |
| 6,698,021 B1 | 2/2004 | Amini et al. | |
| 6,701,058 B1 | 3/2004 | Tsubaki | |
| 6,701,845 B2 | 3/2004 | Ohmura | |
| 6,710,809 B1 | 3/2004 | Niikawa | |
| 6,714,192 B1 | 3/2004 | Torres | |
| 6,728,729 B1 | 4/2004 | Jawa et al. | |
| 6,734,911 B1 | 5/2004 | Lyons | |
| 6,735,253 B1 | 5/2004 | Chang et al. | |
| 6,738,155 B1 | 5/2004 | Rosenlund et al. | |
| 6,741,271 B1 | 5/2004 | McConica et al. | |
| 6,741,864 B2 | 5/2004 | Wilcock et al. | |
| 6,750,902 B1 | 6/2004 | Steinberg et al. | |
| 6,757,008 B1 | 6/2004 | Smith | |
| 6,757,431 B2 | 6/2004 | Loce et al. | |
| 6,762,791 B1 | 7/2004 | Schuetzle | |
| 6,766,036 B1 | 7/2004 | Pryor | |
| 6,774,935 B1 | 8/2004 | Morimoto et al. | |
| 6,775,406 B1 | 8/2004 | Watson | |
| 6,801,719 B1 | 10/2004 | Szajewski et al. | |
| 6,809,759 B1 | 10/2004 | Chiang | |
| 6,813,312 B2 | 11/2004 | Tullberg et al. | |
| 6,816,071 B2 | 11/2004 | Conti | |
| 6,822,660 B2 | 11/2004 | Kim | |
| 6,823,092 B1 | 11/2004 | Sato | |
| 6,832,009 B1 | 12/2004 | Shezaf et al. | |
| 6,864,911 B1 | 3/2005 | Zhang et al. | |
| 6,871,010 B1 | 3/2005 | Taguchi et al. | |
| 6,876,393 B1 | 4/2005 | Yokonuma | |
| 6,879,731 B2 | 4/2005 | Kang et al. | |
| 6,885,395 B1 | 4/2005 | Rabbani et al. | |
| 6,903,763 B1 | 6/2005 | Noguchi et al. | |
| 6,922,258 B2 | 7/2005 | Pineau | |
| 6,928,230 B2 | 8/2005 | Squibbs | |
| 6,930,707 B2 | 8/2005 | Bates et al. | |
| 6,940,543 B2 | 9/2005 | Perotti et al. | |
| 6,940,545 B1 | 9/2005 | Ray et al. | |
| 6,947,075 B1 | 9/2005 | Niikawa | |
| 6,954,224 B1 | 10/2005 | Okada et al. | |
| 6,961,083 B2 | 11/2005 | Obrador et al. | |
| 6,961,087 B1 | 11/2005 | Yoshida | |
| 6,967,675 B1 | 11/2005 | Ito et al. | |
| 6,978,047 B2 | 12/2005 | Montgomery | |
| 6,978,311 B1 | 12/2005 | Netzer et al. | |
| 6,987,528 B1 | 1/2006 | Nagahisa et al. | |
| 6,992,711 B2 | 1/2006 | Kubo | |
| 6,999,626 B2 | 2/2006 | Andrew | |
| 7,015,949 B1 | 3/2006 | Sah | |
| 7,015,954 B1 * | 3/2006 | Foote et al. | 348/218.1 |
| 7,023,469 B1 | 4/2006 | Olson | |
| 7,027,084 B1 | 4/2006 | Watanabe | |
| 7,031,700 B1 | 4/2006 | Weaver et al. | |
| 7,046,273 B2 | 5/2006 | Suzuki | |
| 7,046,292 B2 | 5/2006 | Ziemkowski | |
| 7,065,418 B2 | 6/2006 | Standard et al. | |
| 7,068,316 B1 | 6/2006 | Pine | |
| 7,075,567 B2 | 7/2006 | Hunter et al. | |
| 7,079,176 B1 | 7/2006 | Freeman et al. | |
| 7,084,910 B2 | 8/2006 | Amerson et al. | |
| 7,110,025 B1 | 9/2006 | Loui et al. | |
| 7,110,027 B2 | 9/2006 | Wyman | |
| 7,123,292 B1 | 10/2006 | Seeger et al. | |
| 7,123,935 B2 | 10/2006 | Takahashi | |
| 7,136,094 B2 | 11/2006 | Ziemkowski | |
| 7,139,018 B2 | 11/2006 | Grosvenor et al. | |
| 7,154,535 B2 | 12/2006 | Yamasaki et al. | |
| 7,158,175 B2 | 1/2007 | Belz et al. | |
| 7,161,619 B1 | 1/2007 | Niida et al. | |
| 7,163,151 B2 | 1/2007 | Kiiskinen | |
| 7,196,317 B1 | 3/2007 | Meissner, II et al. | |
| 7,203,648 B1 | 4/2007 | Ostermann et al. | |
| 7,218,792 B2 | 5/2007 | Raskar et al. | |
| 7,219,365 B2 | 5/2007 | Sato et al. | |
| 7,221,863 B2 | 5/2007 | Kondo et al. | |
| 7,227,569 B2 | 6/2007 | Maruya | |
| 7,248,924 B2 | 7/2007 | Casavant et al. | |
| 7,257,317 B2 | 8/2007 | Ohnishi | |
| 7,287,088 B1 | 10/2007 | Anderson | |
| 7,292,229 B2 | 11/2007 | Morag et al. | |
| 7,327,385 B2 | 2/2008 | Yamaguchi | |
| 7,327,387 B2 | 2/2008 | Tanaka et al. | |
| 7,333,134 B2 | 2/2008 | Miyamoto | |
| 7,339,623 B2 | 3/2008 | Kawai | |
| 7,340,766 B2 | 3/2008 | Nagao et al. | |
| 7,362,968 B2 | 4/2008 | Kim | |
| 7,366,979 B2 | 4/2008 | Spielberg et al. | |
| 7,379,116 B2 | 5/2008 | Okamura | |
| 7,383,508 B2 | 6/2008 | Toyama et al. | |
| 7,411,623 B2 | 8/2008 | Shibutani | |
| 7,417,667 B2 | 8/2008 | Shibutani | |
| 7,444,593 B1 | 10/2008 | Reid | |
| 7,448,063 B2 | 11/2008 | Freeman et al. | |
| 7,460,495 B2 | 12/2008 | Li | |
| 7,460,781 B2 | 12/2008 | Kanai et al. | |
| 7,463,216 B2 | 12/2008 | Yamazaki et al. | |
| 7,474,338 B2 | 1/2009 | Sato | |
| 7,477,296 B2 | 1/2009 | Okumura | |
| 7,499,084 B2 | 3/2009 | Kurakata | |
| 7,504,942 B2 | 3/2009 | Marman | |
| 7,511,737 B2 | 3/2009 | Singh | |
| 7,529,411 B2 | 5/2009 | Haupt et al. | |
| 7,535,491 B1 | 5/2009 | Kumagai et al. | |
| 7,542,183 B2 | 6/2009 | Satoh et al. | |
| 7,551,787 B2 | 6/2009 | Marks | |
| 7,576,770 B2 | 8/2009 | Metzger et al. | |
| 7,587,674 B2 | 9/2009 | Broeksteeg | |
| 7,602,419 B2 | 10/2009 | Kiuchi | |
| 7,612,804 B1 | 11/2009 | Marcu et al. | |
| 7,612,806 B2 | 11/2009 | Kazami et al. | |
| 7,626,614 B1 | 12/2009 | Marcu | |
| 7,626,733 B2 | 12/2009 | Kodama et al. | |
| 7,636,754 B2 | 12/2009 | Zhu et al. | |
| 7,650,058 B1 | 1/2010 | Garoutte | |
| 7,711,443 B1 | 5/2010 | Sanders et al. | |
| 7,733,371 B1 | 6/2010 | Monroe | |
| 7,751,628 B1 | 7/2010 | Reisman | |
| 7,782,365 B2 | 8/2010 | Levien et al. | |
| 7,840,892 B2 | 11/2010 | Pyhälammi et al. | |
| 7,860,319 B2 | 12/2010 | Obrador et al. | |
| 7,872,675 B2 | 1/2011 | Levien et al. | |
| 7,904,814 B2 | 3/2011 | Errico et al. | |
| 7,924,324 B2 | 4/2011 | Fujita | |
| 8,026,944 B1 | 9/2011 | Sah | |
| 8,098,287 B2 | 1/2012 | Misawa et al. | |
| 8,350,946 B2 | 1/2013 | Jung et al. | |
| 8,429,223 B2 | 4/2013 | Gilley et al. | |
| 8,593,555 B1 | 11/2013 | Chun et al. | |
| 2001/0015756 A1 | 8/2001 | Wilcock et al. | |
| 2001/0015759 A1 | 8/2001 | Squibbs | |

(56) References Cited

U.S. PATENT DOCUMENTS

| | | |
|---|---|---|
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0032335 A1 | 10/2001 | Jones |
| 2001/0033333 A1 | 10/2001 | Suzuki et al. |
| 2001/0042043 A1 | 11/2001 | Shear et al. |
| 2001/0044858 A1 | 11/2001 | Rekimoto |
| 2001/0046199 A1 | 11/2001 | McPherson et al. |
| 2001/0050875 A1 | 12/2001 | Kahn et al. |
| 2001/0052083 A1 | 12/2001 | Willins et al. |
| 2002/0006786 A1 | 1/2002 | Mine |
| 2002/0014954 A1 | 2/2002 | Fitzgibbon et al. |
| 2002/0015094 A1 | 2/2002 | Kuwano et al. |
| 2002/0018137 A1 | 2/2002 | Tsuda |
| 2002/0021359 A1 | 2/2002 | Okamoto |
| 2002/0024607 A1 | 2/2002 | Suga et al. |
| 2002/0028026 A1 | 3/2002 | Chen et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0055955 A1 | 5/2002 | Lloyd-Jones et al. |
| 2002/0069036 A1 | 6/2002 | Mizokawa |
| 2002/0090217 A1 | 7/2002 | Limor et al. |
| 2002/0093575 A1 | 7/2002 | Kusaka |
| 2002/0103813 A1 | 8/2002 | Frigon |
| 2002/0118958 A1 | 8/2002 | Ishikawa et al. |
| 2002/0122194 A1 | 9/2002 | Kuwata et al. |
| 2002/0137529 A1 | 9/2002 | Takahashi |
| 2002/0145622 A1 | 10/2002 | Kauffman et al. |
| 2002/0149677 A1 | 10/2002 | Wright |
| 2002/0171737 A1 | 11/2002 | Tullis |
| 2002/0171747 A1 | 11/2002 | Niikawa et al. |
| 2002/0176016 A1 | 11/2002 | Misawa et al. |
| 2002/0176508 A1 | 11/2002 | Boyce et al. |
| 2002/0186668 A1 | 12/2002 | Thomason |
| 2002/0191079 A1 | 12/2002 | Kobayashi et al. |
| 2002/0191952 A1 | 12/2002 | Fiore et al. |
| 2002/0196329 A1 | 12/2002 | Dudkowski |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0016289 A1 | 1/2003 | Motomura |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0021591 A1 | 1/2003 | Grosvenor et al. |
| 2003/0025800 A1 | 2/2003 | Hunter et al. |
| 2003/0026596 A1 | 2/2003 | Betti et al. |
| 2003/0030731 A1 | 2/2003 | Colby |
| 2003/0037111 A1 | 2/2003 | Yoshioka |
| 2003/0039380 A1 | 2/2003 | Sukegawa et al. |
| 2003/0058265 A1 | 3/2003 | Robinson et al. |
| 2003/0063114 A1 | 4/2003 | Nishida |
| 2003/0063211 A1 | 4/2003 | Watanabe et al. |
| 2003/0069898 A1 | 4/2003 | Christodoulou et al. |
| 2003/0072491 A1 | 4/2003 | Sirivara et al. |
| 2003/0080878 A1 | 5/2003 | Kirmuss |
| 2003/0081140 A1 | 5/2003 | Furukawa |
| 2003/0090690 A1 | 5/2003 | Katayama et al. |
| 2003/0095191 A1 | 5/2003 | Saito |
| 2003/0103144 A1 | 6/2003 | Sesek et al. |
| 2003/0103670 A1 | 6/2003 | Schoelkopf et al. |
| 2003/0112261 A1 | 6/2003 | Zhang |
| 2003/0112354 A1 | 6/2003 | Ortiz et al. |
| 2003/0113014 A1 | 6/2003 | Katoh |
| 2003/0117505 A1 | 6/2003 | Sasaki et al. |
| 2003/0117642 A1 | 6/2003 | Haraguchi |
| 2003/0122940 A1 | 7/2003 | Myojo |
| 2003/0123078 A1 | 7/2003 | Kazami |
| 2003/0128272 A1 | 7/2003 | Clough et al. |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0160870 A1 | 8/2003 | Ziemkowski |
| 2003/0162556 A1 | 8/2003 | Libes |
| 2003/0180037 A1 | 9/2003 | Sommers |
| 2003/0189654 A1 | 10/2003 | Kage et al. |
| 2003/0197794 A1* | 10/2003 | Sakata ........................ 348/222.1 |
| 2003/0206232 A1 | 11/2003 | Suzuki et al. |
| 2003/0222998 A1 | 12/2003 | Yamauchi et al. |
| 2003/0226023 A1 | 12/2003 | Peters |
| 2003/0229894 A1 | 12/2003 | Okada et al. |
| 2003/0234953 A1 | 12/2003 | Dawson et al. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0001161 A1 | 1/2004 | Herley |
| 2004/0008258 A1 | 1/2004 | Aas et al. |
| 2004/0012686 A1 | 1/2004 | Ono et al. |
| 2004/0017333 A1 | 1/2004 | Cooper et al. |
| 2004/0032517 A1 | 2/2004 | Walmsley et al. |
| 2004/0037540 A1 | 2/2004 | Frohlich et al. |
| 2004/0042679 A1 | 3/2004 | Yamada |
| 2004/0046885 A1 | 3/2004 | Regan et al. |
| 2004/0056960 A1 | 3/2004 | Hayashi |
| 2004/0061782 A1 | 4/2004 | Kinjo |
| 2004/0062439 A1 | 4/2004 | Cahill et al. |
| 2004/0066968 A1 | 4/2004 | Glickman |
| 2004/0070586 A1 | 4/2004 | Taubin |
| 2004/0070678 A1* | 4/2004 | Toyama et al. ............. 348/231.3 |
| 2004/0071445 A1 | 4/2004 | Tarnoff et al. |
| 2004/0075750 A1 | 4/2004 | Bateman |
| 2004/0080653 A1 | 4/2004 | Tanaka et al. |
| 2004/0080661 A1 | 4/2004 | Afsenius et al. |
| 2004/0085456 A1 | 5/2004 | Kwag et al. |
| 2004/0090525 A1 | 5/2004 | Eichmann |
| 2004/0095474 A1 | 5/2004 | Matsufune |
| 2004/0095480 A1 | 5/2004 | Battles et al. |
| 2004/0105015 A1 | 6/2004 | Tsukioka |
| 2004/0108995 A1 | 6/2004 | Hoshino et al. |
| 2004/0119733 A1 | 6/2004 | Morimoto et al. |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0145657 A1 | 7/2004 | Yamamoto et al. |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0166930 A1 | 8/2004 | Beaulieu et al. |
| 2004/0172440 A1 | 9/2004 | Nakajima et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0183903 A1 | 9/2004 | Pedersen |
| 2004/0183915 A1* | 9/2004 | Gotohda et al. ......... 348/207.11 |
| 2004/0187583 A1 | 9/2004 | Ogawa |
| 2004/0189856 A1 | 9/2004 | Tanaka |
| 2004/0196388 A1 | 10/2004 | Kaku |
| 2004/0196399 A1 | 10/2004 | Stavely |
| 2004/0201683 A1 | 10/2004 | Murashita et al. |
| 2004/0201687 A1 | 10/2004 | Perotti et al. |
| 2004/0201690 A1 | 10/2004 | Bryant et al. |
| 2004/0201709 A1 | 10/2004 | McIntyre et al. |
| 2004/0216173 A1 | 10/2004 | Horoszowski et al. |
| 2004/0218894 A1 | 11/2004 | Harville et al. |
| 2004/0218916 A1 | 11/2004 | Yamaguchi et al. |
| 2004/0221063 A1 | 11/2004 | Mogul |
| 2004/0233308 A1 | 11/2004 | Elliott et al. |
| 2004/0233621 A1 | 11/2004 | Maeoka et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0252230 A1 | 12/2004 | Winder |
| 2004/0253990 A1 | 12/2004 | McCoog et al. |
| 2004/0257462 A1 | 12/2004 | Goris et al. |
| 2004/0263609 A1 | 12/2004 | Otsuki et al. |
| 2004/0263634 A1 | 12/2004 | Kiuchi |
| 2004/0263658 A1 | 12/2004 | Cozier et al. |
| 2005/0007471 A1 | 1/2005 | Walmsley et al. |

(56) References Cited

U.S. PATENT DOCUMENTS

| | | |
|---|---|---|
| 2005/0010407 A1 | 1/2005 | Jaroker |
| 2005/0010531 A1 | 1/2005 | Kushalnagar et al. |
| 2005/0013602 A1 | 1/2005 | Ogawa |
| 2005/0013604 A1 | 1/2005 | Ogawa |
| 2005/0017947 A1 | 1/2005 | Shahoian et al. |
| 2005/0018053 A1 | 1/2005 | Suga et al. |
| 2005/0021369 A1 | 1/2005 | Cohen et al. |
| 2005/0028221 A1* | 2/2005 | Liu et al. .......... 725/133 |
| 2005/0033760 A1 | 2/2005 | Fuller et al. |
| 2005/0033991 A1 | 2/2005 | Crane |
| 2005/0036033 A1 | 2/2005 | Imai |
| 2005/0046707 A1 | 3/2005 | Takane |
| 2005/0047676 A1 | 3/2005 | Kang et al. |
| 2005/0050043 A1 | 3/2005 | Pyhalammi et al. |
| 2005/0052685 A1 | 3/2005 | Herf et al. |
| 2005/0057687 A1 | 3/2005 | Irani et al. |
| 2005/0058321 A1 | 3/2005 | Buehler |
| 2005/0080894 A1 | 4/2005 | Apostolopoulos et al. |
| 2005/0084113 A1 | 4/2005 | Simpson et al. |
| 2005/0086391 A1 | 4/2005 | Chu et al. |
| 2005/0088417 A1 | 4/2005 | Mulligan |
| 2005/0093980 A1 | 5/2005 | Nonaka et al. |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0113136 A1 | 5/2005 | Gosieski, Jr. |
| 2005/0130717 A1 | 6/2005 | Gosieski, Jr. et al. |
| 2005/0131905 A1 | 6/2005 | Margolus et al. |
| 2005/0132414 A1 | 6/2005 | Bentley et al. |
| 2005/0140803 A1 | 6/2005 | Ohtsuka et al. |
| 2005/0150362 A1 | 7/2005 | Uehara |
| 2005/0152619 A1 | 7/2005 | Motomura et al. |
| 2005/0158015 A1 | 7/2005 | Nakayama et al. |
| 2005/0162533 A1 | 7/2005 | Noguchi et al. |
| 2005/0162965 A1 | 7/2005 | Fukuda et al. |
| 2005/0169367 A1 | 8/2005 | Venetianer et al. |
| 2005/0180341 A1 | 8/2005 | Nelson et al. |
| 2005/0187901 A1 | 8/2005 | Maritzen et al. |
| 2005/0193421 A1 | 9/2005 | Cragun |
| 2005/0195285 A1 | 9/2005 | Ide |
| 2005/0195291 A1 | 9/2005 | Kubo |
| 2005/0203930 A1 | 9/2005 | Bukowski et al. |
| 2005/0206721 A1 | 9/2005 | Bushmitch et al. |
| 2005/0210267 A1 | 9/2005 | Sugano et al. |
| 2005/0212912 A1 | 9/2005 | Huster |
| 2005/0212950 A1 | 9/2005 | Kanai |
| 2005/0231625 A1 | 10/2005 | Parulski et al. |
| 2005/0237388 A1 | 10/2005 | Tani |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayar et al. |
| 2005/0278461 A1 | 12/2005 | Ohta |
| 2006/0010400 A1 | 1/2006 | Dehlin et al. |
| 2006/0023066 A1 | 2/2006 | Li et al. |
| 2006/0028553 A1 | 2/2006 | Mori et al. |
| 2006/0044394 A1 | 3/2006 | Read |
| 2006/0044398 A1 | 3/2006 | Foong et al. |
| 2006/0044416 A1 | 3/2006 | Miyazaki et al. |
| 2006/0056056 A1 | 3/2006 | Ahiska et al. |
| 2006/0061451 A1 | 3/2006 | Chen |
| 2006/0083298 A1 | 4/2006 | Wang et al. |
| 2006/0083440 A1 | 4/2006 | Chen |
| 2006/0087559 A1 | 4/2006 | Huberman et al. |
| 2006/0087941 A1 | 4/2006 | Obradovich |
| 2006/0092291 A1 | 5/2006 | Bodie |
| 2006/0098112 A1 | 5/2006 | Kelly |
| 2006/0104483 A1 | 5/2006 | Harel et al. |
| 2006/0109349 A1 | 5/2006 | Takashima |
| 2006/0112413 A1 | 5/2006 | Ando et al. |
| 2006/0119711 A1 | 6/2006 | Ejima et al. |
| 2006/0125922 A1 | 6/2006 | Albert et al. |
| 2006/0125928 A1 | 6/2006 | Wolcott et al. |
| 2006/0125937 A1 | 6/2006 | LeGall et al. |
| 2006/0126861 A1 | 6/2006 | Saliterman |
| 2006/0143665 A1 | 6/2006 | Meek et al. |
| 2006/0173756 A1 | 8/2006 | Benight |
| 2006/0174203 A1 | 8/2006 | Jung et al. |
| 2006/0174204 A1 | 8/2006 | Jung et al. |
| 2006/0176392 A1 | 8/2006 | Rainier et al. |
| 2006/0177132 A1 | 8/2006 | Jackson et al. |
| 2006/0177150 A1 | 8/2006 | Uyttendaele et al. |
| 2006/0192887 A1 | 8/2006 | Miyamaki et al. |
| 2006/0195322 A1 | 8/2006 | Broussard et al. |
| 2006/0197839 A1 | 9/2006 | Senior et al. |
| 2006/0203099 A1 | 9/2006 | Omata |
| 2006/0209089 A1 | 9/2006 | Date |
| 2006/0226298 A1 | 10/2006 | Pierson |
| 2006/0268117 A1 | 11/2006 | Loui et al. |
| 2006/0274165 A1 | 12/2006 | Levien et al. |
| 2006/0288273 A1 | 12/2006 | Erol et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0100860 A1 | 5/2007 | Jung et al. |
| 2007/0120980 A1 | 5/2007 | Jung et al. |
| 2007/0195373 A1 | 8/2007 | Singh |
| 2007/0217761 A1 | 9/2007 | Chen et al. |
| 2007/0252901 A1 | 11/2007 | Yokonuma et al. |
| 2007/0274705 A1 | 11/2007 | Kashiwa et al. |
| 2008/0023232 A1 | 1/2008 | Morag et al. |
| 2008/0037749 A1 | 2/2008 | Metzger et al. |
| 2008/0192129 A1 | 8/2008 | Walker et al. |
| 2008/0298796 A1 | 12/2008 | Kuberka et al. |
| 2008/0303909 A1 | 12/2008 | Watanabe et al. |
| 2009/0033752 A1 | 2/2009 | Bodnar et al. |
| 2009/0215388 A1 | 8/2009 | Karaoguz et al. |
| 2009/0281644 A1 | 11/2009 | Okamoto et al. |
| 2009/0305677 A1 | 12/2009 | Ellison et al. |
| 2010/0017289 A1 | 1/2010 | Sah et al. |
| 2011/0270916 A1 | 11/2011 | Shih et al. |
| 2012/0105716 A1 | 5/2012 | Jung et al. |
| 2013/0176341 A1 | 7/2013 | Jung et al. |
| 2014/0146205 A1 | 5/2014 | Xu et al. |

FOREIGN PATENT DOCUMENTS

| | | |
|---|---|---|
| JP | 10023303 A | 1/1998 |
| JP | 2001045452 A | 2/2001 |
| JP | 2001086383 | 3/2001 |
| JP | 2001-309236 A | 11/2001 |
| JP | 2002-083280 A | 3/2002 |
| JP | 2002-094862 A | 3/2002 |
| JP | 2003-009044 A | 1/2003 |
| JP | 2004274625 A | 9/2004 |
| WO | WO 2005/045807 A1 | 5/2005 |
| WO | WO 2005/078597 A1 | 8/2005 |
| WO | WO 2005/112437 A1 | 11/2005 |

OTHER PUBLICATIONS

About.com; "Image Size and Resolution"; pp. 1-3; located at http://graphicssoft.about.com/od/resolution/; bearing a date of 2005; printed on Feb. 16, 2005.

Adobe.com; "Share images with Photo Mail (Win only)"; pp. 1-4; located at http://www.adobe.com/tips/phse13photomail/main.html; printed on Jan. 26, 2015.

Bockaert, Vincent; "Interpolation"; pp. 1-4; located at http://www.dpreview.com/learn/?/Glossary/Digital_Imaging/Interpolation_01.htm; bearing a date of 1998-2005; printed on Feb. 16, 2005.

Canon.ca; "Print/Share Button"; pp. 1-2; located at http://www.canon.ca/digitalphotography/english/ctech_article.asp?id=174&tid=6; bearing a date of Jan. 26, 2005; printed on Jan. 26, 2005.

Cg.its.tudelft.nl; Delft University of Technology; "Shared cameras"; pp. 1; located at http://www.cg.its.tudelft.nl/~spiff/descSC.html; printed on Jan. 27, 2005.

Chainstyle.com; "Resolution and Image Size"; pp. 1-9; located at http://www.chainstyle.com/photoshop/webhelp/tutorials/basics/resolution_and_image_size.htm; printed on Feb. 16, 2005.

Chastain, Sue; "Q. Is it better to use in-camera digital zoom or crop and resample with software?"; pp. 1-2; located at http://graphicsoft.

(56) References Cited

OTHER PUBLICATIONS about.com/cs/digitalimaging/f/digitalzoom.htm; bearing a date of 2005; printed on Feb. 17, 2005.
Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.
Co-Array.org; "A Brief Overview of Co-Array Fortran"; pp. 1-3; located at http://www.co-array.org/caf_intro.htm; printed on May 3, 2005.
Dave; "How Many Pixels? A reasoned approach to digicam specifications"; pp. 1-5; located at http://www.imaging-resource.com/ARTS/HOWBIG/HOWBIG.HTM; bearing a date of 1999; printed on Feb. 16, 2005.
Debian.org; "GNUstep application for digital still cameras"; pp. 1-2; located at http://packages.debian.org/unstable/graphics/camera.app; bearing a date of Jan. 26, 2005; printed on Jan. 27, 2005.
Digital Photography Review; "Kodak EasyShare One"; pp. 1-5; located at http://www.dpreview.com/news/0501/05010605kodakeasyshareone.asp; bearing a date of Jan. 6, 2005; printed on Jan. 26, 2005.
Ekdahl, Lars; "Image Size and resolution"; pp. 1-5; located at http://www.ekdahl.org/kurs/resolution/resolution2_eng.htm; bearing a date of 2002; printed Feb. 16, 2005.
Geocities.com; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.
Gizmodo.com; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.
Har-Peled, Sariel; Koltun, Vladlen; Song, Dezhen; Goldberg, Ken; CiteSeer.Ist:; "Efficient Algorithms for Shared Camera Control"; pp. 1-2; located at http://citeseer.ist.psu.edu/har-peled02efficient.html; bearing a date of 2002; printed on Jan. 26, 2005.
Hernandez, J.R.; Perez-Gonzalez, F.; Rodriguez, J.M.; "Coding and Synchronization: A Boost and a Bottleneck for the Development of Image Watermarking"; pp. 1-7; Dept. Tecnologias de las Communicaciones, ETSI Telecom., Universidad de Vigo, 36200 Vigo, Spain.
Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.
Home.iprimus.com.au; "Digital Cameras and Resampling"; pp. 1-2; located at http://home.iprimus.com.au/painless/resample.htm; printed on Feb. 16, 2005.
Hp.com; "HP Image Zone Express step-by-step: HP Instant Share"; pp. 1-4; located at http://www.hp.com/united-states/ize/steps_instant_share.html; printed on Jan. 26, 2005.
Hua, Zhigang; Xie, Xing; Lu, Hanqing; Ma, Wei-Ying; Research.Microsoft.com; "COBO: Building Cooperative Environment for Cross-Device Image Sharing"; pp. 1; located at http://research.microsoft.com/research/pubs/view.aspx?type=technical+report&id=823; bearing a date of Nov. 2004; printed on Jan. 25, 2005.
Imaging Resource.com; "The Imaging Resource Quick Review"; pp. 1-22; located at http://www.imaging-resource.com/PRODS/1700/170A.HTM; bearing a date of 2001; printed on Feb. 16, 2005.
Intel.com; "Instantly Capture and Share your World with an Intel® PC Camera"; pp. 1-2; located at http://www.intel.com/pccamera/; printed on Jan. 27, 2005.
Jain, Anil K.; "Fundamentals of Digital Image Processing"; 1989; pp. 1-569; Prentice-Hall, Inc.; Englewood Cliffs, NJ U.S.A.
Kodak.com; "Frequently Asked Questions"; pp. 1; located at http://www.kodak.com/global/en/service/knowledgebase/digital-camera-faqs.jhtml?pq-path=1396/5759; bearing a date of Jan. 6, 2005; printed on Jan. 26, 2005.
Koren, Norman; "Understanding image sharpness: Digital cameras vs. film, part 2"; pp. 1-16; located at http://www.normankoren.com/Tutorials/MTF7A.html; bearing a date of 2000-2004; printed on Feb. 3, 2005.
LTL Imagery: "About Resolution Understanding Digital Image of Resolution"; pp. 1-10; located at http://www.ltlimagery.com/resolution/html; bearing a date of 2000-2004; printed on Feb. 16, 2005.
Mahmoud, Qusay H.; "Getting Started with Data Synchronization Using SyncML"; pp. 1-6; located at http://developers.sun.com/techtopics/mobility/midp/articles/syncml/; bearing dates of Sep. 2004 and 1994-2005; printed on May 3, 2005.
MobileMag; "Nikon D2H WiFi Digital Camerea"; pp. 1-2; located at http://www.mobilemag.com/content/100/336/C2502/; bearing a date of Feb. 20, 2004; printed on Jan. 25, 2005.
CNNMoney; "Playboy coming to iPod"; pp. 1-2; located at http://money.cnn.com/2005/01/05/technology/personaltech/playboy_ipod/index.htm; bearing a date of Jan. 5, 2005; printed on Jan. 26, 2005.
National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000_us; bearing a date of 2005; printed on May 3, 2005.
National Instruments Corporation; "Genlocking Multiple JAI CV-MI Cameras"; pp. 1-5; located at http://zone.ni.com/devzone/conceptd.nsf/webmain/7a6b5853548850e886256c21005b1413; bearing a date of 2005; printed on May 3, 2005.
National Instruments Corporation; "Multi-Camera Acquisition"; pp. 1-3; located at http://zone.ni.com/devzone/conceptd.nsf/webmain/D91BAC1317F9D0A686256C9300769A0D; bearing a date of 2005; printed on May 3, 2005.
Rains, Nick; "Vietnam Travel Photography the Digital Way"; pp. 1-7; located at http://www.luminous-landscape.com/locations/vietnam.shtml; bearing a date of 2003; printed on Feb. 3, 2005.
Ritzcamera.com; "Canon—Powershot A85 Digital Camera"; pp. 1-8; located at http://www.ritzcamera.com/webapp/wcs/stores/servlet/ProductDisplay?storeId=10001&catalogId=10001&langId=-1&productId=13176854; printed on Jan. 26, 2005.
Roadcasting.org; "A new type of radio"; "Final Design"; "Process"; "Conclusions"; "Recognition"; "How Roadcasting Works"; "Download"; pp. 1-15; located at www.roadcasting.org; printed on Jun. 2, 2005.
Ross, Suzanne; Research.Microsoft.com; "The Life of a Digital Photo"; pp. 1-5; located at http://research.microsoft.com/displayArticle.aspx?id=605; printed on Jan. 25, 2005.
Sciannamea, Michael; "WiFi-Enable Digital Cameras About to Tap a Growing Marketplace"; pp. 1-5; located at http://wifi.weblogsinc.com/entry/7312187118786387/; bearing a date of Oct. 12, 2004; printed on Jan. 25, 2004.
Sellen, Abigail; Fleck, Rowanne; Kindberg, Tim; Spasojevic, Mirjana; Research.Microsoft.com; "How and Why People Use Camera Phones"; pp. 1-16; located at http://research.microsoft.com/research/pubs/view.aspx?type=technical+report&id=823 bearing a date of Nov. 2004; printed on Jan. 25, 2005.
Starbursthomepage.com; "Life is all about Sharing"; p. 1; located at http://www.starbursthomepage.com/flashpointx.htm; printed on Jun. 29, 2005.
Starbursthomepage.com; "Sharing-On-The-Go Technology"; pp. 1-3; located at http://www.starbursthomepage.com/fsotg.htm; printed on Jun. 29, 2005.
Starbursthomepage.com; "Specifications and Data Transfer Information"; pp. 1-5; located at http://www.starbursthomepage.com/fspec.htm; printed on Jun. 29, 2005.
Starbursthomepage.Com; "What are FlashPoint ShareDrives"; pp. 1-4; located at http://www.starbursthomepage.com/fproducts.htm; printed on Jun. 29, 2005.
Sutherland, Ed; "CSR Intros Low-Cost, Single-Chip WiFi"; pp. 1-3; located at http://www.wi-fiplanet.com/news/article/php/3434131; bearing a date of Nov. 10, 2004; printed on Jan. 25, 2005.
Swgc.mun.ca; "About image size and resolution"; pp. 1-7; located at http://www.swgc.mun.ca/vart2600/resolution.html; printed on Feb. 16, 2005.

(56) References Cited

OTHER PUBLICATIONS

Colbert, Martin; Voglimacci, Catherine; Finkelstein, Anthony; "Live, Audio-Visual Communication Systems for Distance Learning: Experience, Heuristics and ISDN"; pp. 1-40.

Cummins, Fred; "Synchronization Among Speakers Reduces Macroscopic Temporal Variability"; pp. 1-6.

Dodd, George; "Music Performance Venues-keeping them in tune with modern requirements"; pp. 1-11.

El Saddik, Abdulmotaleb Dr.; "Multimedia Communications: Multimedia Technologies & Applications"; Multimedia Communications Research Laboratory, School of Information Technology and Engineering, University of Ottawa, Ottawa, Ontario, Canada; 22 slides; pp. 1-8.

Seifert, Eric; Eligator, Ron; "Acoustical Design Considerations at Universal Studios City Walk™, Orlando, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.

"SOUNDaround: Get cinema quality surround sound through two speakers"; RAM: SOUNDaround by Xitel; pp. 1-7; located at http://www.ramelectronics.net/html/soundaround.html; printed on Jul. 20, 2005.

"Yamaha Internet 'MidLive vol. 3': An Open Experiment: The First MidLive to Feature Synchronized Streaming of MIDI and Audio Data"; Yamaha News Release: wMid Live vol. 3x; pp. 1-5; located at http://www.yamaha.co.jp/english/news/97121101.html; bearing a date of Dec. 1997; printed on Jul. 19, 2005.

Physorg.com; "World's First Built-In Wi-Fi-Enabled Digital Cameras"; pp. 1-3; located at http://www.physorg.com/news6183.html; bearing a date of Sep. 2, 2005; printed on Sep. 7, 2005.

U.S. Appl. No. 12/290,538, Jung et al.
U.S. Appl. No. 12/284,202, Jung et al.
U.S. Appl. No. 12/283,420, Jung et al.
U.S. Appl. No. 12/799,398, Jung et al.
U.S. Appl. No. 12/799,367, Jung et al.

"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.

"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

U.S. Appl. No. 12/806,060, Levien et al.

Grant, Andrew; "Open vs. Closed Source Software"; Science in Africa-Africa's First On-Line Science Magazine; bearing a date of Jan. 2004; Science in Africa, Science magazine for Africa, © 2002; pp. 1-4; located at http://www.scienceinafrica.co.za/2004/january/software.htm.

Palmer, James M.; "Radiometry and Photometry FAQ, Version 1.01"; bearing a date of Jun. 1999; pp. 1-14; located at: http://employeepages.scad.edu/~kwitte/documents/Photomertry_FAQ.PDF.

Cg.its.tudelft.nl, Delft University of Technology; "Shared cameras"; 1 page; located at http://www.cg.its.tudelft.nl/~spiff/descSC.html; printed on Mar. 21, 2011.

Jain, Anil K.; "Fundamentals of Digital Image Processing"; 1989; pp. 1-569; Prentice-Hall, Inc.; Englewood Cliffs, NJ (best copy available).

Adobe Photoshop User Guide 5.0; bearing a date of 1998; pp. 1,2,22,31-35,41,46,48,55-58,101,108,128,167-1-7,259-284, and 311-316; Adobe Systems Inc.

\* cited by examiner

CLIENT/SERVER OR MASTER/SATELLITE CONFIGURATION

PEER-TO-PEER CONFIGURATION

CLIENT/SATELLITE SHARED IMAGE DEVICE CONFIGURATION

```
                                    ┌────┐
                                    │ 17a│
                                    ├────┼────┬────┐
                          ← 1700    │ 17b│ 17c│ 17d│
                                    ├────┼────┴────┤
                                    │ 17e│ Key To  │
                                    ├────┤ FIG. 17 │
                                    │ 17f│         │
                                    └────┴─────────┘
```

(K)
↓

- receiving a request at the processing shared image device to share the at least one processed shared image with at least one sharing shared image device 1770

- obtaining at least one shared image at least partially using at least one image obtaining shared image device 1772

- associating at least one image obtaining shared image device with the processing shared image device, wherein the at least one image obtaining shared image device can share the at least one processed shared image with the processing shared image device 1774

- synchronizing the processing shared image device with a sharing session at least partially during the sharing session 1776

- synchronizing the processing shared image device with a sharing session at least partially following the sharing session 1778

- defining a beginning or an ending of a sharing session at least partially based on a timing of an event 1780

- defining an ending of a sharing session at least partially based on when a subscriber's time runs out 1782

- establishing a membership of the processing shared image device in a sharing session 1784

- establishing a sharing region at least partially using the processing shared image device 1786

- overlapping a first field of view obtained at least partially from the processing shared image device with a second field of view obtained at least partially from at least one image obtaining shared image device 1788

- sharing the at least one processed shared image at least partially at the processing shared image device 1790

FIG. 17f

SHARED IMAGE DEVICE DESIGNATION

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/048,644, entitled SHARED IMAGE DEVICES, naming Edward K. Y. Jung; Royce A. Levien; Robert W. Lord; Mark A. Malamud and John D. Rinaldo, Jr. as inventors, filed 31 Jan. 2005 now abandoned.
2. U.S. patent application Ser. No. 11/048,629, entitled VIEWFINDER FOR SHARED IMAGE DEVICE, naming Edward K. Y. Jung; Royce A. Levien; Robert W. Lord; Mark A. Malamud and John D. Rinaldo, Jr. as inventors, filed 1 Feb. 2005.
3. U.S. patent application Ser. No. 11/064,787, entitled STORAGE ASPECTS FOR IMAGING DEVICE, naming Edward K. Y. Jung; Royce A. Levien; Robert W. Lord; Mark A. Malamud and John D. Rinaldo, Jr. as inventors, filed 23 Feb. 2005 now abandoned.
4. U.S. patent application Ser. No. 11/069,909, entitled SHARING INCLUDING PERIPHERAL SHARED IMAGE DEVICES, naming Edward K. Y. Jung; Royce A. Levien; Robert W. Lord; Mark A. Malamud and John D. Rinaldo, Jr. as inventors, filed 28 Feb. 2005 now abandoned.
5. U.S. patent application Ser. No. 11/089,530, entitled PERIPHERAL SHARED IMAGE DEVICE SHARING, naming Edward K. Y. Jung; Royce A. Levien; Robert W. Lord; Mark A. Malamud and John D. Rinaldo, Jr. as inventors, filed 23 Mar. 2005 now abandoned.
6. U.S. patent application Ser. No. 11/095,768, entitled IMAGE TRANSFORMATION ESTIMATOR OF AN IMAGING DEVICE, naming Edward K. Y. Jung; Royce A. Levien; Robert W. Lord; Mark A. Malamud and John D. Rinaldo, Jr. as inventors, filed 30 Mar. 2005 now abandoned.
7. U.S. patent application Ser. No. 11/115,078, entitled PROXIMITY OF SHARED IMAGE DEVICES, naming Edward K. Y. Jung; Royce A. Levien; Robert W. Lord; Mark A. Malamud and John D. Rinaldo, Jr. as inventors, filed 26 Apr. 2005 now U.S. Pat. No 7,920,169.
8. U.S. patent application Ser. No. 11/122,274, entitled REGIONAL PROXIMITY FOR SHARED IMAGE DEVICE(S) naming Edward K. Y. Jung; Royce A. Levien; Robert W. Lord; Mark A. Malamud and John D. Rinaldo, Jr. as inventors, filed 4 May 2005 now abandoned.
9. U.S. patent application Ser. No. 11/129,045, entitled SHARED IMAGE DEVICE RESOLUTION TRANSFORMATION naming Edward K. Y. Jung; Royce A. Levien; Robert W. Lord; Mark A. Malamud and John D. Rinaldo, Jr. as inventors, filed 13 May 2005.
10. U.S. patent application Ser. No. 11/143,970, entitled ESTIMATING SHARED IMAGE DEVICE OPERATIONAL CAPABILITIES OR RESOURCES naming Edward K. Y. Jung; Royce A. Levien; Robert W. Lord; Mark A. Malamud and John D. Rinaldo, Jr. as inventors, filed 2 Jun. 2005 now U.S. Pat. No. 7,876,357.
11. U.S. patent application Ser. No. 11/153,868 entitled SHARED IMAGE DEVICE SYNCRONIZATION OR DESIGNATION naming Edward K. Y. Jung; Royce A. Levien; Robert W. Lord; Mark A. Malamud and John D. Rinaldo, Jr. as inventors, filed 14 Jun. 2005 now U.S. Pat. No. 8,902,320.
12. U.S. patent application Ser. No. 11/173,166 entitled RESAMPLING OF TRANSFORMED SHARED IMAGE TECHNIQUES naming Edward K. Y. Jung; Royce A. Levien; Robert W. Lord; Mark A. Malamud and John D. Rinaldo, Jr. as inventors, filed 1 Jul. 2005 now abandoned.

Certain aspects of the present application relate, in general, to sharing mechanisms that allow sharing of images between multiple devices.

In certain aspects, a method includes, but is not limited to, receiving at least one motivating event at least partially at a processing shared image device. The method can further include transmitting at least one designated attribute at least partially from the processing shared image device, wherein the at least one designated attribute can be effected at least partially in response to the receiving the at least one motivating event at least partially at the processing shared image device. The method can further include obtaining an obtained shared image at the processing shared image device that is obtained in accordance with the at least one motivating event, and is obtained at least partially in response to the transmitting the at least one designated attribute. The method can further include processing the obtained shared image to derive an at least one processed shared image at least partially at the processing shared image device. In addition to the foregoing, other method aspects are described in the claims, drawings, and text forming a part of the present application.

In certain aspects, a method includes, but is not limited to, obtaining user instructions relating to at least one designated attribute and a shared image at least partially at a capturing shared image device, wherein the at least one designated attribute can be received at least partially from a processing shared image device. The method can further include generating an obtained shared image at the capturing shared image device at least partially by processing the shared image to satisfy the at least one designated attribute. The method can further include transmitting the obtained shared image that can be received by, and processed at, the processing shared image device. In addition to the foregoing, other method aspects are described in the claims, drawings, and text forming a part of the present application.

In certain aspects, a method includes, but is not limited to, obtaining, at least partially at a processing shared image device, at least one shared image and at least one image processing goal relating to the at least one shared image. The method can further include requesting at least partially at the processing shared image device at least some image information that, when processed, could allow the processing shared image device to process the at least one shared image to satisfy the at least one image processing goal. The method can further include obtaining, at least partially at the processing shared image device, the at least some image information that can be obtained at least partially in response to the requesting the at least one image processing goal. The method can additionally include processing, at least partially at the processing shared image device, the at least one shared image at least partially utilizing the at least some image information to derive an at least a portion of an at least one processed shared image that satisfies the at least one image processing goal. In addition to the foregoing, other method aspects are described in the claims, drawings, and text forming a part of the present application.

In certain aspects, a method includes, but is not limited to, obtaining at least partially at an image obtaining shared image device at least one shared image and at least one image processing goal relating to the at least one shared image. The method can further include obtaining at least one portion of at least one obtained image that is obtained based at least in part on the at least one image processing goal at least partially at the image obtaining shared image device. The method and can further include processing the at least one shared image with the at least one portion of the at least one obtained image, at least partially at the image obtaining shared image device, to derive at least a portion of at least one processed shared image. In addition to the foregoing, other method aspects are described in the claims, drawings, and text forming a part of the present application.

In certain aspects, an apparatus includes, but is not limited to, a processing shared image device operable to at least partially receive at least one motivating event. The processing shared image device can be operable to at least partially transmit at least one designated attribute, wherein the at least one designated attribute can at least partially result in response to the processing shared image device operable to at least partially receive the at least one motivating event. The processing shared image device can be operable to at least partially obtain an obtained shared image that is obtained in accordance with the at least one motivating event and at least partially in response to the processing shared image device operable to transmit the at least one designated attribute. The processing shared image device can be operable to at least partially process the obtained shared image to derive an at least one processed shared image. In addition to the foregoing, other apparatus aspects are described in the claims, drawings, and text forming a part of the present application.

In certain aspects, an apparatus includes, but is not limited to, a capturing shared image device configurable to receive user instructions relating to at least one designated attribute and a shared image, wherein the at least one designated attribute can be at least partially received from a processing shared image device. The capturing shared image device can be configurable to generate an obtained shared image at least partially by processing the shared image to satisfy the at least one designated attribute. The capturing shared image device can be configurable to transmit the obtained shared image that can be received by, and processed at, the processing shared image device. In addition to the foregoing, other apparatus aspects are described in the claims, drawings, and text forming a part of the present application.

In certain aspects, an apparatus includes, but is not limited to, a processing shared image device operable to at least partially obtain at least one shared image and at least one image processing goal relating to the at least one shared image. The processing shared image device can be operable to at least partially request at least partially at the processing shared image device at least some image information. The processing shared image device can be operable to at least partially obtain the at least some image information that can be obtained at least partially in response to the processing shared image device operable to at least partially request the at least some image information. The processing shared image device can be operable to at least partially process, at least partially at the processing shared image device, the at least one shared image at least partially utilizing the at least some image information to derive an at least a portion of an at least one processed shared image that satisfies the at least one image processing goal. In addition to the foregoing, other apparatus aspects are described in the claims, drawings, and text forming a part of the present application.

In certain aspects, an apparatus includes, but is not limited to, an image obtaining shared image device operable to at least partially obtain an at least one image processing goal relating to at least one shared image. The image obtaining shared image device can be operable to at least partially obtain at least one portion of at least one obtained image that is obtained based at least in part on the at least one image processing goal. The image obtaining shared image device can be operable to at least partially process the at least one shared image with the at least one portion of the at least one obtained image to derive at least a portion of at least one processed shared image. In addition to the foregoing, other apparatus aspects are described in the claims, drawings, and text forming a part of the present application.

In one or more various aspects, related apparatus and systems include but are not limited to circuitry and/or programming for effecting the herein-referenced method aspects; the circuitry and/or programming can be virtually any combination of hardware, software, electromechanical system, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the foregoing is illustrative only and not intended to be in any way limiting. Other aspects, features, and advantages of the devices and/or processes and/or other subject matter described herein will become apparent in the text set forth herein.

BRIEF DESCRIPTION OF THE FIGURES

FIGS. 17a, 17b, 17c, 17d, 17e, and 17f is a flowchart of one embodiment of a processing or sharing technique;

The use of the same symbols in different drawings typically indicates similar or identical items.

DETAILED DESCRIPTION

Figure 1:
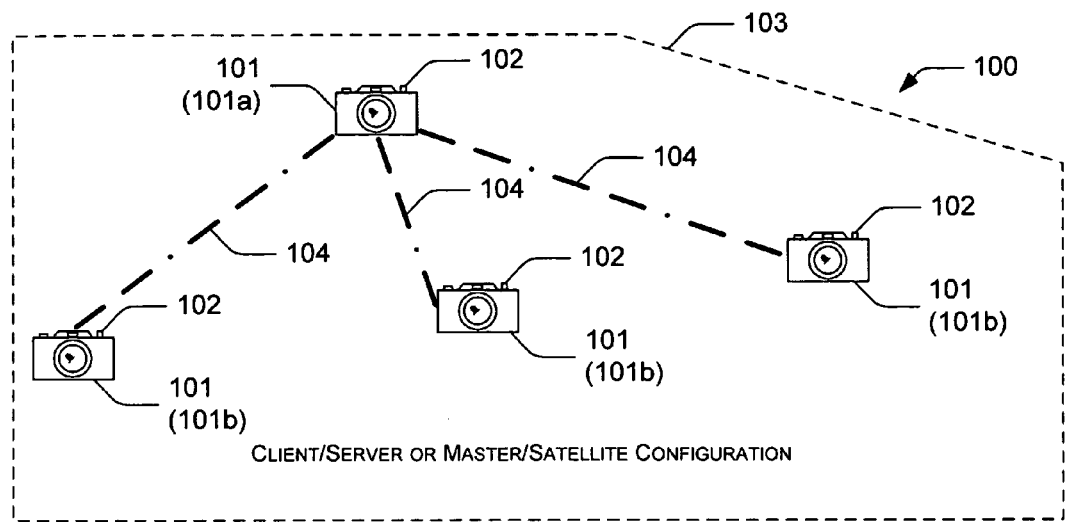
FIG. 1 shows a schematic diagram of one embodiment of a shared image network including a plurality of shared image devices.

This disclosure describes a number of embodiments of a shared image network 100 that can include at least one sharing mechanism 102, such that at least one sharing mechanism 102 can be integrated in, and/or utilized by, at least one shared image device 101. Different embodiments of the shared image network 100 are described with respect to FIGS. 1, 2, 3, and 4. Certain embodiments of the shared image devices can capture an image and can be visualized as taking or imaging a photograph in certain embodiments. The present disclosure provides a number of these sharing mechanisms 102 by which the shared images can be shared or copied, and can either be transferred to other capturing shared image devices and/or other non-capturing shared image devices. In this disclosure, the term "capture" can apply to either imaging, photographing, or otherwise generating or producing shared images or portions thereof. Different embodiments of the shared image device 101 can each perform one or more processes including certain ones of, but not limited to: capturing, creating, processing, storing, printing, transferring, obtaining, retaining, displaying, and/or receiving the shared images. Different embodiments of the shared images can be configurable as still images and/or motion images (e.g., moving pictures). Many embodiments of the sharing mechanism 102 can be integrated between one or more shared image device 101.

Within the disclosure, certain embodiments of the shared image devices 101, such as digital cameras, camcorders, etc. that can capture shared image information are referred to as "capturing shared image devices", which is distinct from those shared image devices 101 that cannot capture shared image information. The capturing shared image devices such as digital cameras, still-picture cameras, motion picture cameras, or camcorders can be applied to photography. Many shared image devices that cannot capture images can be referred to within this disclosure as "peripheral shared image devices" since they perform such peripheral actions as storing, saving, store and forwarding, displaying, projecting and/or otherwise processing data associated with images. This disclosure describes a number of different operations and techniques that can be performed by the shared image devices that include, but are not limited to, designating an attribute of an image to be captured, synchronizing images to be captured between multiple shared image devices, sharing images between different shared image devices, and/or capturing shared images. It is to be understood that a single shared image device can perform one, or many of these operations. For example, a camera or other devices configured as the capturing shared image device can capture certain shared images; it can also share other images with other shared image devices, and it can also designate an attribute of an image to be captured by other shared image devices.

Certain aspects of this disclosure describe a motivating event that can be utilized by multiple shared image devices that can be utilized during obtaining a shared image device. In certain instances, the motivating event can be used to generate a designated attribute such as can be transmitted to another shared image device to effect a change in the another shared image device. Certain embodiments of motivating events include, but are not limited to, obtaining a shared image, obtaining an image processing goal, receiving an indication that an image has been captured, receiving user instructions that it is desired to modify and/or capture at least a portion of an image, etc. Within this disclosure, the term "obtaining" can apply to capturing a shared image, such as by taking an image; or alternatively receiving an image at the shared image device. Such motivating affected thereby allows, for example, for a shared image device to control or alter a manner in which that shared image device (or alternatively, another shared image device) obtains a shared image. In certain embodiments, the shared image device can utilize at least one motivating event to derive a designated attribute.

This disclosure describes a number of embodiments by which one designating shared image device can designate the designated attribute or attribute by which images are obtained by the same or another capturing shared image device. Examples of designated attributes that may be designated to the obtaining shared image device (which, respectively, captures or retrieves images) within this disclosure include, but are not limited to: format, pixel depth, subject, captured region, event, cost (e.g., micropayments), rights, creator, owner, size, transformation, use (e.g. providing a buddy icon on a desktop background that allows multiple shared image devices to share in a controllable fashion therebetween, but not with other shared image devices), attachments (e.g., other images, audio, metadata, etc.), promotions (e.g. image might contain a coupon), use (e.g. image might be usable in a game, or serve as a ticket). It is also to be understood, in certain embodiments but not others, an image designating device may not have the capability to capture images. For instance, certain image designating devices may be configured to issue instructions and/or information to a capturing shared image device about how the capturing shared image device should capture images. A variety of user-interface techniques may be used by the user in combination with the designating shared image device to determine images that are desired to be captured including, but not limited to, menu-drive instructions; laser, optical, or other pointing devices; vocal or audio instructions, etc.

This disclosure can also provide a variety of mechanisms and/or techniques by which a processing goal can be utilized by a shared image device to affect obtaining an image by the same or other shared image device (e.g., by capturing at least one image portion or by retrieving at least one image portion). The processing goal can thereby be utilized during processing within one or more shared image device(s) to determine particulars about processing to be performed at least partially utilizing an image that is desired to be captured and/or retrieved from storage. Examples of processing goals include, but not limited to, a location image processing goal, an imaging condition processing goal, an image resolution processing goal, field of view processing goal, an image combining processing goal, an image framing processing goal, and the like. Processing goals can thereby represent a technique that a shared image device can utilize to effect a variety of processing techniques that can be performed by that or another shared image devices during obtaining of the shared images.

In certain embodiments, the transformation of one or more images such as can utilize processing goals can include, but is not limited to, changing the resolution of one or more images, changing the image exposure of one or more images, modifying the metadata for one or more images, modifying the image content of one or more images, and/or adjusting the image composition of one or more images, etc., such as described in this disclosure.

Within the disclosure, the terms "images", or "image information" can pertain to full images, portions of images, segments of full images, thumbnails of images, information that describes particular images such as metadata (that can contain such information as the subject of the image, identifying who took the image, where the image was captured, the reference number of the image, etc.). Within this disclosure, metadata can be associated with a particular image or set of images. For example, a particular image may include metadata that describes such information as the subject of the image, the date and time of the image, location of the image, the owner of the shared image device, etc. It is envisioned that the metadata that is associated with the particular image can be modified as, for example, the image itself is altered such as by changing the resolution. In certain embodiments, metadata can be used during processing of the image. For example, if it is desired to determine all images captured by a particular user or including a particular subject, the metadata can be queried in certain instances to derive one or more images to satisfy that query.

Within this disclosure, the terms "image representation" or "image" can pertain to images, thumbnails of images, icons that pertain to images, portions of images, images having altered resolution, information pertaining to images such as metadata, etc. The term "obtain" can apply to obtaining shared images either by capturing or by data transfer from another shared image device. The term "retain" can apply to storing shared images for some duration regardless how temporary or permanent the storage duration within a memory storage device.

Certain embodiments of still images can include photographs or digital images that can be captured by the image device such as, for example, a digital camera. Certain embodiments of motion images can include videos that may be captured by the image device such as, for example, a camcorder. A variety of embodiments of the sharing mechanism can therefore handle such exemplary shared images as digital still images or digital motion images that are either alone or in combination with video, audio, music, etc.

This disclosure can also provide a number of embodiments of mechanisms by which a resolution of one or more shared images contained in a shared image device 101 (configured either as a capturing shared image device and/or peripheral shared image device) can be transformed. As such, in certain embodiments of the shared image devices that contain the shared images having different resolutions, but not others, one or more of the shared image devices can transfer their shared images therebetween following the change of resolution. In addition, certain embodiments of shared image devices may be capable of having multiple versions of one or more images, multiple one(s) of which have different resolutions, depending upon their purpose and/or the particular configuration of the shared image device(s). For example, if the particular shared image device such as a camera or camcorder is being utilized at a wedding or child's birthday party, then it may be desirable to have one of the shared image devices configured as a computer, and/or act as a camera-server to contain one or more different resolution versions of all of the shared image devices occurring during that session. By comparison, other shared image devices may be configured as a capturing shared image device, which may contain only high-resolution images captured by that shared image device, and relatively low-resolution images captured by other shared image devices to, for example, allow more images to be captured or processed. If it is desired for a particular capturing shared image device to download high-resolution versions of images, then in certain instances, but not others, higher-resolution versions of the images can be downloaded from, for example, another camera-server or other shared image device that is storing the higher-resolution images.

Within this disclosure, the term "changing the resolution" of an image may pertain in certain embodiments, but not others, to altering the color values and/or the color intensities of a particular image. As such, increasing the resolution of an image can pertain to increasing the density of pixels, and can result from increasing variable color density values and/or color intensities of certain pixels and/or image regions forming the image. Decreasing the resolution of an image can pertain to decreasing the density of the pixels, and can result from diminishing variable color density values and/or color intensity of certain pixels and/or image regions forming the image. During a resolution conversion process, in certain embodiments of a display or projector, the footprint of pixels can be appropriately altered to effectively change the resolution of the at least one image.

By providing such ability of the shared image devices to download or upload different-resolution versions of one or more images, it allows the shared image network 100 to share images of different resolutions, and/or different-resolution versions of the same images therebetween.

In certain embodiments, but not others, peripheral shared image devices can exercise a certain amount of imaging control and/or processing control over capturing shared image devices. For example, the peripheral shared image device can transmit metadata and/or other image information (such as a request to change resolution or take an image of another location) to the capturing shared image devices to indicate, for example, to capture one or more images of a particular subject, zoom, color intensity, resolution, etc. Additionally, in certain embodiments but not others, shared images can be transmitted from a peripheral shared image device to a capturing shared image device. For example, the peripheral shared image device can be configured to store a large number of images that can be returned to one or more capturing shared image devices upon their request.

In certain embodiments while not others, as described within this disclosure, certain peripheral shared image devices can transmit at least some device operation information that can be received by at least one shared image device. The device operation information can be used to vary the operational characteristics of the at least one shared image device. Illustrative examples of operational characteristics of shared image devices that can be varied based on the transmission of the device operation information from the peripheral shared image device can include, but is not limited to operating a shutter mechanism, selecting a location of an image, operating a zoom, and/or focusing the capturing shared image device. As such, transmitting at least some device operation information from a peripheral shared image device to at least one capturing shared image device can effectively alter an operation of the at least one capturing shared image device. In this manner, the transmitting at least some device operation information can affect some control of the peripheral shared image device over the operation of the at least one capturing shared image device.

In certain instances, at least one shared image device can be configured to transmit a captured shared image information, at least partially based on instructions and/or other image information, from the peripheral shared image device to the at least one other shared image device. In other instances, at least one shared image device can be configured to receive either stored shared images and/or shared images either directly or via another intermediate shared image device or other device. As such, the peripheral shared image device in combination with the at least one shared image device (that can capture, or contain, shared information) can, in certain embodiments, alone or in combination, provide a system by which a user, mechanism, or controller at the peripheral shared image device can determine image(s) that are to be transmitted from the at least one shared image device to the peripheral shared image device. For instance, one embodiment can include a number of shared image devices sharing shared images. In one embodiment of the sharing mechanism 102 but not others, the peripheral shared image device can transmit a request for particular images from a particular user, pertaining to a particular subject, including images of a particular color characteristic, or including particular metadata, etc. As such, the peripheral shared image device can effectively transmit a query to one or more capturing shared image devices to return a particular image that may or may not have been captured. Such a query can be responded to using appropriate recognition programs, and the suitable image(s) can be returned to the peripheral shared image device as desired or in an appropriate order to be processed, displayed, analyzed, retained, obtained, and/or projected as appropriate for that particular shared image device. For instance, one or more members of a sharing session, or other individuals, can view multiple images being projected, displayed, printed, retained, etc. by a number of capturing shared image devices that are transmitting certain ones of their shared images to a peripheral shared image device.

Within the disclosure, the terms shared image(s), image(s), image representation(s), image(s), or image information each pertain to full images, portions of images, segments of full images, magnified images, reduced resolution images, thumbnails of images, information that describes particular images such as metadata. Metadata represents an example of image information, or images, and can contain such information as the subject of the image, identifying who took the image, a location where the image was captured, a reference number of the image, etc. Within this disclosure, the terms "image representation" or "image" can pertain (among other things) to images, thumbnails of images, icons that pertain to images, portions of images, images having altered resolution, information pertaining to images such as metadata, etc. The term "obtain" applies to obtaining shared images either by capturing or by data transfer from another shared image device. The term "retain" applies to storing shared images for some duration regardless how temporary or permanent the storage. In this disclosure, the term "broadcast" can apply to one or more of transmitting a shared image from one shared image device in a manner such that the signal can be received by at least one (and usually multiple) other shared image device; transmitting to all other shared image devices, to all other shared image devices in the enrolled in a sharing session, or transmitting to only certain selected shared image devices. Broadcast can also apply to transmitting to shared image devices arranged in a general network, a master-satellite, a server-satellite, a peer-to-peer or point-to-point (alternatively, P2P) network configuration, or another network configuration, certain ones of which are as described in this disclosure. As such, there are a wide variety of techniques that shared images can be transferred between pairs of shared image devices.

The terms "shared image devices" or "cameras" can apply to such devices as digital cameras, video cameras, camcorders and/or imaging devices that such devices are developing into. The shared image device can capture certain embodiments of still images including, but not limited to, photographs or digital images. Certain embodiments of shared image devices such as a camcorder or motion picture video camera can capture motion images such as videos. The shared image devices can integrate a sharing mechanism to either capture, obtain, retain, store, or transfer such shared images.

A variety of embodiments of the sharing mechanism can therefore capture or otherwise process, retain, or obtain such exemplary shared images as digital still images or digital motion images that are provided either alone or in combination with video, audio, music, etc.

Examples of Shared Image Devices

Examples of shared image devices 101 that are not configurable to capture shared image information can include, but are not limited to, certain laptop computers, desktop computers, portable image store and display devices, digital video disk (DVD) devices, personal display assistants (PDA), printers, compact disk (CD) drives, IPods (a trademark of Apple Computers and are made commercially available there from), etc. Certain embodiments of portable image store and display devices can be configurable to utilize peer-to-peer communications, and may be capable of transferring shared images there between. Certain embodiments of the shared image devices that cannot capture shared image information operate largely to retain, obtain, store, process, and/or display shared images.

In different embodiments, the sharing mechanism can be configurable to provide a varying degree of automated publishing functions between multiple shared image devices. Certain shared image(s) that are captured by a shared image device can be distributed or transmitted to, and/or received by, other shared image devices, and thereby be "published" and made public (and therefore can be considered to be no longer private). One embodiment of the sharing mechanism 102 allows the shared image device 101 to toggle on/off publishing of the shared images to switch between the images being public and private. In certain embodiments, such publishing can be automatically set for a prescribed duration such as temporally or more permanently defined by a "sharing session", after which duration the shared image devices each returns to their non-sharing configuration. In other embodiments, the sharing session can be permanent or have a lengthy duration.

Certain embodiments of the shared image device 101 that include at least a portion of the sharing mechanism 102 can be modifiable to provide a variety of functions. Many embodiments of shared image devices that can capture shared images, such as cameras or camcorders, can also function as storage devices to store some data pertaining to shared images. Certain capturing embodiments of shared image devices can also act as a memory acquisition device that obtains or retains pictures from other shared image devices. Other embodiments of the shared image device 101 such as portable image storage and display devices can be configurable as storage devices, in which shared images can be stored, accessed, and/or displayed.

The very structure, nature, or operation of certain embodiments of such shared image devices such as cameras, digital cameras, or camcorders are likely to change as the associated technologies (e.g., displaying, digital signal processing, filtering, etc.) improves. It is likely that digital cameras and/or camcorders will develop greater memory storage capabilities as the associated memory storage technologies improve. In this disclosure, multiple capturing shared image devices and/or multiple peripheral shared image devices could be "networked" in such a manner that a large number of images can be transferred between multiple capturing shared image devices. Certain capturing shared image devices can be optimized for their data storage or processing capabilities, and as such may act somewhat like computer servers. Other capturing shared image devices can be optimized for their photographic or zooming abilities, and as such may be considered as true capturing or shared image devices. As the characteristics and abilities of different shared image devices vary more, the benefits of networking the shared image devices increases as well. Certain sharing concepts, as described herein, enhance the networking aspects of the capturing shared image devices.

The resolution conversion portion can in certain embodiments, but not others, act to alter the resolution of images that might have been captured or otherwise obtained. As described within this disclosure, certain embodiments of the resolution conversion portion may be configurable to increase or decrease the resolution of the image such as by utilizing pixel removal, pixel-interpolation, and/or combination of pixels from multiple image techniques. Different embodiments of the resolution conversion portion are described herein. Within this disclosure, the terms "resolution conversion" and "resampling" can in many instances, but not others, be considered similar since both can utilize processes that can include altering image intensity and/or color values of the image. Resampling can in certain embodiments, but not others, be equated to increasing or decreasing the resolution of at least a portion of an image. Resampling can, in certain embodiments but not others, be implemented by respectively adding or removing pixels from a given image as described in this disclosure.

Figure 7:
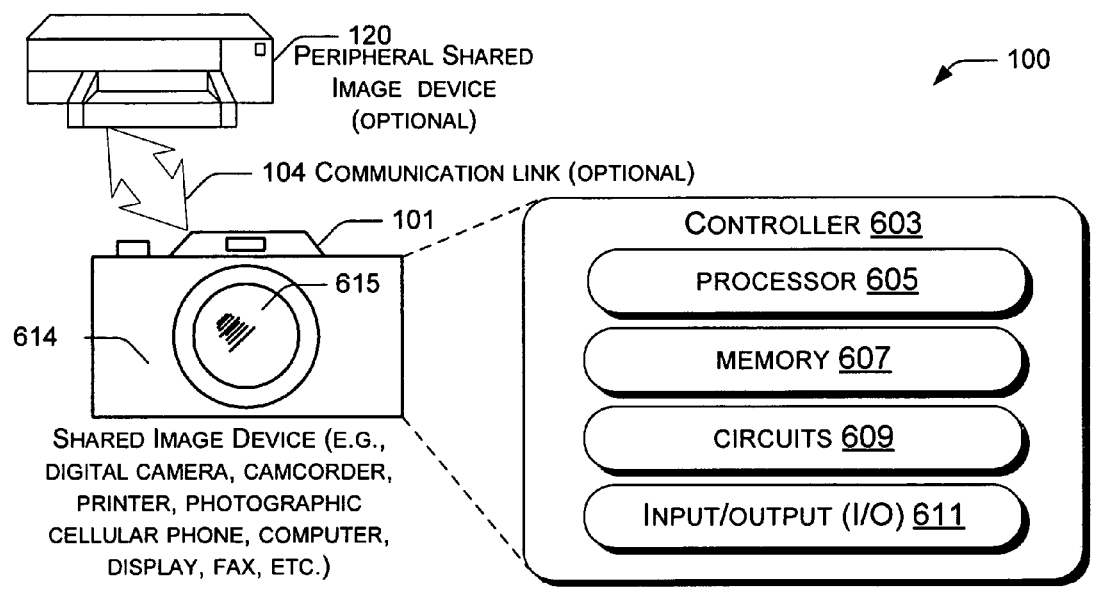
FIG. 7 is a schematic diagram including another embodiment of the shared image device.

One embodiment of a shared image network 100 is described with respect to FIG. 7. One embodiment of the shared image network 100 can include a shared image device 101, an optional peripheral shared image device 120, and an optional communication link 104. The shared image device 101 can be configurable to capture images. In different embodiments, the shared image device 101 can be alternatively configured as, but not limited to, a digital camera, a camcorder, a cellular phone with picture taking capabilities, a computer or PDA with image processing and/or picture taking capabilities, a printer, an image display etc. The shared image device 101 can be operationally sub-divided into an imaging portion 615 and data storage portion 614. Different embodiments of the shared image device 101 can capture, photograph, image, print, display, save, store-and-forward, or otherwise process a variety of images including, but not limited to, still images, motion images, video, audio, thumbprints, or other information relating to the images such as metadata. Different embodiments of the shared image device 101 can be configured to capture, obtain, retain, or otherwise process a variety of images including, but not limited to, color images, grayscale images, etc.

In this disclosure, "subscribing" pertains to a user joining their shared image device (which, in different embodiments, can be configured either as a capturing shared image device or as a peripheral shared image device) in a session to provide shared images to and/or receive shared images from other shared image devices. In certain embodiments of the shared image device, it can be desired to subscribe to different functions using different mechanisms. While any combination of particular functions may be described with respect to this disclosure, this disclosure is intended to describe other shared image devices that can perform varied or alternative functions.

Certain embodiments of shared image devices 101 provide a sharing mechanism 102 by which certain shared image devices that are enrolled in a sharing session may not share every image that it is being captured. For example, certain images captured by a particular shared image device may be considered as private, and therefore may not be used in certain embodiments for general distribution during a sharing session with other member shared image devices. Certain communication links 104 that connect between pairs of shared image devices can be private in one direction while public in another direction, public in both directions, or private in both directions. For example, it may be desired to configure a communication link from a capturing shared image device to a peripheral shared image device to be either public or private; while the communication link from the peripheral shared image device to the capturing shared image device can be the reverse or the same.

Certain embodiments of shared image devices 101 can provide such operations as, but are not limited to: performing active sharing between multiple shared image devices, temporarily pausing or muting the active sharing, resuming the active sharing after temporarily pausing or muting, connecting with other devices and/or people, or temporarily performing or delaying a variety of operations. Such temporary pausing or muting of sharing operations may be equated to temporarily halting a subscription for a particular shared image device; and in many embodiments the shared images that were shared during this pausing or muting period can be transmitted or collected after the pausing or muting. Other aspects and concerns of sharing the shared images can relate to managing the shared image devices. Examples of these tasks include controlling and selecting image resolution, allowing shared images to exit a particular shared image device but not enter the same shared image device, or vice versa.

It is to be understood that certain embodiments of the shared image device 101 can be configurable in a variety of network configurations, for example as described in this disclosure with respect to FIGS. 1, 2, 3, or 4. These network configurations are illustrative in nature, and not limiting scope. Additionally, the multiple shared image devices that are included in a particular network can frequently change their association and operation. For example, the sharing mechanism 102 as described with respect to FIG. 1 can during a particular time period involve the left-most satellite shared image device 101b transmitting a shared image to the master shared image device 101a. Within this disclosure, any reference to the number 101 followed by a letter (e.g., 101a, 101b, 101g, etc) may indicate an instance of the shared image device 101, such as described in this disclosure. The master shared image device 101a can thereupon transmit another shared image to another one of the satellite shared image devices 101b during a subsequent period. In this disclosure, some description of the shared image device may be included (e.g., master shared image device, satellite shared image device, designating shared image device, capturing shared image device, etc.). These descriptions are intended to be descriptive in nature, and not limiting in scope, and it is to be understood that many of these shared image devices can perform a wide variety of functions in addition to that described. As such, the communications or networked configurations of multiple embodiments of the shared image devices can be fluid, changeable, and reliable to transfer a variety of shared images (that may be captured by one or more shared image devices) in a substantially controllable fashion.

Certain embodiments of shared image devices 101, as described with respect to FIGS. 1 to 4, can each include a portion of a share mechanism 102, such as a share button, that the owner of the shared image device 101 can actuate by such action as physically pressing. An actuating portion of a sharing mechanism can act to join a number of shared image devices during a particular sharing session, and/or possibly perform some other function(s) relative to the sharing session. Actuating portions of certain embodiments of share mechanisms 102 can be conveniently located on some external casing of a digital camera or camcorder, or some other such location for easy actuation. Certain embodiments of the share mechanisms 102 can include those components and/or processes that allow one shared image device to share and/or copy images with at least one other shared image device during a particular sharing session.

In another embodiment, a share mechanism 102 can be included in a computer/controller based program to control the sharing process between multiple shared image devices. As such, certain embodiments of share mechanisms 102 can integrate a plurality of shared image devices, since more than one shared image device are involved in sharing images. Such a share mechanism can include an actuating portion and/or an authentication or authorization portion. The actuating portion can actuate the sharing mechanism between a number of shared image devices, a graphical user interface (GUI) or computer display that can display copies of the shared images to the users across multiple shared image devices, and an authentication or authorization portion that can provide authentication or authorization between multiple shared image devices.

A number of other embodiments of the actuating portion of the sharing mechanism can differ considerably from a manually-actuated shared mechanism (such as a share button) to more automatic type devices. Certain embodiments of such shared image devices can rely on proximity between shared image devices. Certain embodiments of the sharing mechanism 102 can utilize near-field shared image devices that are within a prescribed range that can be automatically actuated to copy and/or share the shared image information. In certain embodiments, the actuating portion of the share mechanism can even be remotely positioned from the associated shared image device 101, such as in a remote-control of the type that is in common usage for television, etc.

In another embodiment as described with respect to FIGS. 1 to 4, physical contact may actuate a share mechanism 102 within plurality of shared image devices 101. A Java ring (as produced and made commercially available by Dallas Semiconductor) provides an example of a commercially available actuating mechanism that can transmit data between numerous devices resulting from physical contact of those devices. An embodiment of a share mechanism 102 can include a Java ring or other similar device to automate actuation of many aspects of sharing images between multiple shared image devices 101. In certain embodiments, the actuating portion of the share mechanism can be positioned remotely from the associated shared image device 101, such as is well known in a remote control of the type that is in common usage for television, etc.

Examples of Processing Shared Image Devices

Figure 5:
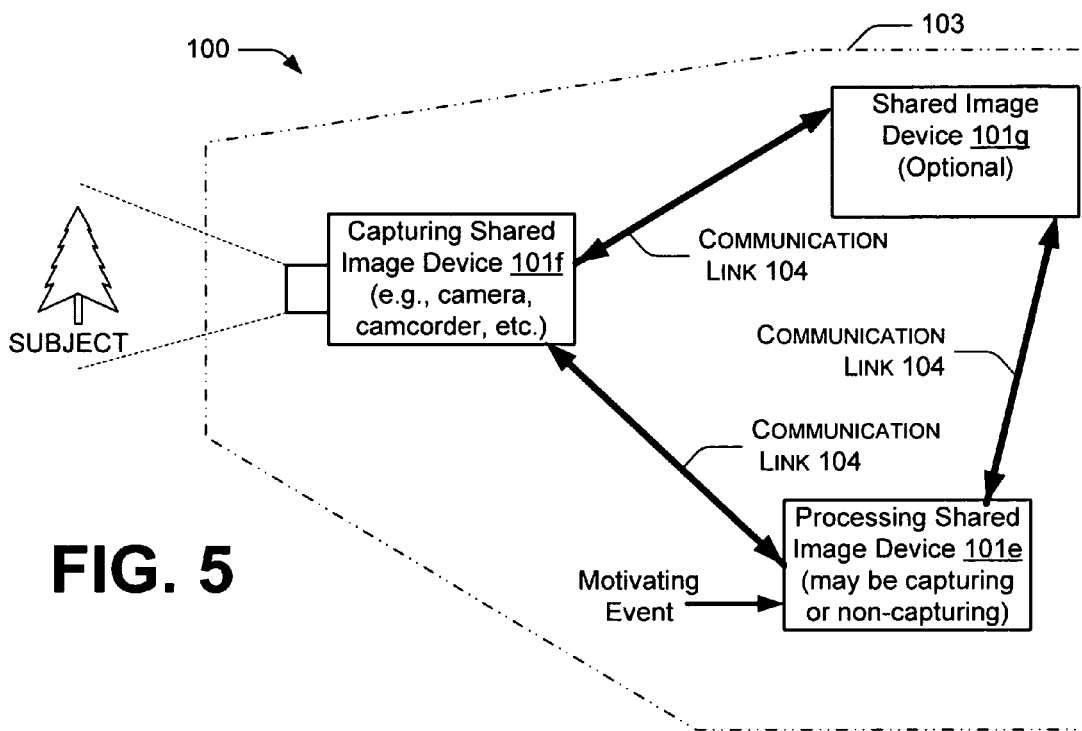
FIG. 5 is a block diagram including one embodiment of a shared image network including a processing shared image device.

FIG. 5 is a block diagram including one embodiment of a shared image network 100 including, but not limited to, a processing shared image device 101e and a capturing shared image device 101f. In this disclosure, the verb modifying the noun shared image device (e.g., "capturing" in a capturing shared image device, "processing" in a processing shared image device, "designating" in a designating shared image device, etc.) describes an operation that the shared image device can perform. The shared image device may be configured to perform other operations. For example, a capturing shared image device may capture images, but it may also store, process, distribute, designate, and/or perform other operations on shared images. Also shown in FIG. 5 is a shared image device 101g that can transfer images between other ones of the shared image devices 101f and 101e via certain one(s) of the communication links 104. In different embodiments, the communication links may be fashioned, for example, as a wireless link, a wired link, an Ethernet connection, a token-ring connection, or any other generally known networking connection. The shared image devices 101e, 101f, and/or 101g, as described with respect to FIG. 5, can be located within the sharing region 103. The sharing region 103 may be considered as a geographic region where shared image devices can share shared images contained in one to another shared image device. Each of the shared image devices 101e, 101f, and/or 101g may be configured as any of the variety of shared image devices 101, as described within this disclosure. Shared images that are stored in certain shared image devices can be processed, as described, utilizing the processing shared image device. As such, consider that a processing shared image device 101e (which misses a portion of a sharing session either by arriving late to join a sharing session, by not being present during a portion of a sharing session, or by departing early from a sharing session) can process to obtain captured shared images from the capturing shared image device 101f. The processing shared image device 101e can also indirectly receive shared images from the capturing shared image device 101f via a sharing (e.g., intermediate) shared image device 101g, as described with respect to FIG. 5.

Within this disclosure, "processing shared image devices" may be considered as those shared image devices that can process shared images. Examples of processing, such as can be performed by a processing shared image device, include imaging to change resolution, filtering, modifying image color, modifying image brightness, etc. Within this disclosure, each shared image device referenced by the number 101, followed by a letter (e.g., 101a, 101b, 101c, etc.), represent an example of the shared image device 101, as described within this disclosure. In certain instances but not others, a shared image device can be configured to perform multiple functions. For example, a processing shared image device 101e for one set of images as described with respect to FIG. 5 can be quickly transitioned to become a capturing shared image device 101f, or alternatively a shared image device 101g, for another set of images. In addition, for such events as a news conference or an awards ceremony, it may be necessary to have a fewer number of capturing shared image devices that are each configured to capture images, as processed by, for example, one or more processing shared image devices 101e.

Different embodiments of shared image devices 101 can obtain some or all of the images made available by other shared image devices for a variety of reasons. For example, certain shared image devices have limited memory, and as such are available to download a relatively small number of images that can be provided during the sharing session. In addition, a particular sharing session may involve a large number of shared image devices, at least certain ones to which may be capturing a large number of images. As such, it may be undesirable to have to proceed through all of the images taken by all of the shared image devices during the sharing session. As such, a filter mechanism may be used to forward, or receive, only those images that are desired to a particular shared image device.

It is likely that within a single sharing session, similar shared images may be stored in different versions, (e.g., certain ones of the different versions of images can be stored having a different amount of data such that different versions of the same images can have different resolutions). As such, a particular shared image device may capture a relatively high-resolution version of an image pertaining to the owner's friends or family, but may contain a considerable number of lower resolution images pertaining to others at the event. With different versions of similar images relating to a shared session, it may be desired to change versions, but such transitions as changing versions have to be balanced such that, for example quality of images are balanced against battery life, storage life, etc. Synchronizing such as provided by certain embodiments of synchronizing shared image devices 101r (see, e.g. FIG. 21) provides a mechanism that allows owners of a particular shared image device to obtain those particular images from the shared session that are desired.

One architecture for an "arena scenario" using shared image devices 101, for example, is one in which the sharing region or venue is configured with one or more capturing shared image devices 101f that are configured to capture raw images. The captured images can be fed to a shared image device 101g that can share the shared image with a processing shared image device 101e. In this configuration, the designation by the designating device is passed through the intermediate device (possibly utilizing logic such as with hardware, software, and/or firmware, e.g. to decide which actual capturing device to use to capture). The captured image can then be routed back through the central device (possibly with considerable processing and even the generation of alternate images from the same "captured" one).

Examples of (Attribute) Designating Shared Image Devices

Figure 6:
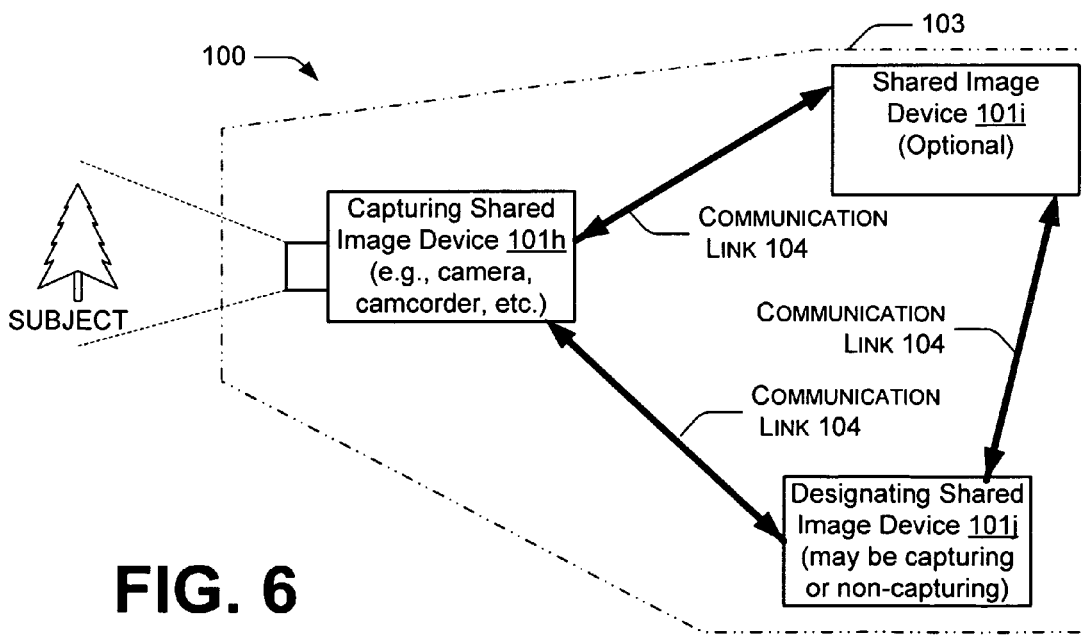
FIG. 6 is a block diagram including one embodiment of a shared image network including a designating shared image device.
Figure 13:
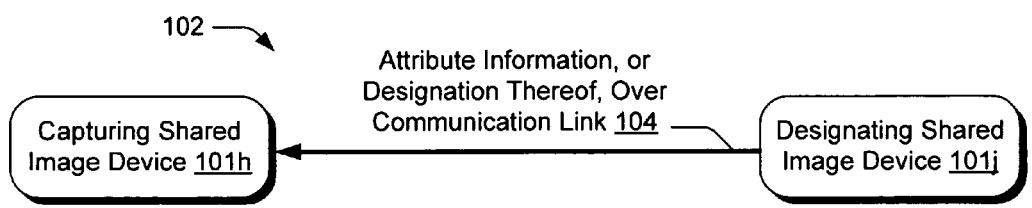
FIG. 13 is a schematic diagram of an embodiment of the shared image network including a designating shared image device.

FIG. 6 shows one embodiment of the shared image network 100 that can include at least one attribute designating or designating shared image device 101j as described with respect to FIG. 13, at least one capturing shared image device 101h, and perhaps at least one intermediate shared image device (not shown). The shared image devices 101h and/or 101j can be located within the sharing region 103 as illustrated in FIG. 6, and as described with respect to FIG. 5. In certain instances, certain ones of the shared image devices 101h and/or 101j can communicate with each other either directly or via an intermediate device, over the communication links 104.

In certain instances, the designating shared image device 101j as described with respect to FIG. 13 can be configurable to designate one or more attributes that the capturing shared image device 101h can utilize to capture shared images. It is to be emphasized that many shared image devices can perform different functions with respect to different images. For example, a designating shared image device 101j that designates a first set of images can be reconfigured as a capturing shared image device 101h, or alternatively as a shared image device 101i for yet another set of images. Within this disclosure, a fluidity of function between two shared image devices can be more relevant than dictating which particular shared image device captured a particular image. For example, for such events as a news conference or an awards ceremony, it may be necessary to have a fewer number of capturing shared image devices be configured to capture other images, as designated by, for example, the designating shared image devices 101j.

Examples of these attributes that the designating shared image device 101j can designate at a capturing shared image device include, but are not limited to: format, pixel depth, subject, captured region, event, cost (e.g., payments), rights, creator, owner, size, transformation, use (e.g. providing a buddy icon on a desktop background that allows multiple shared image devices to controllably share images therebetween, but not with other non-buddy shared image devices), attachments (e.g., audio or certificates), promotions (e.g. certain shared images might contain a coupon), use (e.g. image might be usable in a game, or serve as a ticket). For example, it may be desired for the designating shared image device 101j to communicate a designation to the capturing shared image device 101h that its user wishes images to be captured at a particular location, including certain individuals, etc.

Alternatively, the designating shared image device may designate their request to take one or more still images or moving images at a particular time within this field of view.

Another likely designating scenario includes the "arena scenario". In this scenario, the designation by the designating shared image device can be inserted embodiments, or might not be, passed through the intermediate shared image device (possibly utilizing logic such as a with hardware, software, and/or firmware to, e.g. designate which attribute to designate to the capturing shared image device to be used to capture images). The captured image can then be routed back through the shared image device 101i (possibly with considerable processing and even the generation of alternate images from the same capturing shared image device 101h).

Virtually any attribute that can be controlled to effect an operation of a shared image device, such as a camera, to be designated by the designating shared image device 101j. For example, F-stop, flash operation, zooming operations, etc. represent certain, but not all, attributes (which may be implemented using digital and/or analog imaging technology) that can be designated to the designating shared image device.

Examples of Motivating Events for Designated Attrributes in Shared Image Devices Motivating events represent an indication, which can be originated by a user or some automated/controlling mechanism, that can be used to generate one or more designated attributes to determine how a shared image is to be modified. In certain embodiments but not others, motivating events can be transmitted between shared image devices in a manner that can allow certain shared image devices to effectively effect operations (e.g., capturing, storing, retrieving, etc. relative to share images) between one or more shared image devices.

Examples of Shared Image Devices Whose Operations Rely on Proximity

In certain embodiments, various users can thereby transfer video, images, or some other type of information based on the proximity of shared image devices 101. Any combination of a plurality of capturing shared image device(s) and/or peripheral shared image device(s) can utilize proximity therebetween to establish the sharing mechanism 102. Such proximity may be utilized in, for example, establishing sharing regions 103 of the type as described with respect to FIG. 1. A variety of embodiments of the shared image device 101 can thereby rely on a variety of types of proximity between multiple sharing ones of the shared image devices to allow their sharing such as described in the above-incorporated U.S. patent application Ser. No. 11/069,909. Regional proximity pertains to a proximity of at least one shared image device within a sharing region, such as described in the above-incorporated patent application Ser. No. 11/122,274, entitled REGIONAL PROXIMITY FOR SHARED IMAGE DEVICE(S). The embodiment of geographic proximity, proximity utilizing a communication link 104, and/or proximity utilizing passwords, pass-phrases, patterns on paper, and the like as described within this disclosure with respect to FIGS. 1 to 4 can vary, and serve as examples of proximity between shared image devices.

A variety of embodiments of the shared image network 100 are described herein such that a number of shared image devices 101 are contained within the sharing region 103 (see, e.g., FIG. 5 or 6). Within this disclosure, the sharing region 103 can represent two-dimensional or three-dimensional geographic area or volume in which the shared image devices are intended to operate. The sharing region can be set differently in a variety of embodiments such as, for example, for a fixed time duration, or for as long as a shared image device, or another device, is positioned proximately of the sharing region. In certain embodiments, a particular user can set up a sharing region as desired based on, for example, global positioning system (GPS) coordinates, field of view of one or more shared image devices, defined locating relative to a particular building or structure, etc. A variety of configurations of sharing regions 103 (see, e.g., FIG. 1) are described herein, including those sharing regions that are established with respect to a shared image device, those sharing regions that are established with respect to a fixed area, and/or those sharing regions that are established with respect to a combination of a shared image device and a fixed area. If in certain embodiments, positional information such as provided by a global positioning system (GPS), Loran, etc., can be utilized to determine positional coordinates of the sharing region. In certain embodiments, processing can be utilized to provide positional information.

In certain embodiments, any shared image device of the type being utilized by the sharing session that is within the sharing region may be allowed to join the sharing session. In other embodiments, the user of the shared image device may have to provide a password to join the sharing session. In still other embodiments, the user of shared image device can provide a sharing password in addition to being within the sharing region to join the sharing session. As such, there are a variety of permissible techniques that can be utilized to join the sharing session, that are within the intended scope of the present disclosure.

In certain instances, but not others, a particular sharing region 103 as described with respect to FIG. 1 may be temporarily and/or geographically defined to correspond to a particular sharing session. As such, a sharing session may be established relative to a particular geographic location for a particular duration, such as within a child's house for a duration of a birthday party, or within a reception area for a duration of a wedding. In certain instances but not others, the sharing region in the sharing session can thereby be geographically related to the particular area for the duration of the session, such as a particular person's house, park, building, commercial setting, sports event, business event, etc.

In many embodiments, the term "proximity" indicates that shared image devices 101 are sufficiently close to operably couple with each other and/or other devices within the sharing region, such as to establish a communication link 104. In certain embodiments, a wireless link can provide the geographic proximity that allows data transfer of the shared images or portions thereof.

In one embodiment, the multiple shared image devices 101 can operably couple within the shared image network 100 using a series of communication links 104; different embodiments of the communication links are described with respect to FIGS. 1 to 4. A variety of embodiments of optical communication links 104 are within the intended scope of the present disclosure. Different embodiments of the communication link 104 can include, for example: a wireless link, an 802.11-based link, an infra-red data transfer link, a wired-based link, a physical-contact sharing mechanism that can transmit data upon physical contact, or any other type of link that allows for sufficient data to be transmitted between pairs of shared image devices 101.

Certain embodiments of the wireless communication link can utilize a variety of electromagnetic radiation to transmit data. The electromagnetic radiation that provides one embodiment of the wireless communication link 104 can include, but is not limited to, infrared, ultraviolet, near infrared, and/or optical signals. In one embodiment, a devoted optical communication link can cause data corresponding to the images to be transmitted between respective shared image devices. The communication link 104 can be configurable, in one embodiment, to operably couple a transmitting shared image device to a receiving shared image device. The transmitter, receiver, and/or transceiver portions of the communication link are to be configurable to carry sufficient data over the communication link considering the current task and/or network configuration.

In another embodiment, a camera flash or other optical source (e.g. an LED element) can act as a communication link. The intensity of the optical source such as can be modulated between different levels (including, but not limited to, turning the flash on and off) to transfer a variety of shared image data. Such directing of the optical source in a suitable direction should act such that reflected light does not interfere with the modulated incident light produced by the optical source.

One advantage of using certain embodiments of the camera flash or other such wireless link is that multiple receiving shared image devices can simultaneously obtain shared images from a single transmitting shared image device (e.g., by the multiple receiving shared image devices receiving the same camera flash or other optical-link that is configured to transmit data substantially simultaneously).

In many embodiments of the interrelated shared image devices 101 as described with respect to FIGS. 1 to 4, the authentication of multiple shared image devices 101 implies that the shared image devices 101 be sufficiently closely spaced (considering the technology to be utilized) to allow communications therebetween and/or within the sharing region, such as over the particular communication links. The shared image devices can rely on authentication and/or authorization to share images, image information, etc. with other shared image devices. Such authentication and/or authorization can often be inferred by geographic proximity, password proximity, and/or other types of proximity as described within this disclosure between multiple ones of the shared image devices depending upon the particular situation (while in other embodiments, this is not true). As such, in certain embodiments, shared image devices 101 that are associated with a particular wedding, children's birthday party, business meeting, or other event, etc. may establish the implicit/explicit authorization or authentication between multiple shared image devices. Such authorization or authentication may be based at least partially on the geographic (e.g., physical) proximity between shared image devices, and at least partially result from those shared image devices being located at the same event or sharing session, as/or within the sharing region. In many instances, the level of authentication or authorization for many shared image device events, such as birthday parties, may be assumed to be relatively low, while in others it may not. Many of the concepts described herein can expand into other forms of geographic or temporal proximity depending upon the particular technology to be used.

Different embodiments of geographic-based proximity can range to a variety of dimensions including from within inches, to in the same room, to within the same building, to be capable of accessing the same wireless LAN, or to be in the same stadium, part of a city, or beyond depending upon the technologies associated with the particular application or the communication link. In considering the application of certain commercially available transmitter/receiver capabilities, Bluetooth (a trademark of the Bluetooth Special Interest Group, a trade association) has an effective range of approximately 10 meters. Wireless Fidelity (WiFi, refers in this disclosure generically to any type of 802.11 network) can be located in a house or building, and can have an arbitrarily large range (especially by locating replicators or repeaters in each communication link 104 between multiple pairs of shared image devices 101). As such, shared image devices 101 can effectively communicate to each other through relatively extensive communication links 104 of variable dimensions. If a particular shared image device 101 has WiFi capabilities, the shared image device can have access to the Internet.

Figure 21:
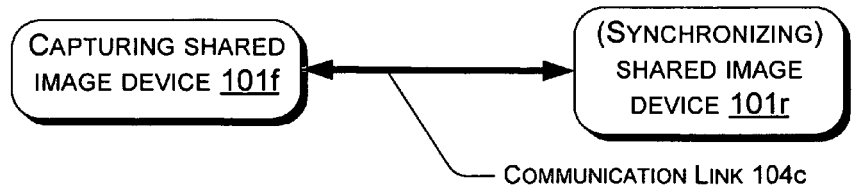
FIG. 21 shows a block diagram of one embodiment of multiple shared image devices.
Figure 22:
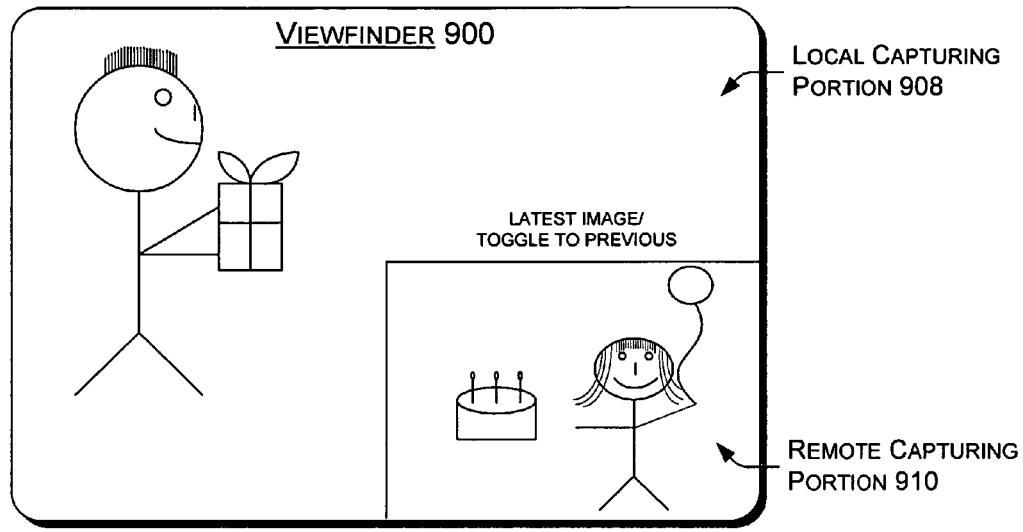
FIG. 22 shows a front view of one embodiment of the viewfinder.
Figure 23:
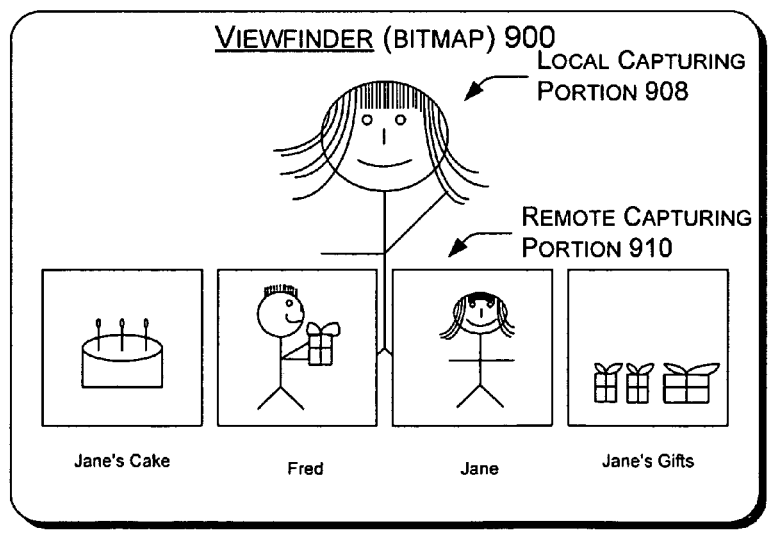
FIG. 23 shows a front view of another embodiment of the viewfinder.
Figure 24:
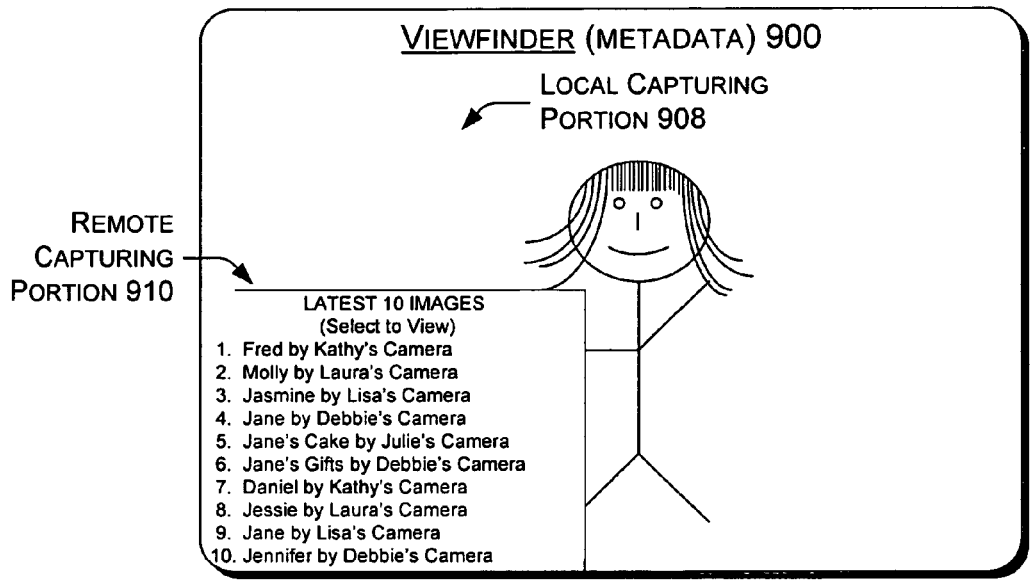
FIG. 24 shows a front view of yet another embodiment of the viewfinder.

If the shared image network 100 is established as a close-proximity shared image network, each user can be provided with their individual "shared image device" 101 that can each be somehow proximally located with respect to the sharing image network during its sharing session. Each shared image device can be configurable to join the sharing session, and thereby can act as a synchronizing shared image device 101r as illustrated in FIG. 21 that synchronizes to the current shared image devices.

In certain embodiments but not others, one shared image device 101 can continuously have its sharing mechanism actuated as to be in a sharing state. For example, a user can walk into a room, a building, and outside area, or another two-dimensional or three-dimensional area which contains a number of friends or associates that are currently enrolled in the sharing session, position the new shared image device 101 within the proximity of at least one of their shared image devices, and the shared images can be transferred utilizing such a technique such as being synchronized or quick-synched to the new shared image device 101 over the communications link. Such areas can be described relatively to some geographical area (e.g., a sharing region, relative to one or more other shared image devices, or relative to a field of view from a particular at least one shared image device).

Certain commercially-available cellular phones include embedded cameras (therefore providing photographic capabilities) that can be configurable such that the images are transferred from that camera cellular phone to at least one other camera cellular phone, at least one land-phone, or at least one other receiving device using either a wireless, or some other suitable, connection. Many of these commercially-available camera cellular phones can thereby be considered to "push" one or more images to another device (such as a cellular phone, a computer, a personal display assistant (PDA), etc.) with a display. Such transfer mechanisms that "push" these pictures utilize the Internet, e-mail, or a similar file-transfer addressing mechanism (e.g., e-mail address or some associated addressing scheme). In certain embodiments, addressing the data associated with photographs can take some time, while in other embodiments such addressing is simplified. Addressing can be challenging in situations where the address of the recipient shared image device 101 is unknown or inaccessible. Certain embodiments of shared image devices can utilize addressing mechanisms.

Many embodiments of shared image devices 101, as described in this disclosure with respect to FIGS. 1 to 4, that include the sharing mechanisms 102 can transfer copies of shared images to at least one other shared image device 101. Such transfer of copies of shared images can thereby allow accessing of certain images, videos, audio, and/or other types of media produced by the other shared image devices 101 during a prescribed sharing session. Many embodiments of shared image devices 101 do not provide an addressing mechanism to transfer the shared images between different ones of the sharing devices (e.g., capturing and/or peripheral devices) during a particular sharing session. As such, a broadcast transfers data between many of the embodiments of the shared image devices. FIGS. 1 to 4 show a number of embodiments of the shared image networks 100, each of the sharing image networks can include a number of similarly configured shared image devices 101, in which each of the shared image devices includes its respective sharing mechanism 102.

Within this disclosure, certain embodiments of capturing shared image devices can be considered as similarly configured while others are not. Similarly, any embodiments of peripheral shared image devices can be considered as similarly configured while others are not. In this disclosure, the terms "similarly configured", "similarly configurable", or alternatively "similar" as applied to many embodiments of the shared image devices 101, can pertain to how each shared image device 101 processes or relates to its respective shared images. For example, certain embodiments of digital cameras, camcorders, video cameras, etc. can be configurable as capturing shared image devices that are capable of capturing, transferring, retaining, or obtaining such shared images as still images or motion images. In the embodiment as described with respect to FIGS. 1 and 2, shared image devices 101 are each configurable to be similar in general structure or operation, such that each shared image device is configurable as a capturing device such as a digital camera or camcorder that can be connected using, for example, point-to-point techniques or master-satellite techniques. Each capturing shared image device can capture, photograph, display, generate, receive, or process similar shared images such as digital images or video.

In many imaging situations, the resolution, imaging quality, and imaging characteristics of shared images are dependent on that particular shared image device that is performing the imaging. As such, even though shared image information may be shared between multiple shared image devices, the imaging quality of that shared image depends on the particular shared image device that images or captures (e.g., photographs) the shared information. As such, it may be desirable to capture many of the images with a high-quality shared image device (e.g., a relatively expensive high resolution imaging device) by using a number of shared image devices of the types as described in this disclosure.

Under different circumstances, certain users of the shared image devices may desire to store a relatively large number of captured images within their shared image device. As such, it may be desirable to utilize lower-resolution shared image devices to capture lower-resolution versions of certain images.

In certain instances, an optimal resolution of the images that may be captured by the different shared image device(s) may not be a deciding factor for a potential user selecting to share images with a particular shared image device. Perhaps a particularly good photographer is known by others to be using a particular shared image device. Alternately, perhaps a shared image device is capturing a particularly desirable subject. In certain instances a particular shared image device can take excellent pictures under certain circumstances, for some known or unknown reason. Certain capturing shared image devices may rely upon an optical or a software-base zooming technique. As such, many participants in the sharing session may be interested in obtaining such shared images based on their inherent quality or value.

The combination of the shared image devices for a particular sharing session, as described in this disclosure, provides a technique by which one or more particular shared image devices can be selected to capture a particular shared image of a type such that shared image device may be the most appropriate.

Many embodiments of digital cameras can capture, process, display, generate, or receive digital images. Certain peripheral shared image devices 120 (e.g., printers, fax machines, PDAs, copiers, etc.) may generally be considered as a peripheral device, and not a similar device to digital cameras since such peripheral shared image devices cannot capture shared images, and can only perform such peripheral functions as printing, retaining, or displaying shared images. A sharing mechanism may be configurable to convey shared image information either alone, or in combination with audio, data, or a variety of other types of information as described herein.

The embodiment of the shared image network 100, described with respect to FIG. 1, can be referred to as a master-satellite configuration since one of the shared image devices 101 is designated as, and acts as, a master shared image device 101*a* for a particular sharing session. The master shared image device can receive the shared images generated either alone and/or with other ones of the satellite shared image devices 101*b* that are designated in FIGS. 1 and 3 as 101*b*. The satellite shared image devices 101*b* can be operatively coupled to the master shared image device 101*a* such that in the certain embodiments. Certain ones of the portions of the shared images, that may have been captured or created by the shared image devices 101, can be shared as desired among the satellite shared image devices 101*b*.

In certain embodiments, the satellite shared image devices 101*b* can also receive certain ones of the shared images that have been captured by other ones of the shared image devices 101. Certain embodiments of such satellite shared image devices can receive lower resolution versions of the received shared images that have been captured during the sharing session.

Figure 3:
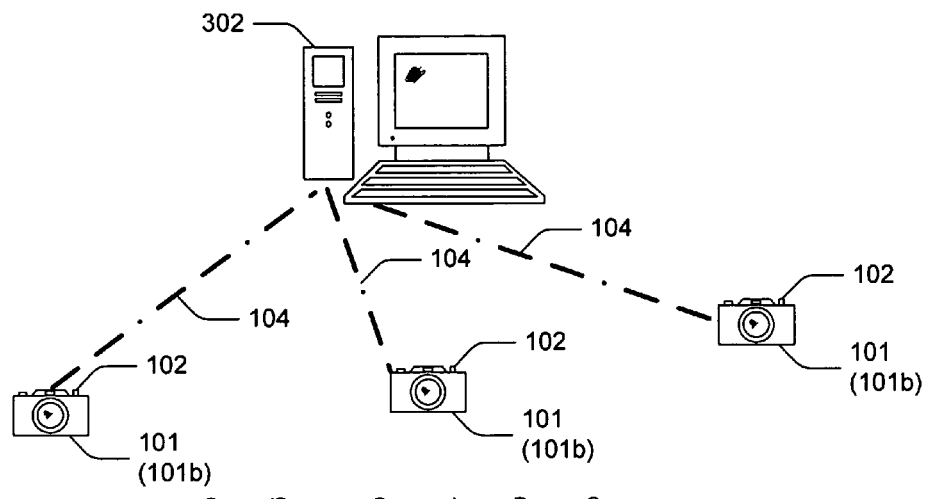
FIG. 3 shows a schematic diagram of yet another embodiment of the shared image network that includes a plurality of shared image devices.

In the embodiments of the shared image network 100 that is described with respect to FIGS. 1 and 3, each similar satellite shared image device 101*b* can be operably coupled to the respective master shared image device 101*a* or computer or controller 603 (e.g. of FIGS. 7 and/or 15) by, for example, a respective signal connection such as the communication link 104. The communication link can be functionally subdivided into a transmitter portion and/or a receiver portion, or alternatively a transceiver portion that is secured to each shared image device. Certain embodiments of the master shared image devices 101*a* can thereby control, to some degree, the shared images that can be received by each particular satellite shared image devices 101*b*. In other embodiments of the shared image network 100 that include a master shared image device 101*a*; a signal connection such as the communication link 104 can also extend between certain ones of the satellite-shared image devices 101*b*.

Each communication link 104 should provide sufficient bandwidth to ensure effective transfer of the shared images (e.g., images, portions of the images, metadata, video segments, and/or video stills) between the appropriate shared image devices 101. Providing such effective shared image transfer can ensure satisfactory operation of the shared image network 100 as described in this disclosure.

Figure 2:
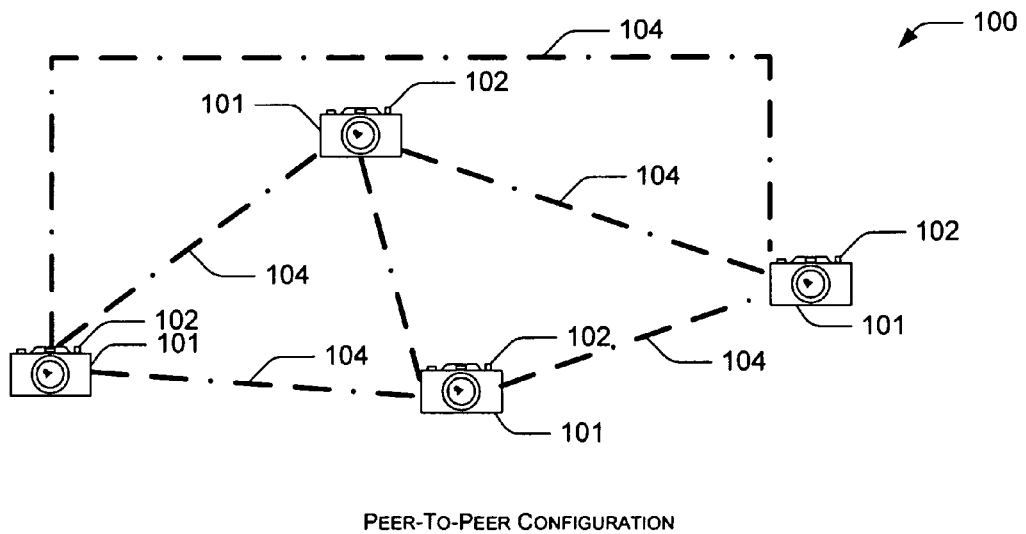
FIG. 2 shows a schematic diagram of another embodiment of the shared image network that includes a plurality of shared image devices.

FIG. 2 can be considered to show one embodiment of a peer-to-peer shared image network 100, in which each shared image device 101 can connect to at least one other shared image device by at least one communication link 104. In certain embodiments of the peer-to-peer shared image network 100, indirect connections (such as multiple communication links 104) can extend, in series, between multiple pairs of shared image devices. Such communication links 104 can therefore transmit shared images between multiple pairs of serially-extending shared image devices 101 or over multiple serially-extending communication links 104.

The embodiment of the shared image network 100, as described with respect to FIG. 2, includes a number of shared image devices 101 that may act as a peer-to-peer network.

Certain embodiments of peer-to-peer shared image networks can be configurable in which each shared image device can perform both those functions that are traditionally associated with a server device and those functions that are traditionally associated with a client device. As such, in many embodiments, shared images can pass between different ones of the peer-to-peer arranged shared image devices relatively freely as to be available to any member shared image device of a particular sharing session.

In certain embodiments of the shared image network 100, each shared image device 101 can be configurable to be capable of accessing the shared images captured by other ones of shared image devices 101 during the sharing session.

As described with respect to FIG. 2, the peer-to-peer configuration may be desired for relatively simple device configuration, set-up, and use; and may also be desirable since no mechanism can be provided in certain embodiments to reduce the number of shared images that are being transmitted by any one of shared image devices 101. Certain embodiments of the peer-to-peer model may be easier to implement since with the peer-to-peer model, each shared image device 101 (such as a digital camera) can be configurable to operate similarly to the other shared image devices. In many instances with the peer-to-peer model, no single shared image device overviews the entire operation of the shared image network. Instead, all the shared image devices interact to provide the sharing, according to peer-to-peer concepts. For example, the different shared image devices in a peer-to-peer network can be configurable to operate similarly, and can be configurable to act as either a client and/or a server at any suitable particular time during shared image network operations.

FIG. 3 can be considered to show another embodiment of the shared image network 100 that includes a number of shared image devices 101. This embodiment is similar to the embodiment as described with respect to FIG. 1, with the exception that the master shared image device 101a can be configured as a dissimilar device such as a peripheral device (e.g., a computer or controller 603 of FIG. 7 or 15 instead of another type of shared image device 101). In different embodiments, the computer or controller 603 may be configured as any type of recognized computing device including, but not limited to: a desktop, a laptop, a workstation, a personal display assistant (PDA), a microprocessor, a microcomputer, etc. The computer or controller 603, as well as other shared image devices, can provide a store-and-forward operation by controllably storing for some duration (regardless of how temporary or permanent is the duration), optionally processing, and then forwarding the shared images. There can additionally be intermediate shared image devices, or other devices, located between multiple shared image devices. Under certain circumstances, especially where there are a considerable number of shared image devices generating many shared images, the FIG. 3 embodiment that relies on the computer or controller 603 to provide processing, filtering, etc. may be desired. Such networking concepts relating to computers, clients, servers, and data transfer between computers as are generally well-known, and will not be further detailed in this disclosure. One purpose of the computer or controller 603 with respect to the shared image network 100 is to obtain or retain the shared images generated by the other shared image devices 101, and thereupon provide for the retrieval of the generated shared images.

Certain computers acting as servers might be named based on the data that they can store or produce (e.g., file servers, data servers, web page servers, etc.). As such, certain embodiments of the computer or controller 603 as described with respect to FIG. 3 can act as a shared image server. One aspect of using certain embodiments of the computer or controller 603 instead of certain embodiments of master shared image device 101a (in a master/satellite configuration) is that certain embodiments of the computer or controller 603 is likely to be configurable to allow more varied image processing, data handling, or other operations.

As such, certain ones of the satellite shared image devices 101b can be configurable as the computer or controller 603 to be capable of handling queries relatively quickly and accurately. In certain embodiments, the users of certain shared image devices 101 can therefore include queries directed to the particulars of the sought shared images. Another advantage of certain computers or controllers 603 is that the storage capability of certain embodiments of the computers or controllers can substantially match a value of the number of captured shared images during a sharing session.

Example of Proximity-Based Sharing Between Shared Image Devices

This disclosure described a number of embodiments of proximity-based sharing techniques. One embodiment of a proximity-based sharing technique utilizes a computer or controller of the type described with respect to FIG. 7 or 15. Within the disclosure, flowcharts of the type described in this disclosure apply to method steps as performed by a computer or controller. The flowcharts can also apply to apparatus devices, such as a shared image device 101 that includes, e.g., a general-purpose computer or specialized-purpose computer whose structure along with the software, firmware, electromechanical devices, and/or hardware, can perform the process or technique described in the flowchart.

Since multiple shared image devices can share data (at least one that sends the shared image information and at least one that receives the shared image information), each shared image device can form a portion of the sharing mechanism. In certain embodiments, actuating the actuating mechanism of a sharing mechanism can cause a particular shared image device to share or publish to other similar shared image devices. Such sharing or publishing can occur even if there is not another shared image device in sufficiently close geographic proximity, based largely on inclusions of additional shared image devices (each of which includes a store-and-forward mechanism). The additional shared image devices can be configurable to allow serial data transmission through a sequence of such intermediate located shared image devices that operatively couple the terminal shared image devices. The store-and-forward mechanism can temporarily store data in one of these shared image devices, and can generate copies of stored shared images in the form of data from that shared image device following a desired prescribed duration.

Under certain circumstances, only one shared image device may be a member of a session. For example, if a user of a particular shared image device 101 is the first one to join a sharing session (e.g., get to an event such as a child's birthday party), then that first user may capture certain pertinent images, and the sharing mechanism allows others to access the pictures captured by the first user of a shared image device 101 at that sharing session. As such, at one particular time, only a single shared image device may join the sharing session, and effect sharing or copying of the shared images. Prior to a wedding or child's birthday, for example, a professional photographer may capture a number of images that pertain to preliminary events of that sharing session, and which would perhaps be desirable to other session members who would join that sharing session. In another instance, a leader of a business meeting may prepare a set of shared images prior to the meeting that relate to the meeting, and which would subsequently be accessible by other members of the meeting.

In other embodiments, at least two shared image devices 101 might establish a particular sharing session. For example, assume that multiple shared image devices can be configurable as disposable cameras whose session shared images can be shared, processed, and/or made accessible. In certain embodiments, but not others, multiple shared image devices (such as those of the disposable variety) can be sold together (e.g., in one package, in similar packaging, associated with a single display, by the same company, etc.) to be associated with a prescribed sharing session, such as a birthday, wedding, business event, etc.

Other embodiments of shared image devices are likely to be associated with a single owner for a longer duration, and can be provided with a controllable sharing mechanism to allow multiple shared image devices to be controllably configurable to interface with each other for a distinct duration of, e.g., a distinct sharing session. Many embodiments of the shared image devices can be controllably adjustably configurable to allow the shared image device to join another session. In certain embodiments, a single shared image device can even join multiple simultaneous sharing sessions.

In considering certain embodiments of the master-satellite configuration as described with respect to FIG. 1, the master shared image device (and perhaps not the satellite shared image device) can originally access the full resolution versions of the shared images as captured by each shared image device. In certain embodiments, satellite shared image devices can be provided with lower-resolution shared image versions such as, but not limited to: thumbnails of the shared images, portions of the shared images, miniaturized portions of the shared images, low-resolution versions of the shared images, metadata pertaining to the shared images, etc. The users at the satellite shared image devices (that can be configured either as capturing and/or peripheral shared image devices) can then select those shared images that they desire to obtain or retain.

The particular configuration of shared image devices and the shared images can largely represent a design choice based on intended usage, and networking or device configurations and operating characteristics. These particular configurations can be selected depending upon the particular sharing session, event type, shared image device 101 type or other operational characteristic, and can be selected by the "owner" or other participants of each particular sharing session. In some embodiments where a satellite shared image device has insufficient memory storage to store the full versions of the shared images that have been captured for a particular sharing session, the master shared image device can be provided with sufficient data storage to contain the full versions of the shared images that are being captured during the sharing session.

In certain embodiments but not others, at least some of the shared images that are being stored at the master shared image device will have the highest resolution available so that when particular full image versions are requested from the at least certain other ones of the shared image devices 101, the particular requested images can be provided.

In certain embodiments of the shared image networks of shared image devices 101 (while not with other embodiments), one purpose is to ensure those shared images captured by each one of shared image devices have been accessed, captured, stored, printed out, or has undergone some desired action. As such, in certain embodiments, each shared image device 101 may not obtain all the copies of each shared image generated by every shared image device for that sharing session. As such, in certain embodiments, it may be useful for a user of at least one shared image device 101 to provide a peripheral device (such as a printer or portable image storage device such as a CD drive) at a sharing session. The peripheral device may thereupon print and/or obtain and/or retain the desired shared images for each user of the member shared image devices 101 that are associated with the sharing session who wish to have the images in printed or stored form.

In one embodiment, a shared image device 101 can include a timeout mechanism for many, all, or certain sharing sessions. As such, if a user of a shared image device 101 leaves the sharing session, they may forget to deactivate the sharing mechanism, and then in certain embodiments the timeout mechanism can deactivate the shared image device with respect to the sharing session after a prescribed amount of time. Certain embodiments of the sharing session can include multiple shared image devices 101 that each includes a timeout mechanism such that the sharing session terminates soon after the last member of the sharing session (and their shared image device) leaves the proximity of the session.

Examples of Sharing Images with Peripheral Shared Image Devices

Figure 4:
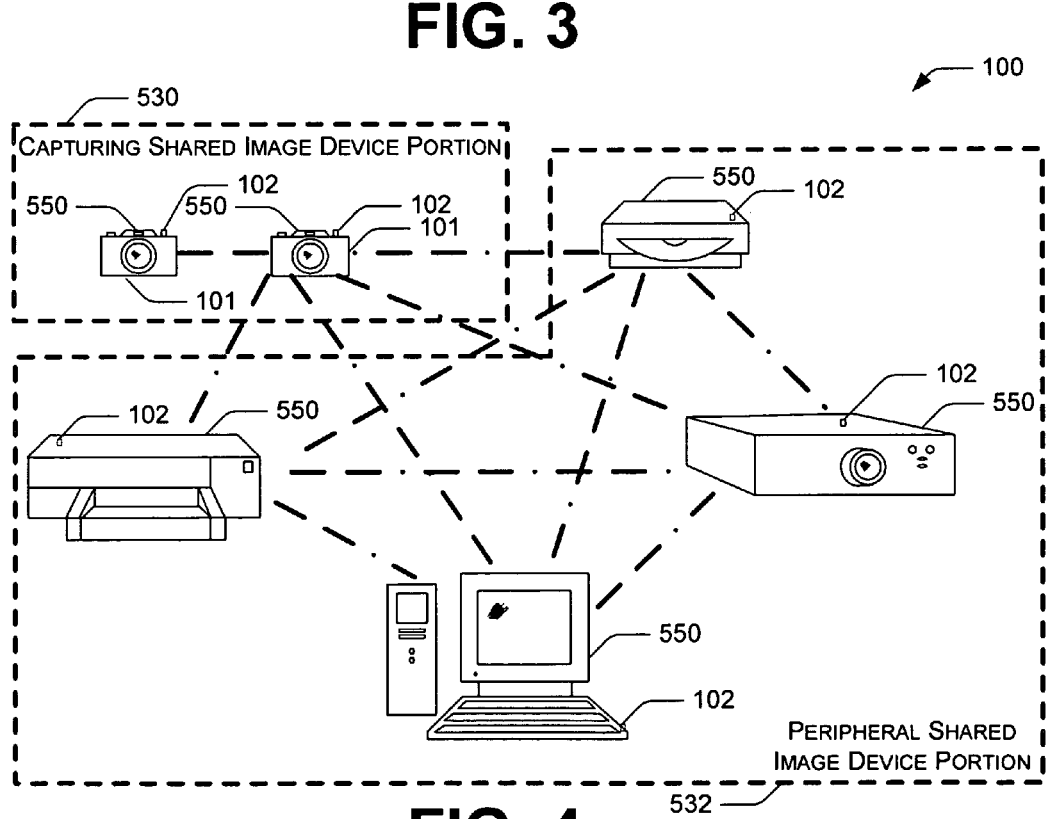
FIG. 4 shows a schematic diagram of yet another embodiment of the plurality of shared image network that includes a plurality of shared image devices.

FIG. 4 shows another embodiment of the shared image network 100 that can include a number of shared image devices 550, in which many of shared image devices 550 are incapable of capturing images and are thereby are in many ways dissimilar from those embodiments of the capturing shared image devices, and can be referred to herein as "peripheral shared image device". As described with respect to FIG. 4, one or more shared image devices 550 that are configurable as a peripheral shared image device can be contained within a peripheral shared image device portion 532. The number of shared image devices 550 that are included within the peripheral shared image device portion 532 as described with respect to FIG. 4 provides a number of examples of peripheral shared image devices. Additionally, one or more shared image device 550 that are each configurable as a capturing shared image device can be contained within a capturing shared image device portion 530. The number of shared image devices 550 that are included within the capturing shared image device portion 530 as described with respect to FIG. 4 provides multiple examples of capturing shared image devices. Those shared image devices that are contained within the capturing shared image device portion 530 can be configurable as capturing shared image devices, to primarily capture images (e.g., capture images, image information, or photographs). Those shared image devices that are contained within the peripheral shared image device portion 532 can be configurable as peripheral shared image devices, which are primarily configurable to perform some other function to the shared images from capturing including, but not limited to, obtaining, retaining, storing, displaying, transferring, printing, segmenting, and otherwise processing. Certain shared image devices 101, such as a peripheral shared image device 550 (for example a memory drive device or computer) as contained within the peripheral shared image device portion 532, or alternately, certain capturing shared image devices 550 as contained within the capturing shared image device portion 530, are configurable to store and/or store and forward the shared images.

FIG. 4 provides an example of a network configuration including a plurality of shared image devices 101 in which at least one device operation of a capturing shared image device (e.g., which are contained in the capturing shared image device portion 530) can be controlled by one or more peripheral shared image devices. Such control can be contained in the peripheral shared image device portion 532. Examples of the device operation that can be controlled include, but are not limited to, altering an operation, altering a shutter control operation, altering resolution control, altering zoom control, altering an imaging-location-control operation (which can control where a remote camera and/or the user thereof is taking an image), etc. In effect, this disclosure provides a mechanism by which control device operations such as are performed in capturing shared image devices can be allowed in certain embodiments of remote shared image devices, such as certain peripheral shared image devices.

For example, it may be desired to couple a capturing shared image device such as a digital camera or camcorder with one or more peripheral shared image devices such as a printer, a projector, a computer, and/or a CD burner. Such a combination of dissimilar shared image devices might, or might not, be associated with a similar combination of shared image devices. For example, one or more shared image devices such as a digital camera can be associated with a dissimilar shared image device such as a printer, computer, or projector either for a particular sharing session or permanently.

Alternatively, one or more capturing shared image devices such as a digital camera or camcorder can be associated with a dissimilar shared image device such as a printer, computer, or projector. Each of these dissimilar shared image devices may be capable of utilizing the shared images in a distinct manner. However, each of the shared image devices 550 could also share similar shared images relating to a single group sharing session (such as digital images) in its own distinct manner.

In certain embodiments, the printer, or other peripheral shared image device, can be configured as a peer in a peer-to-peer configuration, or alternately as a master or satellite in a master-satellite configuration, during the sharing session. For example, one shared image device can be configurable as a capturing shared image device such as a digital camera or camcorder at the session to capture shared images from other capturing shared image devices as described with respect to FIGS. 1 to 4. In certain embodiments, but not others, the users can access other pictures based on the thumbnails or other reduced-resolution versions of the shared images that are provided. As such, a printer peripheral device can be used to print out, or a memory device can store, a certain number of the thumbnails, portion of images, or full shared images that can be selected by the user at one or more of the shared image devices 550. A projector can be configurable as a peripheral device that can project a variety of images relating to that session, as well as other images in certain embodiments. Peripheral shared image devices that can be configurable as a printer can print selected shared images from that same group sharing session. Yet other peripheral shared image devices that can be configurable as a CD burner or storage can more permanently store image information for a particular session.

From a high-level aspect and embodiment, a variety of distinct types of shared image devices can therefore utilize the sharing mechanism. As such, a single user might actuate a single sharing mechanism to cause a sharing of images between the printer and the digital camera (or other examples of commonly-controlled peripheral or capturing shared image devices). In certain embodiments, peripheral shared image device(s) can be networked with one or more capturing shared image devices that are owned by multiple users at a given sharing session. Consider that in some embodiments but not others, both the peripheral shared image device (e.g., printer) and at least some of the capturing shared image devices (e.g., digital cameras) rely upon the same sharing mechanism for the sharing session. In certain embodiments but not others, a peripheral shared image device that can be configurable as a shared image-server, and that could function to transfer stored image data back to another computer, could include a sharing mechanism with the other computer.

A variety of peripheral shared image device(s) 101 can store or display shared images that are produced by the capturing shared image device. In certain embodiments, a peripheral device such as a projector or television shared image device 101 can be associated with a digital camera or camcorder capturing shared image device to provide a slide show or movie including the shared images provided by the latter. In other embodiments, a digital video disk (DVD) recorder can burn a CD containing shared images provided by a digital camera or camcorder shared image device. These different embodiments of shared image devices that can be configurable as capturing and/or peripheral shared image devices can still be considered as dissimilar in certain aspects but perhaps not in other aspects.

Examples of the Computer/Controller

Figure 15:
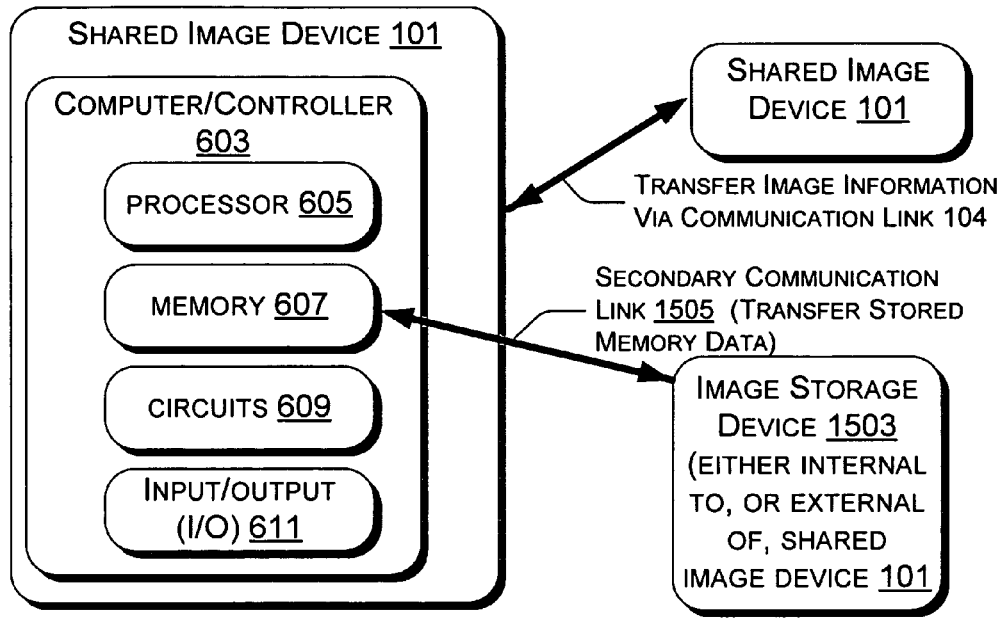
FIG. 15 shows a schematic diagram of one embodiment of a shared image device having a computer/controller that can be used as a portion of a sharing mechanism.

FIG. 7 or 15 show two embodiments of computer/controller 603 that can be included in certain embodiments of the shared image device 101 to assist in providing the sharing of at least portions of shared images between multiple shared image devices. Certain sharing-related aspects, such as processing, synchronization, and/or designation of aspects as described within this disclosure, can be performed by the controller 603. For example, each one of the two shared image devices 101, as described with respect to FIG. 7 or 15, provides an example of either a peripheral shared image device and/or a capturing shared image device. As such, in different embodiments, two capturing shared image devices can be operably coupled to each other, two peripheral shared image devices can be operably coupled to each other; or one peripheral shared image device can be operably coupled to a capturing shared image device in a manner that allows transmitting image information at, or receiving image information at each or both of the shared image devices 101.

As described within this disclosure, multiple ones of the different embodiments of the shared image devices 101 are able to transfer image information, one or more portions of images, etc. to each other via the communication link 104. One embodiment of the computer/controller 603 includes a processor 605 such as a central processing unit (CPU), a memory 607, a circuit or circuit portion 609, and an input output interface (I/O) 611 that may include a bus (not shown). Different embodiments of the computer/controller 603 can be a general-purpose computer, a specific-purpose computer, a microprocessor, a microcontroller, a personal display assistant (PDA), and/or any other known suitable type of computer or controller that can be implemented in hardware, software, electromechanical devices, and/or firmware. Certain portions of the computer/controller 603 can be physically or operably configurable in each shared image device as described with respect to FIGS. 1 to 4. In one embodiment, the processor 605 as described with respect to FIG. 7 or 15 performs the processing and arithmetic operations for the computer/controller 603. The computer/controller 603 controls the signal processing, database querying and response, computational, timing, data transfer, and other processes associated with the shared image device. In certain embodiments, one more simplified version of the controller 603 that can be provided with respect to FIG. 7 or 15, and that could be configured to provide a transfer of shared images between multiple shared image devices.

Certain embodiments of the memory 607 include random access memory (RAM) and read only memory (ROM) that together store the computer programs, operands, and other parameters that control the operation of the shared image device. The memory 607 can be configurable to contain the shared image information obtained, retained, or captured by that particular shared image device 101 (that may be configurable in different embodiments as the peripheral shared image device of the capturing shared image device). The bus is configurable to provide for digital information transmissions between the processor 605, circuits 609, memory 607, I/O 611, and/or the image storage device 1503. In this disclosure, the memory 607 can be configurable as RAM, flash memory, semiconductor-based memory, of any other type of memory that is configurable to store data pertaining to images. The bus also connects I/O 611 to the portions of the shared image devices that either receive digital information from, or transmit digital information to other portions of the shared image network 100.

Certain embodiments of the shared image device 101 as described with respect to FIG. 7 or 15 includes a transmitter portion (not shown) that can be either included as a portion of the computer/controller 603, or alternately can be provided as a separate unit (e.g., microprocessor-based). In certain embodiments, the transmitter portion can transmit image information between different shared image devices over wired and/or wireless communication links.

Certain embodiments of the shared image device 101 as described with respect to FIG. 7 or 15 includes an operation altering portion (not shown) that can be either included as a portion of the computer/controller 603, or alternately can be provided as a separate unit (e.g., microprocessor-based). Examples of operation altering portions include, but are not limited to, altering a resolution, altering a contextual library, altering an aspect ratio, altering a color intensity and/or brightness at a second shared image device (such as a capturing shared image device) by transmitting appropriate image information from a first shared image device (such as a peripheral shared image device).

The memory 607 can provide one example of a memory storage portion. In certain embodiments, the monitored value includes, but is not limited to: a percentage of the memory 607, a number of images that are stored in the memory 607, or for motion images a recording interval (audio or video recording intervals).

To provide for overflow ability for the memory 607 of certain embodiments of the shared image device 101, the image storage device 1503 as described with respect to FIG. 15 can operably couple to the memory 607 to allow a controllable transmitting of memory data from the shared image device 101 to the image storage device when the monitored value of data within the memory 607 (e.g., the memory storage portion) exceeds a prescribed value. The prescribed value can include, e.g., some percentage amount or some actual amount of the value. In different embodiments, the image storage device 1503 can be included as a portion of the shared image device 101, as external to the shared image device, or as electrically connected (such as by an electrical coupling) to the shared image device. Different embodiments of the image storage device 1503 can be configurable as a mobile random access memory (RAM) device, a flash memory device, a semiconductor memory device, or any other memory device (that may or may not be distinct from the memory 607) that can store images, image information, and/or any other data that can be stored within the memory 607.

In certain embodiments, a secondary communication link 1505 can be established between the shared image device 101 (for example, the memory 607) and the image storage device 1503. The secondary communication link 1505 can be structured similar to as the communication link 104, as described with respect to FIGS. 1-4, or alternatively can utilize network-based computer connections, Internet connections, etc. to provide data transfer between the shared image device 101 that includes the computer/controller 603, and the image storage device 1503. The secondary communication link 1505 can be established prior to, during, and/or following the existence of the shared session.

In certain embodiments of the shared image device 101, the particular elements of the computer/controller 603 (e.g., the processor 605, the memory 607, the circuits 609, and/or the I/O 611) can provide a monitoring function to monitor the amount of images and/or image information contained therewithin. Such a monitoring function by the shared image device can be compared to a prescribed limit, such as whether the number of images contained in the memory 607, the amount of data contained within the memory 607, or some other measure relating to the memory is approaching some value. The limits to the value can, in different embodiments, be controlled by the user or the manufacturer. In certain embodiments, the memory 607 stores motion images, video images, and/or audio images relating to, e.g., a motion picture, camcorder, video, or audio embodiment of the shared image device. In certain embodiments the measure relating to the memory approaching some value may pertain to some recording duration, such as video recording duration or audio recording duration. Using the recoding duration, certain embodiments of motion picture shared image devices can thereby quantify how many shared images, or other images, have been captured.

In certain embodiments, the I/O 611 provides an interface to control the transmissions of digital information between each of the components in the computer/controller 603. The I/O 611 also provides an interface between the components of the computer/controller 603 and different portions of the shared image device. The circuits 609 can include such other user interface devices as a display and/or a keyboard.

In other embodiments, the computer/controller 603 can be constructed as a specific-purpose computer such as an application-specific integrated circuit (ASIC), a microprocessor, a microcomputer, or other similar devices. A distinct computer/controller 603 can be integrated into certain embodiments of the shared image device 101, the share mechanism 102, and/or the communication link 104, as described with respect to FIG. 1 or 3.

In certain embodiments, the shared image device 101 including the computer/controller 603 can be configured as a peripheral shared image device. Such peripheral shared imaged devices can be configured to include sufficient image storage in the memory 607 to allow storage of the images for a session. Additionally, in certain embodiments the peripheral shared image device can transmit operational instructions (either computer based or manual) to instruct either a user at the capturing shared image device how to operate the capturing shared image device; or ultimately can automatically operate the capturing shared image device(s) according to the operating information or instructions. The operating information or instructions can include, but is not limited to, how many images to capture, where to capture (take a picture toward a specified direction), the subject of the desired image, zoom level, etc. In this manner, certain embodiments of peripheral shared image devices can effectively control the operation of an associated capturing shared image device by effective use of operating information.

Examples of Designating or Processing Shared Image Devices and Techniques

FIG. 13 illustrates one embodiment of a shared image device such as the capturing shared image device 101*h*, similar to and with certain similar reference characters as described with respect to FIG. 6, that is operable to receive attribute information of at least one shared image from a remote shared image device such as the designating shared image device 101j. The capturing shared image device 101h can be operable to capture at least one shared image at least partially in response to the capturing shared image device receiving the attribute of the at least one shared image. In certain embodiments but not others, the capturing shared image device 101h is operable to receive the attribute information of at least one shared image to be captured at least partially from at least one designating shared image device. The embodiment of the processing shared image device 101e, as described with respect to FIG. 14, can be operable to at least partially process an image such as, e.g., by processing a shared image that has been transmitted by another shared image device (such as the capturing shared image device 101h as described with respect to FIG. 6 or the capturing shared image device 101f as described with respect to FIG. 14) to capture one or more images. In certain embodiments, the operations performed by the capturing shared image device 101h and the processing shared image device 101e can be combined into a single processing/capturing shared image device.

Figure 14:
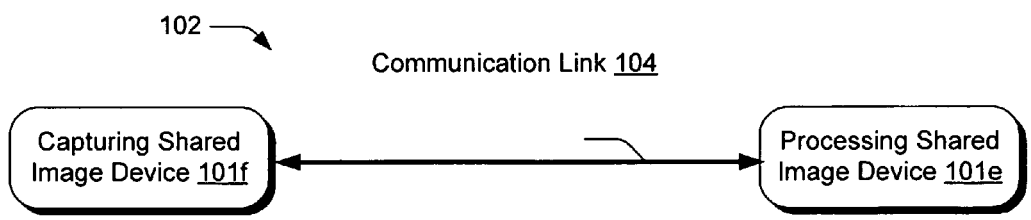
FIG. 14 is a schematic diagram of an embodiment of the shared image network including a processing shared image device.

In certain embodiments, an example of the processing shared image device 101e can be configured to receive a motivating event. Examples of the motivating event are described in the disclosure. In certain embodiments, the processing shared image device can provide an example of a shared image device that can transmit at least one designated attribute, wherein the at least one designated attribute can be effected at least partially in response to the receiving the at least one motivating event at least partially at the processing shared image device. In certain embodiments, the processing shared image device can be configured to obtain an obtained shared image in accordance with the at least one motivating event, and is obtained at least partially in response to the transmitting the at least one designated attribute. In certain embodiments, the processing shared image device processes the obtained shared image to derive an at least one processed shared image at least partially at the processing shared image device In certain embodiments, the capturing shared image device 101f, as described with respect to FIG. 14, provides an example of a shared image device 101 as described in this disclosure that can be configured to obtain user instructions relating to at least one designated attribute and a shared image, wherein the at least one designated attribute can be received at least partially from a processing shared image device (such as 101e as described with respect to FIG. 14). Certain embodiments of the capturing shared image device 101f can be configured to generate an obtained shared image at the capturing shared image device at least partially by processing the shared image to satisfy the at least one designated attribute. In certain aspects, the capturing shared image device can be configured to transmit the obtained shared image that can be received by, and processed at, the processing shared image device.

In certain embodiments, the sharing mechanism includes a selector mechanism, such as a laser pointer (not illustrated), to select attributes of images. The laser pointer can utilize commercially available user interface selector technology to make a selection. In certain embodiments, the sharing mechanism can include a transferring portion operable to at least partially transfer captured images from the capturing shared image device to the designating shared image device, wherein the captured images have been captured at least partially based upon the designation of the attribute information from the designating shared image device. In certain embodiments, the sharing mechanism can include the capturing shared image device configurable to actuate a sharing mechanism at least in part based on: a) relative positioning of the capturing shared image device relative to at least one other shared image device, b) positioning the capturing shared image device relative to a sharing region, or c) positioning of a field of view of the capturing shared image device. In certain embodiments, the sharing mechanism can include an (e.g., intermediate) shared image device 101g or 101i, as described with respect to respective FIG. 5 or 6.

In certain embodiments but not others, the capturing shared image device can be configurable to actuate a sharing mechanism at least in part based on relative positioning of the capturing shared image device relative to at least one other shared image device. In certain embodiments but not others, the capturing shared image device can be configurable to actuate a sharing mechanism at least in part based on positioning the capturing shared image device relative to a sharing region. In certain embodiments but not others, the capturing shared image device can be configurable to actuate a sharing mechanism at least in part based on positioning of a field of view of the capturing shared image device.

Within the disclosure, flowcharts of the type described in this disclosure can apply to method steps as performed by a computer or controller. The flowcharts can also apply to apparatus devices, such as a shared image device 101 that includes, e.g., a general-purpose computer or specialized-purpose computer whose structure along with the software, firmware, electromechanical devices, and/or hardware, can perform the process or technique described in the flowchart.

One embodiment of a high-level flowchart of a processing and/or sharing technique 1700 that is described with respect to FIGS. 17a, 17b, 17c, 17d, 17e, and 17f, and which includes operations 1702, 1720, 1758, and 1766; in addition to optional operations 1770, 1772, 1774, 1776, 1778, 1780, 1782, 1784, 1786, 1788, and 1790. Operation 1702 can include, but is not limited to, optional operations 1704, 1706, 1708, 1710, 1712, 1714, or 1716. Operation 1720 can include, but is not limited to, optional operations 1722, 1724, 1726, 1728, 1730, 1732, 1734, 1736, 1738, 1740, 1742, 1744, 1746, 1748, 1750, 1752, 1754, and/or 1756. The operation 1758 can include, but is not limited to, optional operations 1760, 1762, and/or 1764. Operation 1766 can include, but is not limited to, optional operation 1767 and/or 1768. The high-level flowcharts of FIGS. 17a, 17b, 17c, 17d, 17e, and 17f should be considered in combination with the shared image device 101, as described with respect to FIG. 14. Operation 1702 can include, but is not limited to, receiving at least one motivating event at least partially at a processing shared image device. For example, the processing shared image device 101e, as described with respect to FIG. 14, can receive a motivating event from that shared image device, or alternatively from another shared image device, such as, a shared image device capturing an image. Operations 1720 can include, but is not limited to, transmitting at least one designated attribute at least partially from the processing shared image device, wherein the at least one designated attribute can be effected at least partially in response to the receiving the at least one motivating event at least partially at the processing shared image device. For example, the processing shared image device 101e can transmit at least one designated attribute by the communication link 104 to the capturing shared image device 101f, as described with respect to FIG. 14, (in certain embodiments the shared image device thereby also acts as a designating shared image device 101j, as described with respect to FIG. 13). Operation 1758 can include, but is not limited to, obtaining an obtained shared image at the processing shared image device that is obtained in accordance with the at least one motivating event, and is obtained at least partially in response to the transmitting the at least one designated attribute. For example, the processing shared image device 101e can obtain an obtained shared image in accordance with the motivating event of the processing shared image device. Operation 1766 can include, but not limited to, processing the obtained shared image to derive an at least one processed shared image at least partially at the processing shared image device. For example, the processing shared image device 101e can process the obtained shared image, utilizing some processing technique such as varying resolution or converting format, to obtain at least one processed shared image. The receiving at least one motivating event at least partially at a processing shared image device of operation 1702 can include operation 1704, that can include, but is not limited to, obtaining at least one shared image by at least one image obtaining shared image device. For example, the processing shared image device 101e can obtain at least one shared image from at least one image obtaining shared image device. The receiving at least one motivating event at least partially at a processing shared image device of operation 1702 can include operation 1706, that can include, but is not limited to, receiving an at least one image processing goal at least partially at the processing shared image device. For example, the motivating event of the processing shared image device 101e can include an image processing goal. The receiving at least one motivating event at least partially at a processing shared image device of operation 1702 can include operation 1708, that can include, but is not limited to, receiving an indication of a camera shutter closing from an at least one shared image device. For example, the processing shared image device 101e can receive the motivating event including receiving an indication of a camera shutter closing. The receiving at least one motivating event at least partially at a processing shared image device of operation 1702 can include operation 1710, that can include, but is not limited to, receiving an indication of capturing images from an at least one shared image device. For example the processing shared image device 101e can receive the motivating event including receiving an indication of capturing images from the at least one shared image device. The receiving at least one motivating event at least partially at a processing shared image device of operation 1702 can include operation 1712, that can include, but is not limited to, receiving an indication of retrieving images from an at least one shared image device. For example, the processing shared image device 101e can receive the motivating event including receiving an indication of retrieving images from an at least one shared image device. The receiving at least one motivating event at least partially at a processing shared image device of operation 1702 can include operation 1714, that can include, but is not limited to, receiving an at least one image at least partially at the processing shared image device. For example, the processing shared image device 101e can receive the motivating event including receiving at least one image. The receiving at least one motivating event at least partially at a processing shared image device of operation 1702 can include operation 1716, that can include, but is not limited to, receiving both an at least one image processing goal and an at least one image at least partially at the processing shared image device. For example, the processing shared image device 101e can receive the motivating event including receiving both the at least one image processing goal and the at least one image. The transmitting at least one designated attribute at least partially from the processing shared image device of operation 1720 can include operation 1722, that can include, but is not limited to, transmitting a plurality of the at least one designated attribute at least partially from the processing shared image device. For example, the processing shared image device 101e can transmit the at least one designated attribute. The transmitting at least one designated attribute at least partially from the processing shared image device of operation 1720 can include operation 1724, that can include, but is not limited to, transmitting at least one format designated attribute at least partially from the processing shared image device. For example, the processing shared image device 101e can transmit at least one format designated attribute. The transmitting at least one designated attribute at least partially from the processing shared image device of operation 1720 can include operation 1726, that can include, but is not limited to, transmitting at least one pixel-depth designated attribute at least partially from the processing shared image device. For example, the processing shared image device 101e can transmit at least one pixel-depth designated attribute. The transmitting at least one designated attribute at least partially from the processing shared image device of operation 1720 can include operation 1728, that can include, but is not limited to, transmitting at least one subject designated attribute at least partially from the processing shared image device. For example, the processing shared image device 101e can transmit at least one subject designated attribute. The transmitting at least one designated attribute at least partially from the processing shared image device of operation 1720 can include operation 1730, that can include, but is not limited to, transmitting at least one capture-region designated attribute at least partially from the processing shared image device. For example, the processing shared image device 101e can transmit at least one capture-region designated attribute. The transmitting at least one designated attribute at least partially from the processing shared image device of operation 1720 can include operation 1732, that can include, but is not limited to, transmitting at least one event designated attribute at least partially from the processing shared image device. For example, the processing shared image device 101e can transmit at least one event designated attribute. The transmitting at least one designated attribute at least partially from the processing shared image device of operation 1720 can include operation 1734, that can include, but is not limited to, transmitting at least one cost designated attribute at least partially from the processing shared image device. For example, the processing shared image device 101e can transmit at least one cost designated attribute. The transmitting at least one designated attribute at least partially from the processing shared image device of operation 1720 can include operation 1736, that can include, but is not limited to, transmitting at least one rights designated attribute at least partially from the processing shared image device. For example, the processing shared image device 101e can transmit at least one rights designated attribute. The transmitting at least one designated attribute at least partially from the processing shared image device of operation 1720 can include operation 1738, that can include, but is not limited to, transmitting at least one creator designated attribute at least partially from the processing shared image device. For example, the processing shared image device 101e can transmit at least one creator designated attribute. The transmitting at least one designated attribute at least partially from the processing shared image device of operation 1720 can include operation 1740, that can include, but is not limited to, transmitting at least one owner designated attribute at least partially from the processing shared image device. For example, the processing shared image device 101e can transmit at least one owner designated attribute. The transmitting at least one designated attribute at least partially from the processing shared image device of operation 1720 can include operation 1742, that can include, but is not limited to, transmitting at least one size designated attribute at least partially from the processing shared image device. For example, the processing shared image device 101*e* can transmit at least one size designated attribute. The transmitting at least one designated attribute at least partially from the processing shared image device of operation 1720 can include operation 1744, that can include, but is not limited to, transmitting at least one feature designated attribute at least partially from the processing shared image device. For example, the processing shared image device 101*e* can transmit at least one feature designated attribute. The transmitting at least one designated attribute at least partially from the processing shared image device of operation 1720 can include operation 1746, that can include, but is not limited to, transmitting at least one use designated attribute at least partially from the processing shared image device. For example, the processing shared image device 101*e* can transmit at least one use designated attribute. The transmitting at least one designated attribute at least partially from the processing shared image device of operation 1720 can include operation 1748, that can include, but is not limited to, transmitting at least one attachment designated attribute at least partially from the processing shared image device. For example, the processing shared image device 101*e* can transmit at least one attachment designated attribute. The transmitting at least one designated attribute at least partially from the processing shared image device of operation 1720 can include operation 1750, that can include, but is not limited to, transmitting at least one promotion designated attribute at least partially from the processing shared image device. For example, the processing shared image device 101*e* can transmit at least one promotion designated attribute. The transmitting at least one designated attribute at least partially from the processing shared image device of operation 1720 can include operation 1752, that can include, but is not limited to, transmitting at least one audio designated attribute at least partially from the processing shared image device. For example, the processing shared image device 101*e* can transmit at least one audio designated attribute. The transmitting at least one designated attribute at least partially from the processing shared image device of operation 1720 can include operation 1754, that can include, but is not limited to, visibly pointing at least partially using a visible pointing device to reference at least a portion of a user interface at least partially within the processing shared image device. For example, visibly pointing using a visible pointing device, such as one having a laser of the type that are commercially available, within the processing shared image device 101*e*. The transmitting at least one designated attribute at least partially from the processing shared image device of operation 1720 can include operation 1756, that can include, but is not limited to, visibly pointing at least partially using a visible pointing device to reference at least a portion of a user interface at least partially within at least one image obtaining shared image device. For example, visibly pointing using a visible pointing device such as one having a laser of the type that are commercially available, within the capturing shared image device 101*h*. The obtaining an obtained shared image at the processing shared image device that is obtained in accordance with the at least one motivating event, and is obtained at least partially in response to the transmitting the at least one designated attribute of operation 1758 can include operation 1760, that can include, but is not limited to, obtaining the obtained shared image that has been captured at least partially in response to the receiving the at least one motivating event at least partially at the processing shared image device. For example, the processing shared image device 101*e* can obtain the captured image that has been captured at least partially in response to the receiving the at least one motivating event. The obtaining an obtained shared image at the processing shared image device that is obtained in accordance with the at least one motivating event, and is obtained at least partially in response to the transmitting the at least one designated attribute of operation 1758 can include operation 1762, that can include, but is not limited to, obtaining the obtained shared image that has been captured by a capturing shared image device at least partially in response to the receiving the at least one motivating event at least partially at the processing shared image device. For example, the processing shared image device 101*e* can receive a shared image that has been captured by the capturing shared image device 101*h*. The obtaining an obtained shared image at the processing shared image device that is obtained in accordance with the at least one motivating event, and is obtained at least partially in response to the transmitting the at least one designated attribute of operation 1758 can include operation 1764, that can include, but is not limited to, obtaining the obtained shared image that has been retrieved at least partially in response to the receiving the at least one motivating event at least partially at the processing shared image device. For example, the processing shared image device 101*e* can obtain a shared image retrieved in response to receiving the motivating event. The processing the obtained shared image to derive an at least one processed shared image at least partially at the processing shared image device of operation 1766 can include operation 1767, that can include, but is not limited to, receiving an automated request from at least part of a computer-based program at least partially from the processing shared image device. For example, the processing shared image device 101*e* can receive an automated request from at least part of a computer-based program. The processing the obtained shared image to derive an at least one processed shared image at least partially at the processing shared image device of operation 1766 can include operation 1768, the can include, but is not limited to, receiving a user selection information. For example, the processing shared image device 101*e* can receive the user selection information. Operation 1770 can include, but is not limited to, receiving a request at the processing shared image device to share the at least one processed shared image with at least one shared image device. For example, the processing shared image device 101*e* can receive a request to share at least one processed shared image. Operation 1772 can include, but is not limited to, obtaining at least one shared image at least partially using at least one image obtaining shared image device. For example, obtaining at least one shared image at the capturing shared image device 101*h*. Operation 1774 can include, but is not limited to, associating at least one image obtaining shared image device with the processing shared image device, wherein the at least one image obtaining shared image device can share the at least one processed shared image with the processing shared image device. For example, in certain instances associating the capturing shared image device 101*h* with the processing shared image device 101*e*. Operation 1776 can include, but is not limited to, synchronizing the processing shared image device with a sharing session at least partially during the sharing session. For example, synchronizing the processing shared image device 101*e* with the sharing session during the sharing session using, for example, the synchronizing shared image device 101*r* of FIG. 21. Operation 1778 can include, but is not limited to, synchronizing the processing shared image device with a sharing session at least partially following the sharing session. For example, synchronizing the processing shared image device 101e with the sharing session at least partially following the sharing session using, for example, the synchronizing shared image device 101r of FIG. 21. Operation 1780 can include, but is not limited to, defining a beginning or an ending of a sharing session at least partially based on a timing of an event. For example, defining the beginning or ending of the sharing session based on a timing of an event. Operation 1782 can include, but is not limited to, defining an ending of a sharing session at least partially based on when a subscribers time runs out. For example, defining an ending of sharing session at least partially based on when a subscriber's time runs out. Operation 1784 can include, but is not limited to, establishing a membership of the processing shared image device in a sharing session. For example, establishing a membership of the processing shared image device 101e in the sharing session. Operation 1786 can include, but is not limited to, establishing a sharing region at least partially using the processing shared image device. For example, establishing a sharing region using the processing shared image device 101e. Operation 1788 can include, but is not limited to, overlapping a first field of view obtained at least partially from the processing shared image device with a second field of view obtained at least partially from at least one image obtaining shared image device. For example, overlapping the first field of view obtained from the processing shared image device 101e with a second field of view obtained from the capturing shared image device 101h. Operation 1790 can include, but is not limited to, sharing the at least one processed shared image at least partially at the processing shared image device. For example, sharing the at least one image at the processing shared image device 101e with at least one other shared image device. The order of the operations, methods, mechanisms, etc. as described with respect to FIGS. 17a, 17b, 17c, 17d, 17e, and 17f are intended to be illustrative in nature, and not limited in scope.

Figure 18A:
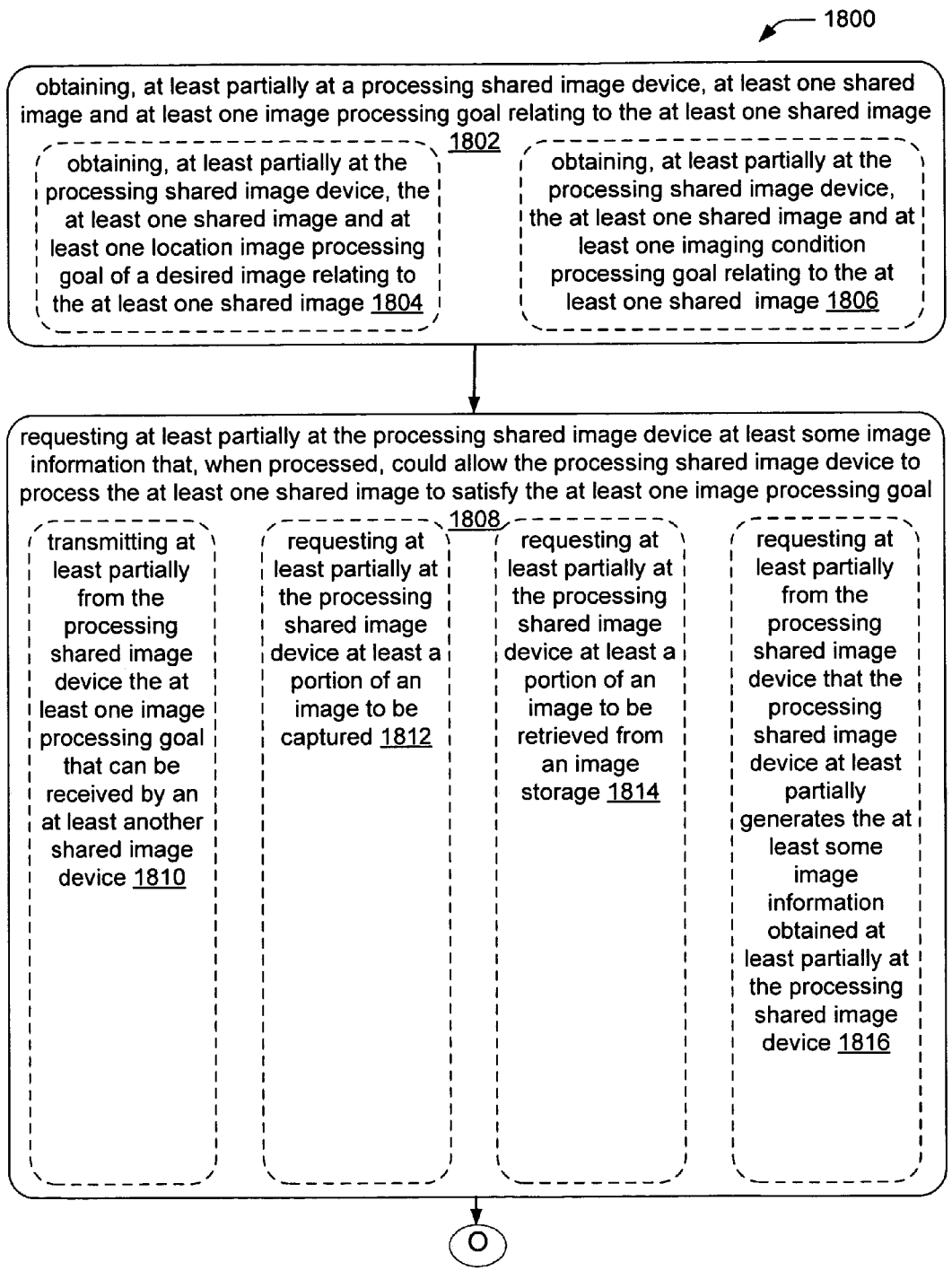
FIGS. 18a and 18b is a flowchart of one embodiment of a processing or sharing technique.
Figure 18B:

One embodiment of a high-level flowchart of the processing technique 1800 that is described with respect to FIGS. 18a and 18b is described with respect to FIG. 14, and can include, but is not limited to, operations 1802, 1808, 1820, 1830, and optional operation 1844. Operation 1802 can include but is not limited to optional operations 1804 or 1806. Operation 1808 can include, but is not limited to, optional operations 1810, 1812, 1814, and/or 1816. Operation 1820 can include, but is not limited to, optional operations 1822, 1823, and/or 1824. Operation 1830 can include, but is not limited to, optional operations 1832, 1834, 1836, 1838, and/or 1840. Operation 1802 can include, but is not limited to, obtaining, at least partially at a processing shared image device, at least one shared image and at least one image processing goal relating to the at least one shared image. For example, the processing shared image device 101e can obtain the at least one shared image and the at least one image processing goal. Operation 1808 can include, but is not limited to, requesting at least partially at the processing shared image device at least some image information that, when processed, could allow the processing shared image device to process the at least one shared image to satisfy the at least one image processing goal. For example, the processing shared image device 101e can request the at least some image information from, e.g., the capturing shared image device 101h. Operation 1820 can include, but is not limited to, obtaining, at least partially at the processing shared image device, the at least some image information that can be obtained at least partially in response to the requesting the at least one image processing goal. For example, the processing shared image device 101e can obtain the at least some image information from the capturing shared image device 101h. Operation 1830 can include, but is not limited to, processing, at least partially at the processing shared image device, the at least one shared image at least partially utilizing the at least some image information to derive an at least a portion of an at least one processed shared image that satisfies the at least one image processing goal. For example, processing the at least one shared image at least partially at the processing shared image device 101e. The obtaining, at least partially at a processing shared image device, at least one shared image and at least one image processing goal relating to the at least one shared image of operation 1802 can include operation 1804, that can include, but is not limited to, obtaining, at least partially at the processing shared image device, the at least one shared image and at least one location image processing goal of a desired image relating to the at least one shared image. For example, obtaining at least partially at the processing shared image device 101e the at least one shared image and the at least one location image processing goal. The obtaining, at least partially at a processing shared image device, at least one shared image and at least one image processing goal relating to the at least one shared image of operation 1802 can include operation 1806, that can include, but is not limited to, obtaining, at least partially at the processing shared image device, the at least one shared image and at least one imaging condition processing goal relating to the at least one shared image. For example, obtaining at least partially at the processing shared image device 101e the at least one shared image and the at least one imaging condition processing goal. The requesting at least partially at the processing shared image device at least some image information that, when processed, could allow the processing shared image device to process the at least one shared image to satisfy the at least one image processing goal of operation 1808 can include operation 1810, that can include, but is not limited to, transmitting at least partially from the processing shared image device the at least one image processing goal that can be received by an at least another shared image device. For example, the processing shared image device 101e can transmit the at least one image processing goal that can be received by, e.g., the capturing shared image device 101h. The requesting at least partially at the processing shared image device at least some image information that, when processed, could allow the processing shared image device to process the at least one shared image to satisfy the at least one image processing goal of operation 1808 can include operation 1812, that can include, but is not limited to, requesting at least partially at the processing shared image device at least a portion of an image to be captured. For example, requesting the processing shared image device 101e can request at least a portion of an image to be captured. The requesting at least partially at the processing shared image device at least some image information that, when processed, could allow the processing shared image device to process the at least one shared image to satisfy the at least one image processing goal of operation 1808 can include operation 1814, that can include, but is not limited to, requesting at least partially at the processing shared image device at least a portion of an image to be retrieved from an image storage. For example, the processing shared image device 101e can request at least a portion of an image to be retrieved from an image storage. The requesting at least partially at the processing shared image device at least some image information that, when processed, could allow the processing shared image device to process the at least one shared image to satisfy the at least one image processing goal of operation 1808 can include operation 1816, that can include, but is not limited to, requesting at least partially from the processing shared image device that the processing shared image device at least partially generates the at least some image information obtained at least partially at the processing shared image device. For example, the processing shared image device 101e can request the at least some image information obtained at least partially at the processing shared image device 101e. The obtaining, at least partially at the processing shared image device, the at least some image information that can be obtained at least partially in response to the requesting the at least one image processing goal of operation 1820 can include operation 1822, that can include, but is not limited to, receiving, at least partially at the processing shared image device, the at least some image information at least partially captured in response to the at least one image processing goal. For example, the processing shared image device 101e can receive at least some image information at least partially captured in response to the image processing goal. The obtaining, at least partially at the processing shared image device, the at least some image information that can be obtained at least partially in response to the requesting the at least one image processing goal of operation 1820 can include operation 1823, that can include, but is not limited to, receiving, at least partially at the processing shared image device, the at least some image information at least partially retrieved from a data storage location in response to the at least one image processing goal. For example the processing shared image device 101e can receive the at least some image information at least partially retrieved from data storage in response to the image processing goal. The obtaining, at least partially at the processing shared image device, the at least some image information that can be obtained at least partially in response to the requesting the at least one image processing goal of operation 1820 can include operation 1824, that can include, but is not limited to, receiving, at least partially at the processing shared image device, the at least some image information at least partially retrieved in response to the at least one image processing goal as at least partially a result of user input. For example, the processing shared image device 101e can receive the at least some image information at least partially retrieved in response to the image processing goal at least partially a result of user input. The processing, at least partially at the processing shared image device, the at least one shared image at least partially utilizing the at least some image information to derive an at least a portion of an at least one processed shared image that satisfies the at least one image processing goal of operation 1830 can include operation 1832, that can include, but is not limited to, location processing the at least one shared image. For example, the processing shared image device 101e can location process the at least one shared image. The processing, at least partially at the processing shared image device, the at least one shared image at least partially utilizing the at least some image information to derive an at least a portion of an at least one processed shared image that satisfies the at least one image processing goal of operation 1830 can include operation 1834, that can include, but is not limited to, resolution processing, at least partially at the processing shared image device, the at least one shared image at least partially utilizing the at least some image information to derive the at least the portion of the at least one processed shared image that satisfies the at least one image processing goal. For example, the processing shared image device 101e can resolution process the at least one shared image that satisfies the at least one image processing goal at least partially utilizing the at least one image information.

The processing, at least partially at the processing shared image device, the at least one shared image at least partially utilizing the at least some image information to derive an at least a portion of an at least one processed shared image that satisfies the at least one image processing goal of operation 1830 can include operation 1836, that can include, but is not limited to, field of view processing, at least partially at the processing shared image device, the at least one shared image at least partially utilizing the at least some image information to derive the at least the portion of the at least one processed shared image that satisfies the image processing goal. For example, the processing shared image device 101e field of view processing the at least one shared image. The processing, at least partially at the processing shared image device, the at least one shared image at least partially utilizing the at least some image information to derive an at least a portion of an at least one processed shared image that satisfies the at least one image processing goal of operation 1830 can include operation 1838, that can include, but is not limited to, combining the at least one shared image at least partially with the at least some image information to derive at least a portion of an at least one combined processed shared image that satisfies the at least one image processing goal. For example, the processing shared image device 101e can combine the shared image for the at least some image information to derive a combined processed shared image the satisfies the processing goal. The processing, at least partially at the processing shared image device, the at least one shared image at least partially utilizing the at least some image information to derive an at least a portion of an at least one processed shared image that satisfies the at least one image processing goal of operation 1830 can include operation 1840, that can include, but is not limited to, framing the at least one shared image at least partially with the at least some image information to derive at least a portion of an at least one framed processed shared image that satisfies the at least one image processing goal. For example, the processing shared image device 101e can combine the at least one shared image with the at least some image information to derive at least a portion of at least one framed processed shared image that satisfies the image processing goal. Optional operation 1844 can include, but is not limited to, sharing the at least one processed shared image with at least another shared image device. For example, the processing shared image device 101e can share the at least one processed shared image with another shared image device. The order of the operations, methods, mechanisms, etc. as described with respect to FIGS. 18a and/or 18b are intended to be illustrative in nature, and not limited in scope.

Figure 19A:
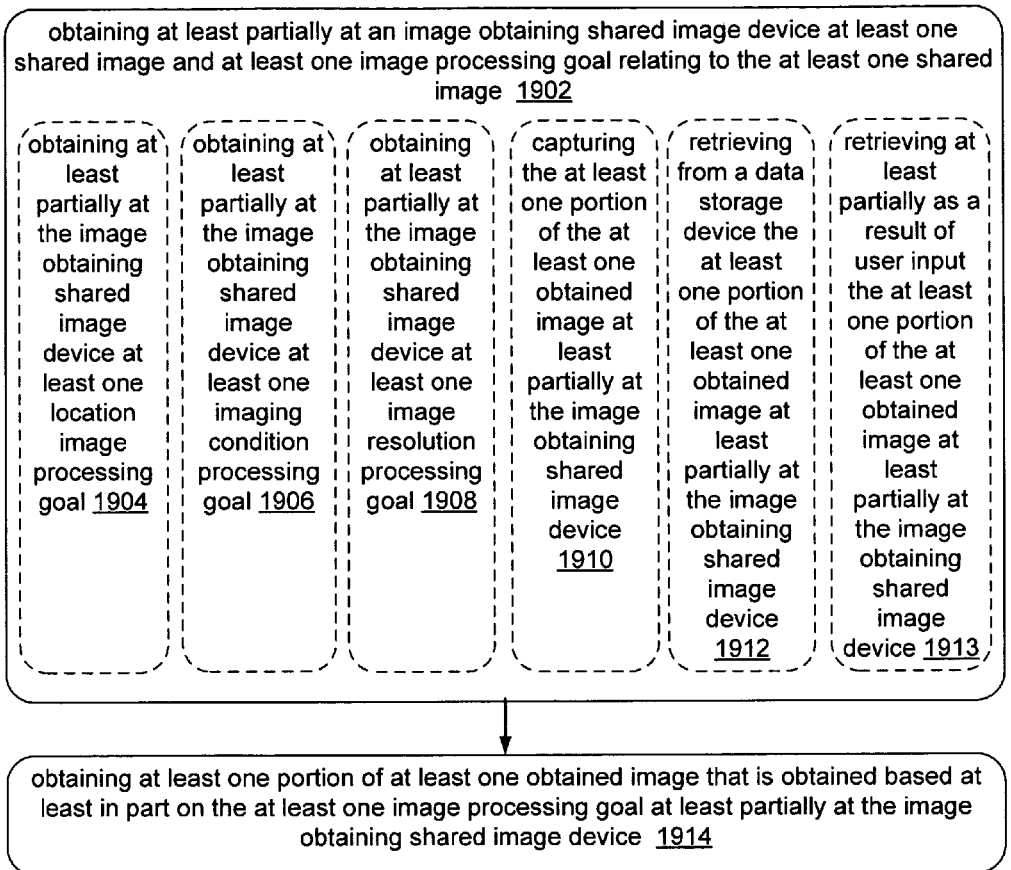
FIGS. 19a and 19b is a diagram of an embodiment of an attribute designation technique.
Figure 19B:
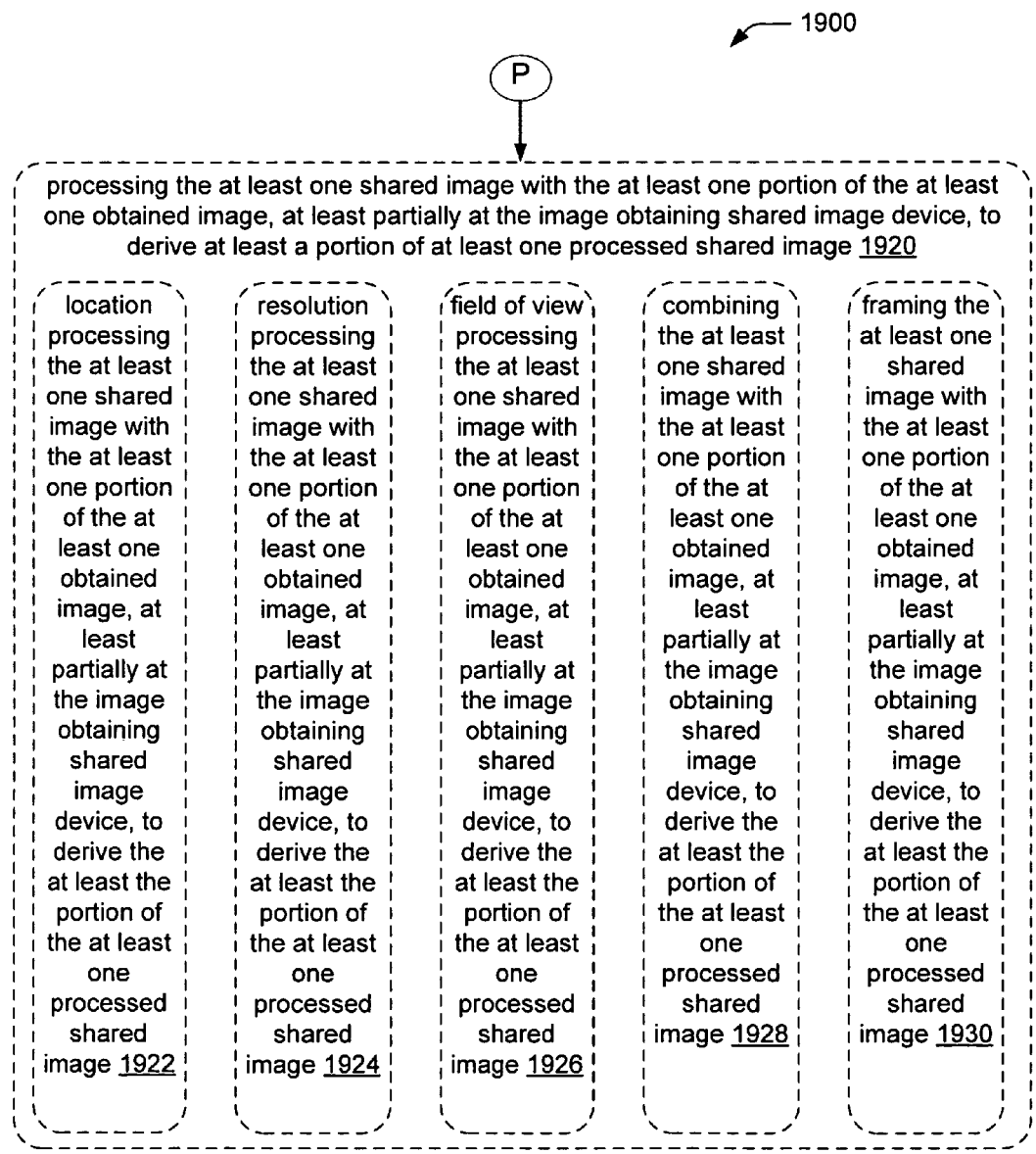

One embodiment of a high-level flowchart of an attribute designating technique 1900, which is described with respect to FIGS. 19a and 19b, can include, but is not limited to, operations 1902 and/or 1914, as well as optional operation 1920. Operation 1902 can include, but is not limited to, optional operations 1904, 1906, 1908, 1910, 1912, and/or 1913. One embodiment of operation 1902 can include, but is not limited to, obtaining at least partially at an image obtaining shared image device at least one shared image and at least one image processing goal relating to the at least one shared image. For example, the image obtaining shared image device can obtain at least one shared image and at least an image processing goal. One embodiment of operation 1914 can include, but is not limited to, obtaining at least one portion of at least one obtained image that is obtained based at least in part on the at least one image processing goal and at least partially at the image obtaining shared image device. For example, obtaining at the image obtaining shared image device an image based at least in part on the at least one image processing goal. One embodiment of optional operation 1920 can include, but is not limited to, processing the at least one shared image with the at least one portion of the at least one obtained image, at least partially at the image obtaining shared image device, to derive at least a portion of at least one processed shared image. For example, processing the at least one shared image with the at least one obtained image. The obtaining at least partially at an image obtaining shared image device at least one shared image and at least one image processing goal relating to the at least one shared image of operation 1902 can include optional operation 1904, that can include, but is not limited to, obtaining at least partially at the image obtaining shared image device at least one location image processing goal. For example, obtaining at least partially at the image obtaining shared image device at least one location image processing goal. The obtaining at least partially at an image obtaining shared image device at least one shared image and at least one image processing goal relating to the at least one shared image of operation 1902 can include optional operation 1906, that can include, but is not limited to, obtaining at least partially at the image obtaining shared image device at least one imaging condition processing goal. For example, the image obtaining shared image device can obtain at least one imaging condition processing goal. The obtaining at least partially at an image obtaining shared image device at least one shared image and at least one image processing goal relating to the at least one shared image of operation 1902 can include optional operation 1908, that can include, but is not limited to, obtaining at least partially at the image obtaining shared image device at least one image resolution processing goal. For example, the image obtaining shared image device can obtain at least one image resolution processing goal. The obtaining at least partially at an image obtaining shared image device at least one shared image and at least one image processing goal relating to the at least one shared image of operation 1902 can include optional operation 1910, that can include, but is not limited to, capturing the at least one portion of the at least one obtained image at least partially at the image obtaining shared image device. For example, the image obtaining shared image device can capture at least a portion of the obtained image. The obtaining at least partially at an image obtaining shared image device at least one shared image and at least one image processing goal relating to the at least one shared image of operation 1902 can include optional operation 1912, that can include, but is not limited to, retrieving from a data storage device the at least one portion of the at least one obtained image at least partially at the image obtaining shared image device. For example, the image obtaining shared image device can retrieve the obtained image from the data storage device. The obtaining at least partially at an image obtaining shared image device at least one shared image and at least one image processing goal relating to the at least one shared image of operation 1902 can include operation 1913, that can include, but is not limited to, retrieving at least partially as a result of user input the at least one portion of the at least one obtained image at least partially at the image obtaining shared image device. For example, the image obtaining shared image device can retrieve as a result of the user input the obtained image. The processing the at least one shared image with the at least one portion of the at least one obtained image, at least partially at the image obtaining shared image device, to derive at least a portion of at least one processed shared image of operation 1920 can include operation 1922, that can include, but is not limited to, location processing the at least one shared image with the at least one portion of the at least one obtained image, at least partially at the image obtaining shared image device, to derive the at least the portion of the at least one processed shared image. For example, the image obtaining shared image device can location process the shared image. The processing the at least one shared image with the at least one portion of the at least one obtained image, at least partially at the image obtaining shared image device, to derive at least a portion of at least one processed shared image of operation 1920 can include operation 1924, that can include, but is not limited to, resolution processing the at least one shared image with the at least one portion of the at least one obtained image, at least partially at the image obtaining shared image device, to derive the at least the portion of the at least one processed shared image. For example, the image obtaining shared image device can resolution process the shared image. The processing the at least one shared image with the at least one portion of the at least one obtained image, at least partially at the image obtaining shared image device, to derive at least a portion of at least one processed shared image of operation 1920 can include operation 1926, that can include, but is not limited to, field of view processing the at least one shared image with the at least one portion of the at least one obtained image, at least partially at the image obtaining shared image device, to derive the at least the portion of the at least one processed shared image. For example, the image obtaining shared image device can field of view process the shared image. The processing the at least one shared image with the at least one portion of the at least one obtained image, at least partially at the image obtaining shared image device, to derive at least a portion of at least one processed shared image of operation 1920 can include operation 1928, that can include, but is not limited to, combining the at least one shared image with the at least one portion of the at least one obtained image, at least partially at the image obtaining shared image device, to derive the at least the portion of the at least one processed shared image. For example, the image obtaining shared image device can combine the shared image with the obtained image. The processing the at least one shared image with the at least one portion of the at least one obtained image, at least partially at the image obtaining shared image device, to derive at least a portion of at least one processed shared image of operation 1920 can include operation 1930, that can include, but is not limited to, framing the at least one shared image with the at least one portion of the at least one obtained image, at least partially at the image obtaining shared image device, to derive the at least the portion of the at least one processed shared image. For example, the image obtaining shared image device can frame the shared image with the obtained image. The order of the operations, methods, mechanisms, etc. as described with respect to FIGS. 19a and/or 19b are intended to be illustrative in nature, and not limited in scope.

Figure 20:
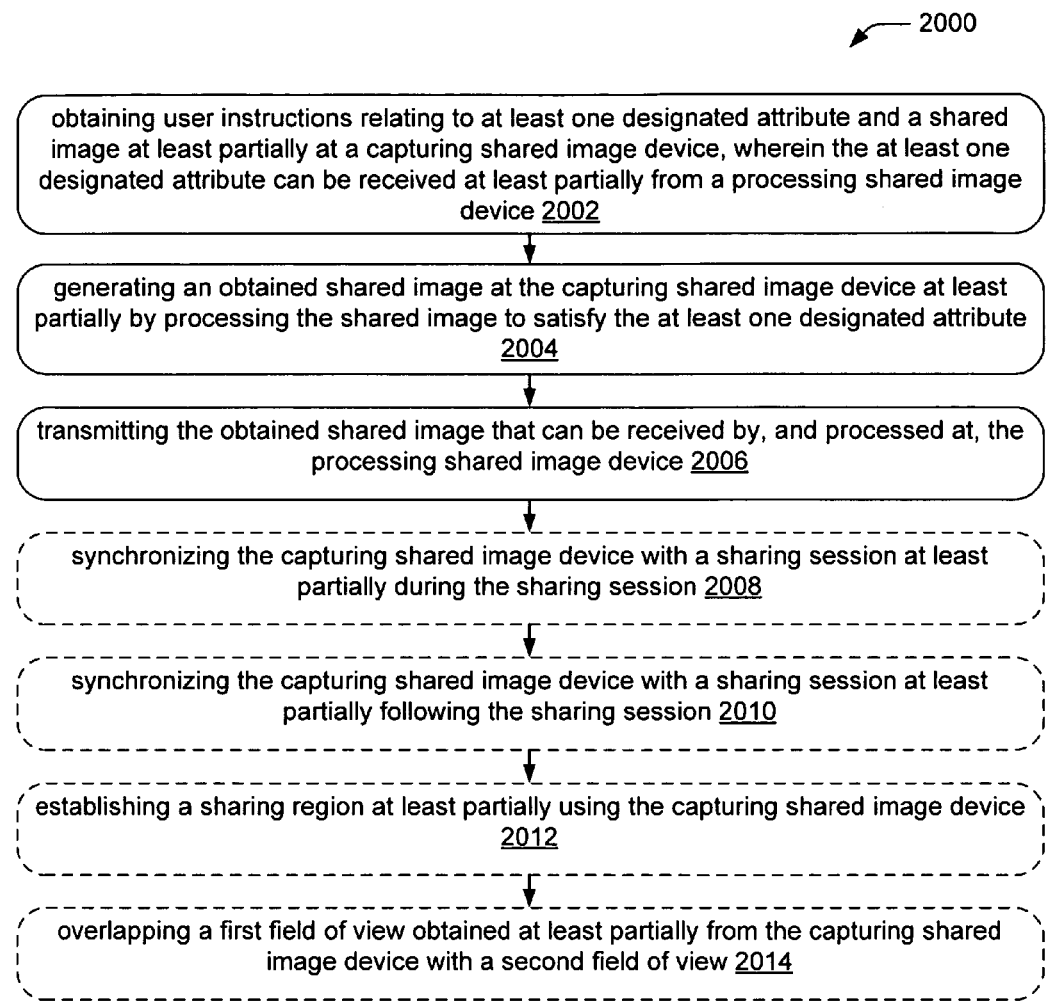
FIG. 20 shows a flowchart of one embodiment of a shared image generating technique.

One embodiment of a high-level flowchart of a user instructions shared image generating technique 2000, which is described with respect to FIG. 20, can include, but is not limited to, operations 2002, 2004, and 2006 as well as optional operations 2008, 2010, 2012, and/or 2014. Operation 2002 can include, but is not limited to, obtaining user instructions relating to at least one designated attribute and a shared image at least partially at a capturing shared image device, wherein the at least one designated attribute can be received at least partially from a processing shared image device. For example, the capturing shared image device can obtain user instructions relating to the designated attribute and the shared image. Operation 2004 can include, but is not limited to, generating an obtained shared image at the capturing shared image device at least partially by processing the shared image to satisfy the at least one designated attribute. For example, the capturing shared image device can generate the obtained shared image. Operation 2006 can include, but is not limited to, transmitting the obtained shared image that can be received by, and processed at, the processing shared image device. For example, the processing shared image device can transmit the obtained shared image. Optional operation 2008 can include, but is not limited to, synchronizing the capturing shared image device with a sharing session at least partially during the sharing session. For example, the capturing shared image device can be synchronized with the sharing session during the sharing session. Optional operation 2010 can include, but is not limited to, synchronizing the capturing shared image device with a sharing session at least partially following the sharing session. For example, the capturing shared image device can synchronized with the sharing session following the sharing session. Optional operation 2012 can include, but is not limited to, establishing a sharing region at least partially using the capturing shared image device. For example, the capturing shared image device can at least partially establish a sharing region. Optional operation 2014 can include, but is not limited to, overlapping a first field of view obtained at least partially from the capturing shared image device with a second field of view. For example, the capturing shared image device can overlap the first field of view with the second field of view. The order of the operations, methods, mechanisms, etc. as described with respect to FIG. 20 are intended to be illustrative in nature, and not limited in scope.

In certain aspects, a processing shared image device can be operable to at least partially receive at least one motivating event. For example, the processing shared image device can be operable to at least partially transmit at least one designated attribute, wherein the at least one designated attribute can at least partially result in response to the processing shared image device operable to at least partially receive the at least one motivating event. The processing shared image device can be operable to at least partially obtain an obtained shared image that is obtained in accordance with the at least one motivating event and at least partially in response to the processing shared image device operable to transmit the at least one designated attribute. The processing shared image device can be operable to at least partially process the obtained shared image to derive an at least one processed shared image. In certain aspects, the processing shared image device can be operable to at least partially capture the obtained shared image that is captured in accordance with the at least one motivating event. In certain aspects, the processing shared image device can be operable to at least partially retrieve from a data storage location the obtained shared image that is retrieved in accordance with the at least one motivating event.

In certain aspects, a capturing shared image device can be configurable to receive user instructions relating to at least one designated attribute and a shared image, wherein the at least one designated attribute can be at least partially received from a processing shared image device. In certain aspects, the capturing shared image device can be configurable to generate an obtained shared image at least partially by processing the shared image to satisfy the at least one designated attribute. In certain aspects, the capturing shared image device can be configurable to transmit the obtained shared image that can be received by, and processed at, the processing shared image device.

In certain aspects, a processing shared image device can be operable to at least partially obtain at least one shared image and at least one image processing goal relating to the at least one shared image. The processing shared image device can be operable to at least partially request at least partially at the processing shared image device at least some image information. The processing shared image device can be operable to at least partially obtain the at least some image information that can be obtained at least partially in response to the processing shared image device operable to at least partially request the at least some image information. In certain aspects, the processing shared image device can be operable to at least partially process, at least partially at the processing shared image device, the at least one shared image at least partially utilizing the at least some image information to derive an at least a portion of an at least one processed shared image that satisfies the at least one image processing goal.

In certain aspects, an image obtaining shared image device can be operable to at least partially obtain an at least one image processing goal relating to at least one shared image. The image obtaining shared image device can be operable to at least partially obtain at least one portion of at least one obtained image that is obtained based at least in part on the at least one image processing goal. In certain aspects, the image obtaining shared image device can be operable to at least partially process the at least one shared image with the at least one portion of the at least one obtained image to derive at least a portion of at least one processed shared image. In certain aspects, the image obtaining shared image device can be operable to at least partially combine the at least one shared image with the at least one portion of the at least one obtained image. In certain aspects, the image obtaining shared image device can be operable to at least partially frame the at least one shared image with the at least one portion of the at least one obtained image.

Examples of Device Operational Capacity

The different embodiments of the shared image devices 101, operating as described with respect to FIGS. 1 to 4 that can be configurable as either capturing shared image devices and/or peripheral shared image devices, could reasonably be expected to either capture, photograph, project, display, obtain, retain, process, download, and/or perform a variety of other operations with respect to a number of shared images. In certain embodiments, a relatively large memory storage area can be provided to, and utilized by, each shared image device to deal with the large amounts of data associated with images, and the associated processing.

This section includes a description of certain embodiments of indicators that allow the shared image device to operate within their estimated memory capacity, battery capacity, image capacity, processor capacity, and/or a combination thereof. When the particular capacity for a particular shared image device is reached, the particular shared image device typically does not operate as intended or designed. Different embodiments of the device capacity include, but are not limited to, memory storage capacity, processor capacity, and/or battery life capacity. One example of a device capacity indicator is described in this disclosure relative to FIG. 26, with respect to a status indicator 1504.

In many embodiments, the users of each shared image device can be provided with the option of obtaining or retaining particular shared images obtained from a particular shared image device, associated with a particular user, or relating to a particular subject. In one embodiment, such filtering techniques can filter based upon the metadata that is associated with each shared image.

In certain embodiments, the shared image device 101 can include a record that indicates the shared image device that actually captured the shared images. The record can also include the identities of other shared image devices with which the user has agreed, by joining the sharing session, to be willing to share images. The user of the shared image device with such a record can select those other shared image devices with which may access certain, or at least some of their, shared images for the particular sharing session. In one embodiment, this can be considered as a back-end synchronization to provide sharing of shared images, and the synchronized data can be returned to the capturing shared image device using, for example, the synchronizing shared image device 101r of FIG. 21.

This can be because there is an association between the different shared image devices (e.g., a user's camera and the user's computer or printer). In one embodiment, there can be a sharing session identifier that is available to the members of the sharing session by which the shared images, portions thereof, associated information, metadata, etc. that in certain instances allows transferring the shared images through the network or the Internet.

The synchronization for a session of multiple shared image devices can allow a member shared image device that has left a session to return to the session. Such synchronization can rely, for example, on the synchronizing shared image device 101r of FIG. 21. In addition, a member that has entered a session later than other members can receive the prior images relating to the session by synchronizing with other members of the session that have the prior shared images. In certain embodiments, it is envisioned that different members of the same session can have different sessions, so to provide a complete synchronization for a member joining (or rejoining) an existing session, the joining shared image device may obtain a number of images from multiple shared image device sources. In the master-satellite embodiments as described with respect to FIGS. 1 and 3, it may be possible for a member shared image device joining the session to synchronize therewith to obtain the images (or portions thereof) from that master shared image device which contains all images pertaining to that session.

Synchronization may be more complex in certain embodiments than certain shared image devices providing the images to other shared image devices. For example, certain shared image devices may have limited resources compared with other shared image devices due to different memory dimensions, different battery lives, different imaging resolutions, etc. As such, to transmit image data between different shared image devices, it may be important that the sending shared image device configure the image data in a format as desired by the receiving shared image device. For example, the shared images could be selected to be thumbnail images, full images, portion of images, metadata relating to images, etc.

In many embodiments of shared image devices, a mechanism can be provided such that a receiving shared image device that has obtained one version of a shared image can obtain another. For example, if a receiving shared image device that has already received a thumbnail shared image from a transmitting shared image device, and the receiving shared image device thereupon provides a request to obtain a full-resolution image version or a reduced-resolution image version of certain shared images, then the transmitting shared image device could provide such full-resolution images. In certain embodiments, such synchronization (to provide certain versions of many images, or alternate versions of certain images) could be allowed even after the session is complete such as by using such a transfer mechanism such as email, or even a reestablished communication link.

In certain embodiments, a memory capacity warning such as the status indicator 1504 exists on capturing shared image devices such as a camera or camcorder. This memory capacity warning can function in a similar manner to a battery indicator, to indicate an amount of time remaining considering past-flows for the particular sharing session. As such, if the past image storage has captured a prescribed percentage of the memory storage, the indicator will indicate the number of images used compared to those remaining, the percentage of image storage space used, or the amount of time remaining. The users of the shared image devices can use such indicators based on past-flows to judiciously apply further image capturing, obtaining, retaining, or other activities.

Certain ones of the device capacities may be related. For example, one capturing shared image device may be configurable to only be able to store a certain number of shared full-sized images. The status indicator 1504 therefore may indicate the number of remaining full-sized images, reduced-resolution images, as well as the number of thumbnail images or metadata (as desired by the user of the shared image device, or as designed by the designer of the shared image device). To obtain or retain more full-sized images or even reduced-resolution images may require a considerable amount of battery life that represents another embodiment of device capacity. As such, a particular user considering obtaining or retaining more shared images may depend partially on the battery life state as well as the amount of energy necessary to obtain the current state of stored full-sized images, thumbnail images, or metadata.

In one embodiment, the data associated with the captured shared images can be initially stored in an image storage location within the shared image device. The percentage of data (or number of images) that is stored in the image storage location can be monitored, and when the percentage of data (or number of images) exceeds a predetermined amount, some data that is to be stored and/or data that has been stored can be obtained or retained to a remote storage location.

In one embodiment, the remote storage location can be remotely located from the device image storage location such that the image, or portions thereof, can be obtained or retained over a wireless communication link and/or other link such as over the Internet or another shared image network or network. In another embodiment, the remote storage location can include, for example, an image storage device that is operably coupled, such as by a short connection link, to the shared image device. The physical memory dimensions of the image storage location, and as well as the remote storage location, can be selected based on the volumes and type of images, portions of images, or other image information that is likely to be obtained with a particular shared image device for a particular sharing session. As such, this allows the sharing by shared image devices 101 to be accomplished in a substantially real-time basis.

A data storage capacity situation can occur when a user overuses the storage capability of the shared image device, such as by capturing too many images using a digital camera or camcorder. This may be connected to the shared-percentage concept described presenting, wherein if a certain percentage of the image capacity in a camera has been captured, either the images relating to that sharing session, or the images from a particular user, can be rejected (or selectively considered by using, e.g., a browsing mechanism).

Certain embodiments of the sharing mechanism can also operate as a subscription mechanism. For example, if a user of a first shared image device captures an image, it may be sent to the other shared image devices that are participating in the sharing session. Such a subscription to a sharing session may be equated with subscribing with another service. Each subscribing shared image device may thereupon elect to join a particular session. In certain embodiments of a session, each user of a shared image device can select which images are to be obtained or retained, and can reject certain images. There are a variety of embodiments that can be provided between sessions and subscriptions thereto.

In certain embodiments, if a user of a first shared image device agrees to publish a particular image for a number of other shared image devices including, in particular, a second shared image device, then the user at the second shared image device can, in certain embodiments but not others, agree to accept the pictures. It is also possible to envision relatively simple or complex cases. For example, shared image devices configurable as digital cameras can have the capability of browsing through their shared images. Such a browser could be applied to incoming subscribed-to images. Consider an instance that provides for "stop subscribing" to any particular user, from any particular sharing session, and/or the like. As such, the images can be either permanently blocked, temporarily blocked, allowed access to add further time, selectively cultured, or a wide variety of other permutations. At a live event, certain users may for example be more concerned with capturing the images than managing them. Following an event, certain users may be more concerned with managing the images.

Examples of Sharing Mechanisms

To provide improved consumer electronics, it may be desirable to provide a simplified sharing mechanism to accomplish the desired task for the shared image device 101. The image-based products produced by such large-scale electronics/computer manufacturers such as Hewlett-Packard, IBM, Xerox, Sony, and a variety of other companies (all registered trademarks of their respective companies) determine those consumer-electronic devices that could have sharing capacity. To appreciate the large variety of shared image devices 101 that could benefit from sharing capability and thereby become either a capturing or peripheral shared image device of, one can walk-through a large consumer-electronics store, or alternatively consider the variety of consumer device patents in the patents are pending applications before the USPTO.

Certain shared image devices 101 might have a prescribed design behavior when associated with a group of shared image devices. Consider that each shared image device has a traditional function such as photography, printing, computing, etc. It is also possible that some shared image devices can perform a function that differs from their traditional function for a particular sharing session.

Theoretically, the share mechanism can be configurable to operate relatively simply to cause sharing between multiple shared image devices; similar to the ease that has become generally accepted by, e.g., depressing a shutter button that triggers a camera to capture an image. Additional complexity may be provided, as desired, in certain embodiments of shared mechanisms to provide additional functionality such as to select those shared image devices that may join a particular sharing session. One embodiment of such additional complexity to select member shared image devices may relate to establishing a "buddy list" between multiple shared image devices, as described later in this disclosure. Certain embodiments of shared image devices, but not others, are configured as a packaged item that allows sharing functionality to other shared image devices in the package. Such member selection may be afforded to peripheral shared image devices such as device printers, DVD burners, etc.

In certain embodiments, shared image devices select certain shared images that may have been captured by at least one other shared image device, and can obtain other versions of the selected shared images. In one embodiment, it may be desired to provide a near-real-time data-transfer between certain shared image devices 101 (but perhaps not others) that are participating in certain sharing sessions. In other embodiments, the rate of data transfer may not be critical based on the particular application, and the rate of data transfer can be reduced. The particular share mechanism should be adaptable to the uses, designs, operations, and other considerations of the shared image devices.

Examples of Shared Image Devices Having Password Proximity

It has been described above how to integrate a number of shared image devices 101 into the shared image network 100 based upon the proximity of the shared image devices 101 (either geographic or based on the communication link 104), and also based on the actuations of, and the operations of, the respective shared mechanisms. In the geographic proximity-based embodiments, the shared image devices can be located relatively closely to each other depending upon the particular technology utilized.

In other embodiments, shared image devices can be operably connected to each other (e.g., operably coupled) to allow authentication for operation such as by a password such as a spoken word or phrase, a captured picture, etc. Certain embodiments can use password-proximity in combination with, or in addition to, geographic proximity. The different types of proximity are therefore not necessarily mutually exclusive. As such, an authorizing password, a pass image, or a variety of similar pass mechanisms can replace the above-described physical proximity requirements.

This portion of the disclosure thereby describes how a number of shared image devices 101 can join the sharing session based on passwords or a similar mechanism, instead of based upon the physical proximity. Certain embodiments of the shared image network 100 can create group passwords to protect against use of shared image devices by non-participants. The shared image devices 101 within that particular sharing session can be configurable to respond or operate pursuant to the password, pass image, etc. using suitable image recognition, speech recognition, pattern recognition, or other recognition programs. Consider, for example, one of the participants at a birthday party or other event creates a temporary community password for the session group.

Participants can enter the appropriate password, and thereby actuate the shared image device 101 using the sharing mechanism. In one embodiment, only those shared image devices 101 with the correct password may be provided access to a community of shared images for that sharing session.

A variety of password mechanisms thereby can provide password functionality to shared image devices 101. Password mechanisms represent one relatively easy technique to provide password functionality. In one embodiment, the users of shared image devices 101 can follow instructions to type in a specific password, pass phrase, something the user says, something the user types, or some picture that can be possessed by the users in the sharing session (e.g., handed out at the door for a sharing event). Such password, etc. that passes the appropriate recognition program can thereupon be used for authentication, etc.

One embodiment of a recognizable password for a recognition program includes a photographic-password. For example, a user who wants to join a certain session can do so by submitting a captured image of an arm, a captured image of a thumb, a captured image of a shoe, a captured image of a prescribed number of fingers or some letter or number (or group thereof), or a captured image of some other physical characteristic whose shape or appearance would be recognizable using computer-based image recognition programs, etc. In another embodiment, at least some of the cameras are provided (e.g., by a leader of a session or a producer of a shared image device) with a similar appearing card or piece of paper having some shape or pattern printed on them that represents a picture that can thereupon act as a password.

In another embodiment, the printed pattern could even include, e.g., a page or portion of a newspaper, or magazine, or a portion thereof. The pattern of text, or a photograph, or a physical shape can represent a pattern that is recognizable by a hardware, firmware, or software-based pattern recognition mechanism such as may be used in certain embodiments of shared image devices 101. In yet another embodiment, the pattern recognition software can even be applied to remote shared image devices, such that the members of the sharing session hold up some predetermined number of fingers (e.g., 5, 4, etc.), or a printed number, to join the sharing session. These examples of pattern recognition, speech recognition, etc. are illustrative in nature and not limiting in scope. In certain embodiments, the users of the shared image devices 101 can even be remotely located as in different cities or countries while allowing suitable operation of the shared image network 100.

The patterns discussed in this disclosure are recognizable by an optical, audio, or video pattern recognition system or device (such as a pattern or shape recognition program that runs on at least one general-purpose computer or at least one specialized-purpose or specific-purpose computer, or a networked combination thereof, as described herein). It is also to be understood that many shared image devices, such as digital cameras, teleconferencing systems, or camcorders, could include voice input that could thereupon be compared against a speech pattern, an audio pattern, and/or a password or pass-phrase pattern using vocal recognition patterns. As such, a vocal or audio pattern search of a particular individual using a vocal or audio recognition program, or using a particular spoken password, is within the intended scope of the present disclosure. Additionally, a spoken password can be compared to a voice recognition program for that password.

There are a wide variety of graphic, photographic, image-based, local, or audio type passwords, and/or pass-phrases that are within the intended scope of the present disclosure. As such, those described herein are not intended to be limiting in scope. The variety of recognition programs for speech, voice, image, audio, video, etc. provide an indication of the large variety of recognition programs that are within the intended scope of the applicable pattern recognition programs of the present disclosure. The general operation of recognition programs as run on captures and/or controllers are generally well known by those skilled in the art and will not be further detailed within this disclosure.

The sophistication, quality, expense, and functionality of shared image devices 101 included in different embodiments of the shared image network can therefore vary widely. In one embodiment, the satellite shared image devices 101*b* that are associated with the master shared image device 101*a* can be a relatively less complex device, such as cameras or camcorders that can each hold a prescribed amount of data at any given time. As such, the satellite shared image devices 101*b* can thereupon obtain or retain the data to the imaging computer-camera associated with that sharing session. In other embodiments, some of shared image devices 101 in the shared image network 100 can be relatively expensive and sophisticated, such that each shared image devices 101 can be configurable to perform a specific function and/or specific operability.

A certain master shared image device 101*a* can alternatively be configurable as a satellite shared image device 101*b* in a different sharing session or time. In one embodiment, the person giving the party, moderating an event, etc. can logically configure their digital image device to be the master. As such, certain digital image devices (e.g., digital cameras or camcorders) can be configurable as the master or satellite depending upon the particular sharing session, and who is establishing or running the sharing session.

If a particular shared image is deleted, the deletion of the shared image can propagate through other shared image devices and/or users in certain embodiments. Although in certain relatively simplified embodiments, the deletion will not propagate through to other shared image devices. It may, also be desirable to apply an undo function to certain embodiments of shared image devices to remove undesired pictures (images) so the undesired images may not be shared.

In the peer-configuration, it may be desired to provide some "remembering" function such that the shared image network 100 remembers the contents of those particular shared images that were not shared before shared image devices lost proximity. An option may be to allow those shared images to be shared between shared image devices.

Examples of Sharing Sessions

As described in this disclosure, it may be useful in certain embodiments (while not in other embodiments) to incorporate some type of a sharing session that extends for the duration of a session to associate, on a sharing basis, those member shared image devices to the sharing session. As such, the sharing session can be the duration over which certain embodiments of shared image devices 101 may share their shareable resources, such as still pictures or motion pictures.

There can be many embodiments of types of sharing sessions, as described within this disclosure. For example, in some sessions, the shared images that have been captured can be shared or copied between some of the other shared image devices 101. As such, if a number of shared image devices each captured an image (or portions thereof) for a particular sharing session, then some of the shared image devices can be expected to have a large number of shared images to capture, process, manage, consider, store, and/or view. In other embodiments of the sharing sessions, only a certain number of the images are shared or copied with certain shared image devices.

One embodiment of the sharing session may involve a group of users for a session (e.g., parents for a particular child's birthday party or sporting event), each of which have a shared image device that may be configurable (authenticated or authorized) to gain access to the shared images at that event. In one embodiment, certain shared image devices 101 could obtain or retain shared images (e.g., pictures) even after they had left, but before the event has ended. It is likely that the shared image network 100 would utilize one or more wireless links to provide the flexibility between the shared image devices such as is provided with certain local area networks. Alternatively, the images could be accessed later over e.g., wide area networks to obtain or retain large volumes of the data associated with a number of pictures.

For certain embodiments, it may be desired to allow a certain shared image device 101 to join a plurality of concurrent sharing sessions. A user would then be able to determine which one of multiple sharing sessions they wished to be a member. As such, such a shared image device 101 could obtain or retain information from at least certain other shared image devices from both/all of the concurrent sharing sessions. Access to the multiple sharing sessions can be covered by providing multiple passwords or pass-phrases that each relate to the different concurrent sharing sessions. In certain embodiments, it is therefore possible for certain shared image devices 101 to subscribe to multiple sharing sessions simultaneously. Logically, this sharing of one shared image device into multiple sharing sessions can be envisioned as, e.g., a Venn diagram in which each shape represents one of multiple potentially-overlapping concurrent sharing sessions. In these embodiments, the sharing sessions that each shared image relates to can be identified; or in certain embodiments, a particular shared image device pertains to both/all of the concurrent sharing sessions.

With many embodiments of sharing sessions that are established on peer-to-peer shared image networks similar to as described above with respect to FIG. 2; the networks can have the capability of replicating data that has been lost (or not obtained) by a particular shared image device 101. As such, when a particular shared image device 101 joins the sharing session, it may be able to query at least some of the devices to obtain the shared images that have been captured through the beginning of that sharing session. As such, when a member of the sharing session or event arrives halfway through the event, can access the previously captured images, etc. that pertain to the sharing session.

Replication of lost, or never obtained, data may be successfully performed in many peer-to-peer shared image networks as well as other networks (e.g., master-satellite). Such data replication represents an advantage of certain peer-to-peer shared image networks. This replication may not apply to sharing sessions that have already both started and ended, even for peer-to-peer shared image networks. As such, in many embodiments, users of shared image devices 101 that might have joined the sharing session after the sharing session has ended may not be able to obtain those shared images substantially directly (but perhaps can obtain the sharing session pictures from a friend or a family member). Certain embodiments of the shared image network 100 may include a concept of a synchronized master shared image device from which a latecomer can obtain the shared images.

Though dissimilarities exist between different types of sharing sessions between shared image devices 101, there can also be a great deal of commonality. For example, many embodiments of the sharing sessions can be identified by a unique session identifier. With certain embodiments of the sharing sessions, those who are attending should be able to access the shared images captured by some of the shared image devices 101 associated with that sharing session (while this may not be true in other embodiments of the sharing session). Many embodiments of sharing sessions rely on a broadcast by which images (or portions thereof or information relating thereto) are transmitted to other members of the session, in many instances without an addressing mechanism.

A user can get access to sharing sessions in certain embodiments after they have left that sharing session, such as a party. For example, the sharing session may be configurable such that the members can access images relating to any portion of the shared session following the shared session from one of the session members (perhaps after providing a suitable password to rejoin and/or access images from the session). In certain embodiments, such sharing session members may be able to access the shared images after they leave the sharing session using a different mechanism, such as the Internet or another embodiment of network (e.g., or other shared image network). The particular configuration of the shared image network largely determines how current members, as well as past members, of the sharing session may access shared images from the shared image network.

Consider that for certain embodiments, when a user actuates a sharing mechanism 102 to join a particular sharing session, that they establish a sharing session identity (ID). For certain embodiments of shared image devices 101, they should be able to use the sharing session ID to later retrieve pictures even after they have left the event. For example, the password can be used as a host-name or sharing session ID for the event. Sharing session names can also default to easily remembered things such as date, name of the sharing session, etc. Shared image devices can be associated with one or more from a set of shared default keywords such as "party", "anniversary", "Christmas", "sports event", "business meeting", etc. For a number of embodiments, the information associated with each particular sharing session should be retrievable later from a central computer, a server, etc.

For a particular sharing session member who shows up late to the sharing session or meeting, it may be important that different session attendees have the capability of "pulling in" new members, and providing them the shared images going back to the beginning of the sharing session. For example, assume that there are four currently-joined shared image devices 101 in a session, and a new shared image device is being joined using the first shared image device to establish a new grouping of five shared image devices. Such joining techniques may, for example, rely on point-to-point communication, master-satellite communication, client-server communication, or other shared communication techniques. In one embodiment, for example, the user of the first shared image device 101 actuates the sharing mechanism that publishes the shared images to allow the joining shared image device to become part of the sharing session, and thereby gain access to the images already captured by other session shared image devices. A number of different sharing session configurations for the sharing mechanisms can thereby be provided depending on the application or as a design choice. One embodiment involves a first person actuating the sharing mechanism 102, at which point other shared image devices within range may be able to access those. This embodiment could be considered as simply opening up some of the session information contained in one shared image device 101 to other shared image devices.

Another embodiment can be considered as a "published with synchronized timestamp", such that each user actuates the sharing mechanism at the same time to get synchronized, and therefore is able to somewhat control the dispersal of the shared images. Another embodiment can be referred to as a "shared plus password."

Examples of Ancillary Aspects for Sharing Mechanisms

Certain shared image device 101 concepts can also be applicable to business meetings, telephone calls, amusement centers, sports events, etc. As such, some participants in a meeting can copy, share, and/or distribute all, or selected shared images, or shared camcorder output, etc. relating to the meeting, event, etc. Synchronization concepts as described within this disclosure even apply to those members who arrive late, leave early, and or leave for a portion between the beginning and ending of the sharing session.

Some embodiments of the sharing mechanism can also include a stop-publishing aspect of the sharing mechanism. In certain session embodiments, a stop-sharing mechanism or temporary halt publishing mechanism performs an inverse operation to the sharing mechanism as described herein. Suppose, for example, that a user of a shared image device 101 wishes to capture at least one private picture, and thereby temporarily disconnects from the shared image network to keep from sharing that image from the other members of the sharing session.

This can be the same or a different feature as a temporary-private mechanism such as a mute-image device. In this manner, a person in the party can temporarily disconnect their device from the shared image network 100 and/or certain shared images or portions thereof for a portion of the sharing session.

In one embodiment, a unique time-stamp can be provided to synchronize at least some of the digital devices in the sharing session, and the time can be measured with respect to the beginning of the sharing session. Each shared image device such as a digital camera or camcorder can thereupon utilize a universal sharing time. In one embodiment, at least some of the clocks for the different shared image devices 101 slave to a time corresponding to one of the devices for that sharing session. In another embodiment, at least certain shared image devices 101 slave to a sharing session time for that session. The selected sharing session time can rely on a distinct time-keeping mechanism.

In another embodiment, a "buddy list" can be integrated into a number of shared image devices that form a subset from within a larger group of shared image devices (e.g., the smaller group is identified to share or copy their shared images using the buddy list). Those shared image devices may elect to share or copy their images with other shared image devices sharing the same buddy list, but not share their "buddy-list" images with the group of shared image devices at large.

In one practical example, assume that one user of the shared image device 101 goes to a sports event with a group of friends. When that user actuates the sharing mechanism using their buddy list, the shared image device synchronizes with other shared image devices on that buddy list, but not necessarily with the shared image devices at large. In one embodiment, the "buddy-list" group can be associated with a prescribed password, for example. There can be a variety of such embodiments of shared image devices that range from relatively simple to more complex. The use of the buddy list to actuate the share mechanism in certain embodiments of shared image devices can utilize certain passwords, such that those shared image devices that produce the passwords can join the buddy-list session.

A number of rules can be applied to the shared image devices that pertain to general concepts of time, space, and/or locations for capturing the shared images. Such aspects as buddy lists, the numbers of pictures that can be shared, stop-halt, temporary-halt, percentage of storage that can be shared, and the types of pictures that can be shared (e.g., private or public shared images) are exemplary aspects with respect to shared image devices.

Additionally, in one embodiment, photographers could prioritize their shared images. For example, certain shared images can vary in quality based on, e.g., content, interest, or quality of the shared image in a manner that can be either objectively or subjectively rated, or other such factors. Other users may select a shared image device to access only those shared images that are above a certain quality level (e.g. good, excellent, fair, etc.). Filtering of the lower quality images, measured by some objective and/or subjective standard, provides a technique to reduce the amount of data that has to be obtained or retained for each sharing session.

Certain embodiments of shared image devices can be configurable to handle multiple sharing sessions. For example, suppose a user has a printer that can handle both a first sharing session and a second sharing session for a particular digital camera or camcorder. Different applications for the shared image devices could thereupon be useful in business, educational, sporting, governmental, police, or applications in which an individual obtains shared images for several concurrent events (or only one event that an individual is not attending). It might be desirable to allow a user to subscribe to the multiple sharing sessions substantially simultaneously. The personal computer (PC) can be configurable as a peer (of a peer-to-peer shared image network configuration) that monitors the shared images that are being captured as to select a variety of shared images from multiple shared image devices.

In certain embodiments, a status indicator can be provided, either on the shared image device or separately, and which indicates to others that a particular shared image device is in its share mode. One example of a status indicator may be an indicator light, or an "active" indicator on the display of the shared image device. Other status indicators may display some information pertaining to the particular sharing session.

Examples of Viewfinders for Shared Image Devices

In certain embodiments, but not others, a sharing mechanism might be considered to function as a virtual picture frame or viewfinder that allows remotely-located shared image devices such as digital cameras or camcorders to capture shared images. Viewfinders therefore provide a mechanism for one shared image device (which may be configurable as either a peripheral shared image device, a capturing shared image device, and/or another shared image device) to observe an image that has been, or is being, captured by another shared image device (which may be configurable as either a peripheral shared image device, a capturing shared image device, and/or another shared image device). As such, certain embodiments of viewfinders may be considered as operating to "share and/or remotely control another shared image device's viewfinder". In one embodiment, a viewfinder at a first shared image device can display at least one image, or a portion thereof, that is being imaged at a second shared image device. The second shared image device acts by displaying at least a portion of the at least one image that is displayed by the first shared image device as it could appear at the first shared image device. Those embodiments of shared image devices 101 that are provided with viewfinders can be used by users to perform a variety of processing related to the shared images including, but not limited to, viewing the shared images, selecting those shared images to keep and those to discard, determine those shared images that will undergo further processing, and determine those shared images to select an increased resolution version of (e.g., when provided with thumbnails, image information or portions thereof, or metadata describing the image). For example, certain embodiments of viewfinders may display thumbnails of shared images. From the thumbnails, the user determines those shared images that are to be accessed in more detail (e.g., having a greater resolution).

Figure 28:
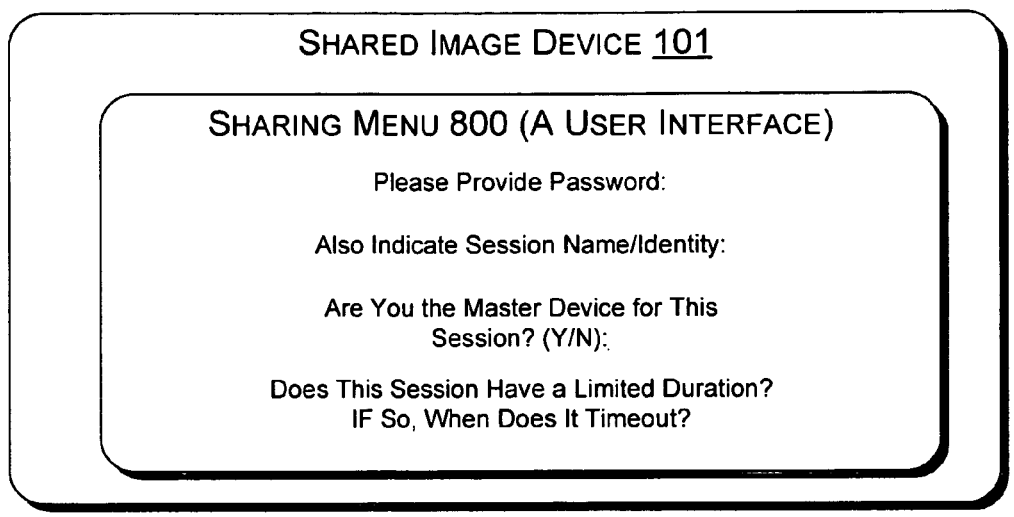

FIG. 28 shows one embodiment of a sharing menu 800 that is integrated within a shared image device 101. The sharing menu 800 can be integrated as a portion of the viewfinder of certain embodiments of the shared image device 101 (e.g., such as being located on the display of the shared image device). The shared image device can allow a user to join a particular session, for which they are proximately located using one of the above-described mechanisms such as geographic proximity, proximity by communications link, and/or proximity by password.

The sharing menu 800 can include a variety of questions, such as including input for the name and/or identity of the user, the user password, indicating whether this shared image device is the master device for a particular session, and indicating whether the particular session has a prescribed duration, and if so, when is the timeout. The embodiment of the sharing menu 800 as described with respect to FIG. 28 is illustrative in nature, and not limiting in scope. In actuality, the sharing menu 800 can have a variety of appearances, shapes, and/or questions.

Figure 16:
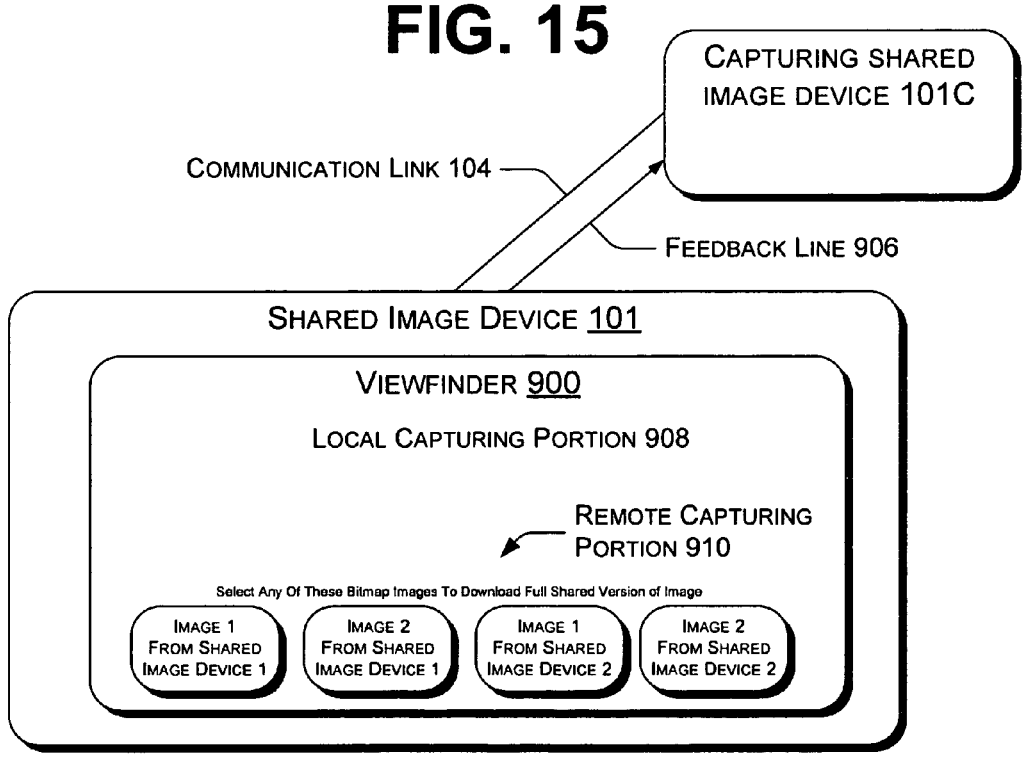
FIG. 16 shows a generalized front view of one embodiment of a viewfinder or display that can be integrated in a shared image device.
Figure 17A:
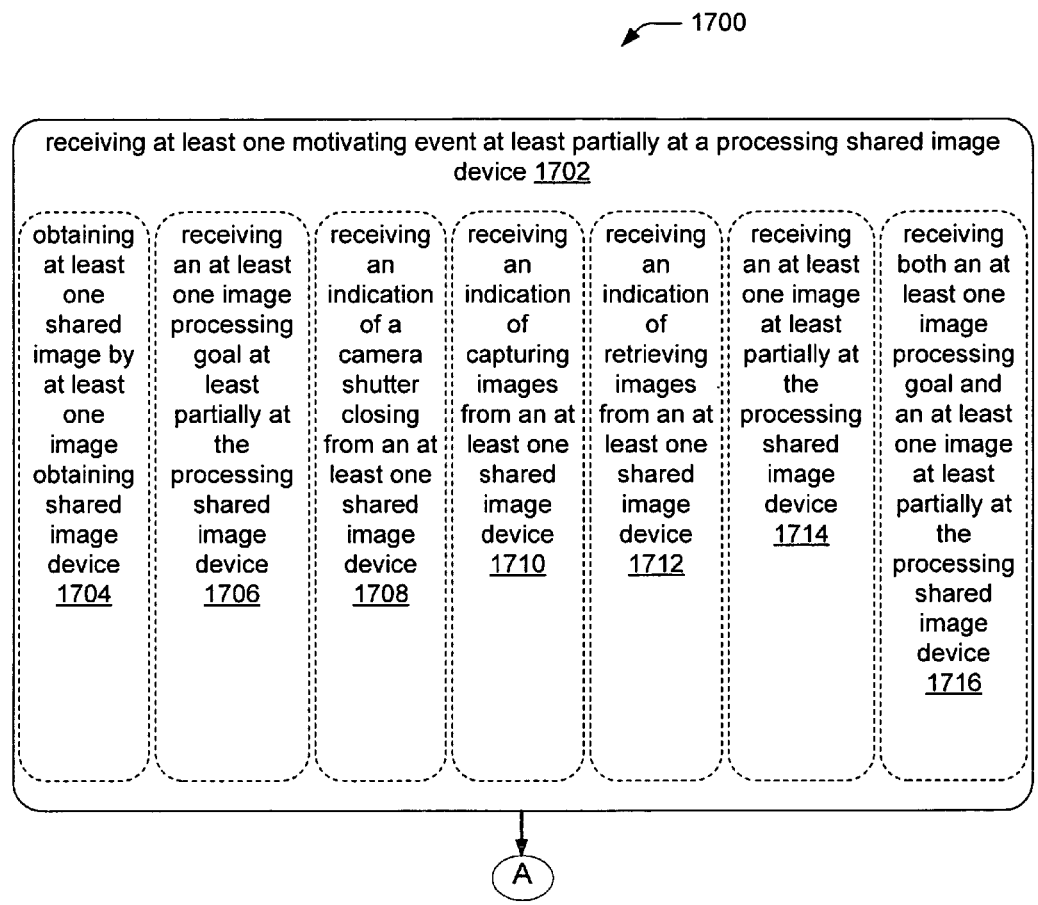
Figure 17B:
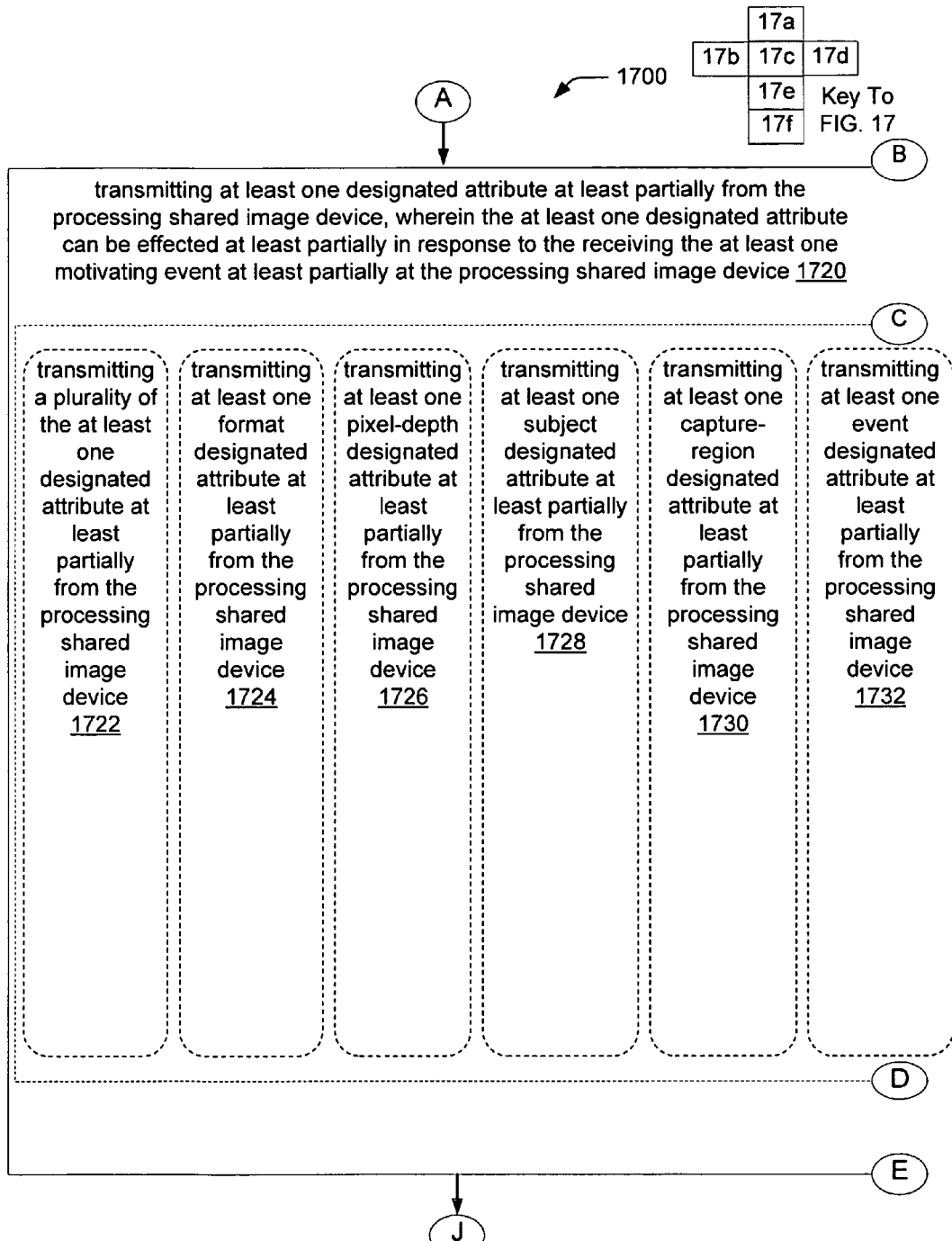
Figure 17C:
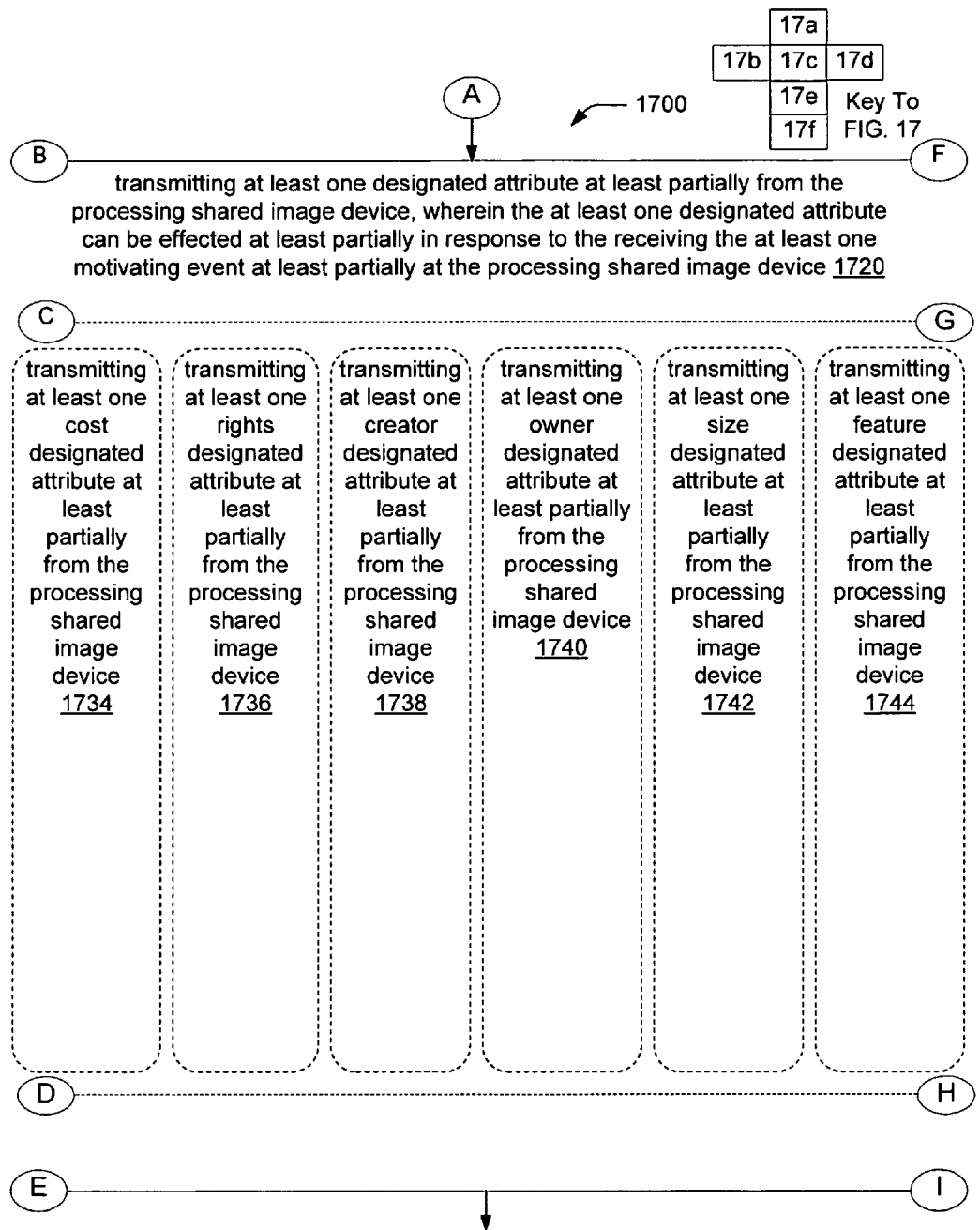
Figure 17D:
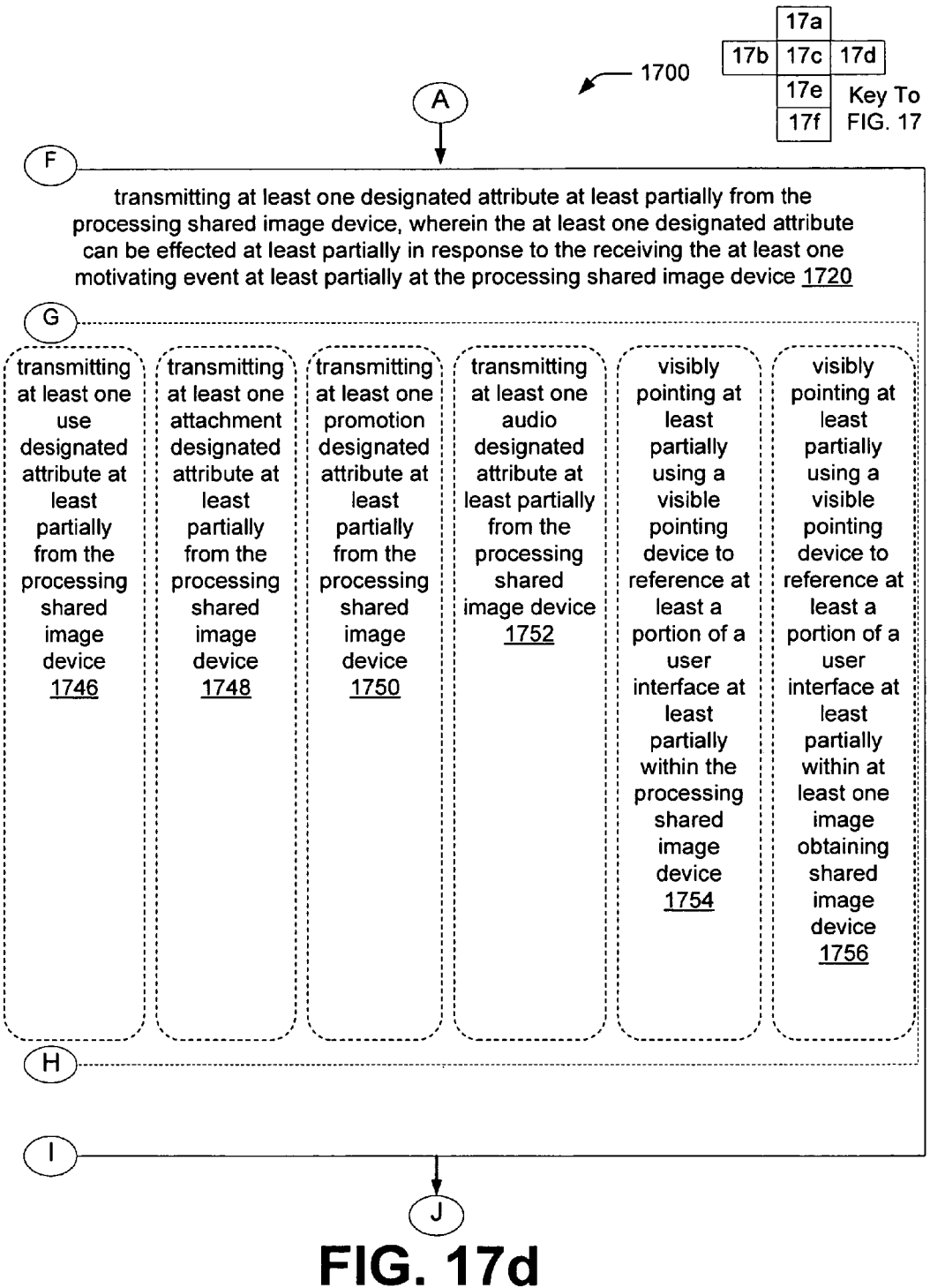
Figure 17E:
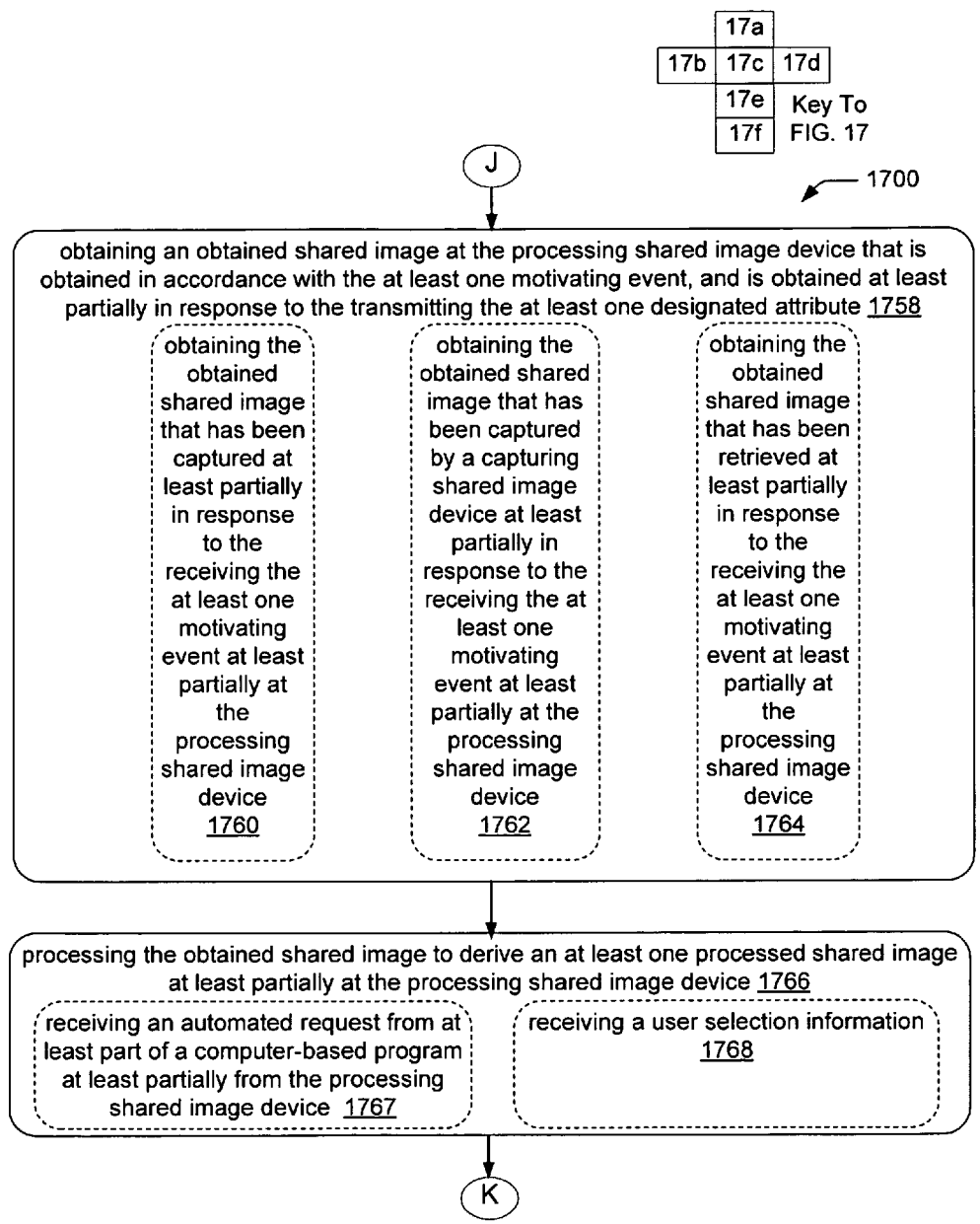

FIG. 16 shows one embodiment of a viewfinder 900 that is integrated within a shared image device 101. As described with respect to FIG. 16, the shared image device 101, such as a digital camera or camcorder, may be configurable to capture and/or retain shared images. Alternatively, the shared image device 101 can be a portable image storage and/or display device, or a computer to obtain and/or retain shared images. Certain embodiments of shared image devices do not include the viewfinder 900, and as such would not be used to display shared images. In this disclosure, the viewfinder 900 refers not only to traditional optical viewfinders, but also to liquid crystal display (LCD) or other displays such as might be located on the back of the digital camera or camcorder.

As described with respect to FIG. 16, the shared image device 101 is in communication via a communication link of 104 with the capturing shared image device 101c. For example, the capturing shared image device 101c is configurable for capturing images, certain ones of which can be shared images. The viewfinder 900 can thereby display certain images captured by the instant shared image device 101 over a local capturing portion 908 of the viewfinder 900, and also display images captured by the remote capturing shared image device 101c over a remote capturing portion 910 of the viewfinder. For example, shown in FIG. 16 are images 1 and 2 from a shared image device 1, and images 1 and 2 from a separate shared image device 2; these images may serve as examples of shared images. In addition, different embodiments of the shared image device 101 as described with respect to FIG. 16 are configured as a capturing shared image device (that can capture an image), or alternately as a peripheral shared image device. As an aside, note that although a certain configuration of the local capturing portion 908 and the remote capturing portion 910 are shown, in certain embodiments of the viewfinder 900 other configurations/locations of the remote capturing portion 910 in addition to the local capturing portion 908 are possible.

The selection of a relative display of the remote capturing portion 910 relative to the local capturing portion 908 over the viewfinder 900 is a design choice, and the present description is not intended to be limiting in scope. For example, the remote capturing portion 910 of the viewfinder 900 can be provided relative to the local capturing portion 908 as an overlying window, an underlying window, a top or bottom window, an additional box, overlying text that is physically typed above the local capturing portion 908, or a variety of other configurations that are known to those skilled in graphical user interfaces (GUIs) such as Windows (as designed and made commercially available by Microsoft) and Mac (as designed and made commercially available by Apple Computer).

Also described with respect to FIG. 16 is a feedback line 906 that provides a user interface between a shared image device 101 and another shared image device 101c. The embodiment of the feedback line 906 as described with respect to FIG. 16 allows a user at a local shared image device 101 to provide imaging input to a shared image device 10c. Certain embodiments of the feedback line 906 can be configurable as a wireless link, similar in configuration to the communication link 104. In certain embodiments, the feedback line 906 can be integral with the communication link 104. Utilizing certain embodiments of the feedback line 906, the user at the shared image device 101 thereby provides feedback to the remote capturing shared image device 101c as to what they want to see, or to particulars of capturing current or future images.

In one embodiment, the feedback line 906 includes an audio transmission line, by which one user can indicate to another user at the shared image device 101c to, perhaps, move the particular shared image device 101c to another location, detect a different field of view, zoomed in or out, otherwise adjust the settings of the capturing shared image device, provide a shared image, do not provide a shared image, capture another shared image, to not capture another shared image, or perform a variety of other task(s) with the shared image device 101c.

Non-verbal instructions, similar in nature to those described as being transmitted over the audio version of the feedback line 906, can also be transmitted over a text-based or other graphical version of the feedback line. For example, a user in one shared image device can indicate to a user and another shared image device to scan in another direction by using a series of the arrows or other recognizable indicators that are transmitted utilizing GUI nomenclature via the feedback line 906. One user can also type to a remote user to zoom in or out.

The different embodiments of the feedback line 906 can be added, in addition to those feedback lines that are integral with each communication link 104, as described in this disclosure. Increasing the types and amount of communications that can be transmitted utilizing the feedback line 906 can thereby provide more interaction between the users and remotely-located shared image devices, thereby potentially improving an overall image sharing experience.

As described in this disclosure, certain embodiments of the viewfinder 900 thereby can be configurable in a variety of configurations to display the images in a variety of formats depending upon the type of the shared image device, the volume of data that is available to store therein, the amount of shared images that actually are stored therein, and the user input.

The viewfinder 900 may be utilized in a variety of shared image devices 101 to display certain shared images. As such, a first shared image device can capture or copy a shared image, or a portion thereof, from a second shared image device at a remote location from the first shared image device. Under these circumstances, the first shared image device can actually utilize the imaging aspects or equipment of the second shared image device. Instead of photographing a vision or scene with multiple shared image devices, the scene can be photographed by only one device, and the distributed images can be combined to be copied or shared with other shared image devices.

It is thereby possible in certain embodiments to utilize another shared image devices' viewfinder 900 including the local capturing portion 908 and the remote capturing portion 910; such that one user can see what's on somebody else's shared image device. Suppose, for example, one shared image device that is at a child's birthday party is positioned at a swing while a second is at a swimming pool. It may be desirable to switch between the images that appear in the viewfinder 900 of the multiple shared image devices. Such viewfinders can exist in many embodiments of the peripheral shared image device 101 that is providing some operation information over a communication link 104 to the designating shared image device 101j, the processing shared image device 101e, and/or the shared image device (see e.g. FIG. 5 or 6) to control an operation of the capturing shared image device.

This use of switching viewfinders 900 for the shared image devices can also be applied to business, educational, personal, or other applications. For example, there might be multiple blackboards or whiteboards in a classroom that can be captured by multiple shared image devices. Alternatively, a user may wish to view what is going on in one class while attending another. Certain embodiments of the shared image device as described in this disclosure can thereby, essentially, bookmark activities at another shared image device.

In certain applications, it may therefore be worthwhile to view somebody else's viewfinder 900 as opposed to just obtaining or retaining shared images that might have been captured. This also provides a technique to view the viewfinder 900 of another shared image device. For example, one shared image device can be used to indicate to a second shared image device that the subject of the first shared image device; as such, please capture an image at the second shared image device for the first shared image device.

Sharing or copying images between multiple shared image devices can thereby be considered as copying a captured image from the capturing shared image device to the other shared image devices (such other shared image devices can be configurable either as a capturing and/or peripheral shared image device). The quality, resolution, and other characteristics of each shared image are initially determined by the image in properties of the capturing shared image device that captured that shared image.

Consider that, in one embodiment, a first shared image device has a higher resolution compared to other shared image device(s), such that relatively high quality shared images can be copied and distributed with other shared image devices (that are only capable of capturing lower resolution shared images). In certain sharing sessions, the best, or highest resolution, shared image device, or those used by the best photographer, can be used to capture shared images or portions thereof for other sharing devices in the sharing session. Each image or photograph can be captured by the particular desired capturing shared image device (highest resolution, least memory used, flash capability, demonstrated ability to take good shared images, etc.). The shared images captured by multiple shared image devices can then be copied or shared into each desired shared image device.

As such, a particular user may have a number of capturing shared image devices, each shared image device is considered optimal to capture a particular type of image. The sharing mechanism as described in this disclosure thereby allows the shared image that is being captured by each of these capturing shared image devices to be transferred between these multiple shared image devices to one or more selected shared image devices. Those images received by the selected shared image device from each of these "optimized" shared image devices are thereby identical to those images captured by the capturing shared image device.

Certain embodiments of the viewfinder 900 provide a mechanism by which the shared image device displays those images which, in time, can be copied to at least one other shared image device.

In one embodiment, the viewfinder 900 is used to subscribe to data from other shared image devices. New functionality might be provided to one shared image device based on the images, data, and/or information being shared or copied from other shared image devices. For example, the viewfinder 900 might annotate its display to show which geographic areas have been sufficiently captured or covered by previous shared images. In the case where the shared image device 101 is a digital camera or camcorder, that new functionality may include an enhanced resolution, an occlusion removal, etc.

The viewfinder 900 can be utilized to publish the presence of its information to users. For example, the viewfinder might annotate its display to show those areas of a shared image that are most desired by other users. The user looking through the viewfinder 900 might alter the subject of the current shared image (such as by changing direction or zooming) based on what it detects as the most valuable people, places, or other subjects to photograph. Within this disclosure, the term "valuable" is highly subjective, and can refer to, e.g., an area that has not already been captured by other cameras (for example a particular child at a birthday party who has not been frequently imaged, a remote corner of a park at a particular time of day, a publicly-known individual, a group of individuals, or a person involved in an activity specifically requested by someone). Such determination of a particularly valuable individual or image can be input manually, or somewhat automatically using a recognition program or positioning program.

In certain embodiments, the viewfinder 900 can also indicate what has already been shared. Using image processing techniques, prior shared images can be considered. For example, children at a birthday party whose images have been captured (photographed) frequently might, in certain embodiments, appear differently within the viewfinder 900 compared to those having few captured images. In one embodiment, a user of a shared image device such as a digital camera or camcorder visually scans around a room during a sharing session such as a birthday party, and those kids who have been photographed often might get some indication on the viewfinder 900. As an example, less captured subjects may "sparkle" compared with more captured subjects. In one embodiment, such functionality can be provided depending largely on the real-time recognizers that can analyze or store the identity of particular individuals. Areas in the viewfinder 900 that are more valuable to photograph might sparkle or display an outline or be color-coded in certain embodiments of the viewfinders for the shared image devices. An explicit monetary value indicator might also be associated with these valuable areas.

In certain embodiments, positional information such as those from global positioning system (GPS), metadata, or those including reference to some geographic location, particular individual, or setting can be used to indicate where certain pictures have been captured. For example, if outdoors, then GPS derived positional information can be used to indicate the physical location, and therefore information about the subject, of a particular photograph.

Consider that the viewfinder 900 display indicates that a large number of pictures have been captured of the same birthday cake, etc. In certain embodiments, this similar-composition shared image can be applied to devices lacking a sharing mechanism, as well as a shared image device 101. For example, if a particular user has captured a large number of images of one particular object, they would likely want to have an indication of it so that they can change the subject of further images. In another embodiment, perhaps a birds-eye view can be provided on at least some of the shared image devices to indicate where prior shared images in the sharing session have been captured. The recognition algorithm can vary widely in scope. For example, in one embodiment, positional information relating to where shared images have been captured could be indicated and searched, based on derived GPS coordinates and/or other positional information. In one embodiment, those shared images that the current shared image device (or any particular shared image device) has captured can be highlighted in some manner along the bottom, side, top, etc. of the viewfinder 900.

In certain embodiments, pictures can be sorted based on color schemes, or color map queries. An example might be considering N shared images that appear most similar to M shared images (where M and N identify particular shared images) from a computational perspective. In those instances, images that have been stored in memory can be quickly accessed and returned to one or more of shared image devices. This type of task can be configured to, for example, view images chronologically, based on their subject, based on their location, or based on their value, etc. can be achieved using commercially available pattern recognition programs that are configured to recognize such patterns. Instead of viewing the shared images based on their time sequences, the images are sorted based at least partially on composition in certain embodiments of shared image devices. Image processing or signal processing techniques can be applied to the shared image devices to determine certain characteristics of the shared images.

As technology improves, more memory storing-capabilities will likely be provided to many individual shared image devices such as digital cameras, camcorders, printers, and other such capturing and peripheral devices. The cost of individual digital shared images will likely continue to decrease as the associated technology improves. The sharing or copying of a considerable number of shared images from one capturing shared image device to another will become more affordable, especially as memory storage cost drops.

Other types of shared image sorting, shared image querying, or shared image storing techniques may be provided by a computer after the shared images could have been obtained or retained from a digital camera, camcorder, or web site. However, this feature will also likely be useful for the sharing mechanism between multiple shared image devices.

In one embodiment, the most recently input information (e.g., one or few shared images) of the sessions shared image devices 101, such as digital cameras, can also be shown on the viewfinder 900 such as shown with respect to FIGS. 16 and 22-25. For example, display the last five or ten shared images captured in one embodiment. In another embodiment, thumbnails of the images as described with respect to FIG. 23 can be provided (e.g., the last four thumbnails that provide an image having a greatly reduced resolution and dimension from the original image). Alternatively, the metadata can also indicate the time that each image has been captured by the member shared image devices that have been participating in the session (e.g., organize by the latest captured images). These figures are intended to be illustrative in nature, not limiting in scope.

In certain above-described embodiments of the viewfinders 900 as described for example with respect to FIGS. 16, and 22-26, the remote capturing portion 910 can be inserted as a distinctive window or text that is layered above a separate local capturing portion 908. This viewfinder configuration enhances use of the local viewfinder while monitoring shared images that might have originated from remote devices.

Figure 25:
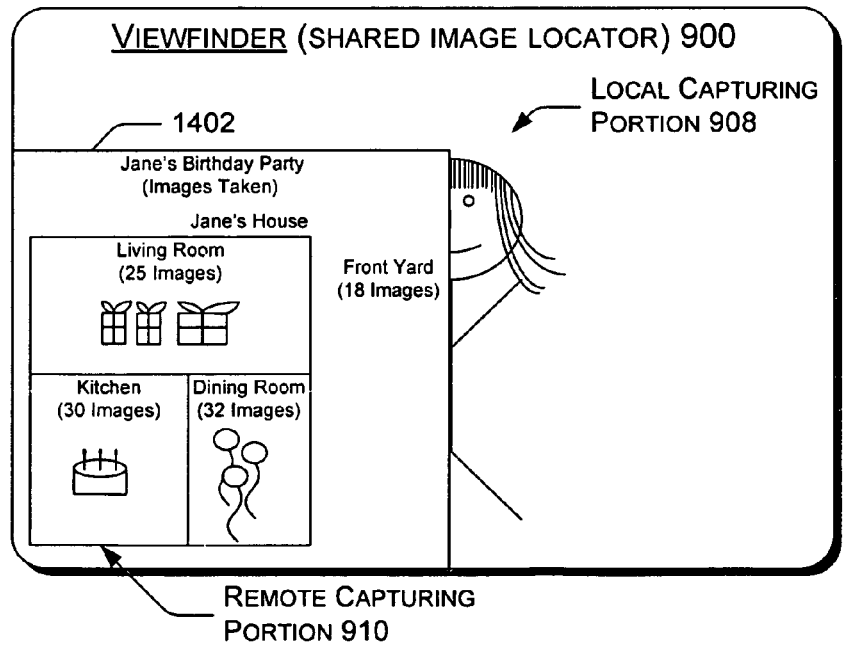
FIG. 25 shows a front view of still another embodiment of the viewfinder.
Figure 26:
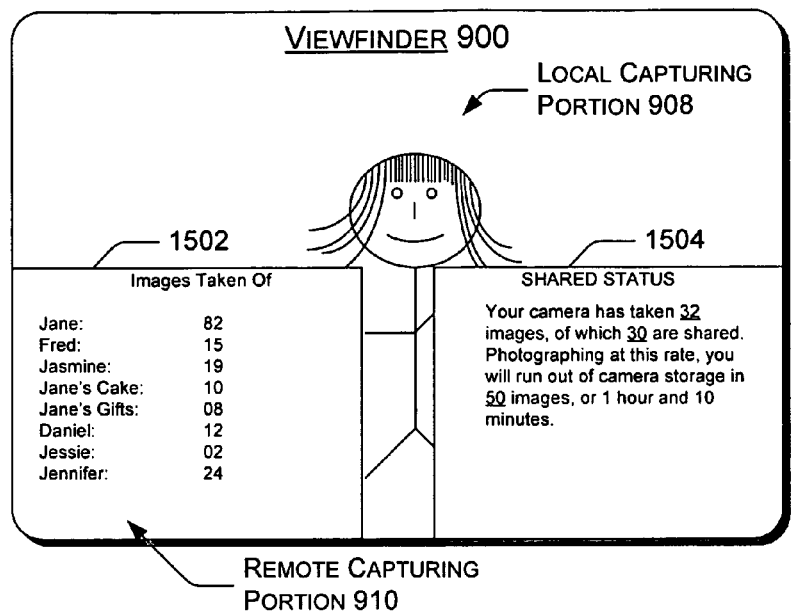
FIG. 26 shows a front view of yet another embodiment of the viewfinder.

A variety of viewfinder displays can be provided, such as illustrated in FIGS. 25 and 26. The embodiment of the viewfinder 900 as described with respect to FIG. 25 contains an inset portion 1402 that indicates how many images have been captured at a particular session in each of a variety of geographic locations. For example, the number of photographs captured in a living room, kitchen area, dining room, or outside is indicated. The number of images that have been captured can further be segmented according to the configuration of the particular shared image devices (e.g., the total captured images that have been captured in the living room include three from shared image device 1, five from shared image device 2, etc.). The geographic positioning of the shared images can further be displayed in any desired manner. Such description of the number of images taken within portions of houses can be indicated by a user inputting, for example, the general layout and positioning of the rooms within the house using, for example, software that the user can use to draw the various rooms.

The user of each shared image device might thereupon be prompted as to the specific room, region, or other locational area in which a particular shared image can be captured. Alternately, additional positioning equipment such as a GPS unit can be installed in each shared image device, and the locations of the photographs and thereupon be applied to the particular rooms depending upon the derived GPS positions (e.g., as described by metadata).

Another embodiment of the viewfinder 900 is described with respect to the inset 1502 of FIG. 26, in which the view finder indicates the number of images captured of each subject within the session. Certain embodiments of the viewfinder 900 can indicate the number of images captured of each subject by each respective shared image device. The inset 1502 indicates, for example, that only two images have been captured of Jessie, and as such, she might be a prime candidate to be the subject of more images. Such indications of the number of images captured of each particular subject can be either manual (e.g., each user of a shared image device indicates the name of the subject for each image) or substantially automatic (e.g., the shared image device contains some recognition device that recognizes the identity of each subject for the shared images captured during the session, and thereby determines the identity of the subject for each image). There can be a number of different embodiments or versions of recognition software that can be utilized in different embodiments of the shared image devices, as described within this disclosure.

Certain embodiments of a status insert 1504, as included in the viewfinder 900 as described with respect to FIG. 26, can indicate the percentage of the operational resources for the shared image device that have been utilized. The used resources as indicated in the status insert 1504 can include, for example, the number of images captured, the number of images remaining, the percentage of storage memory remaining, the amount of battery life remaining, etc. Certain embodiments of the viewfinder as described with respect to FIG. 26 can be configurable to obtain or retain shared images. The rate of obtaining or retaining by that shared image device as well as the memory storage size of that shared image device largely determines how much time will remain until some prescribed duration is reached for capturing shared images.

As such, metadata can be associated with a particular shared image. For example, metadata can indicate a camera in a sharing session that took the shared image, the owner of the camera that took the shared image, the geographic location that the shared image was captured, the identity of an individual being imaged, subject of the shared image, the identity of the particular sharing session, etc.

Figure 27:
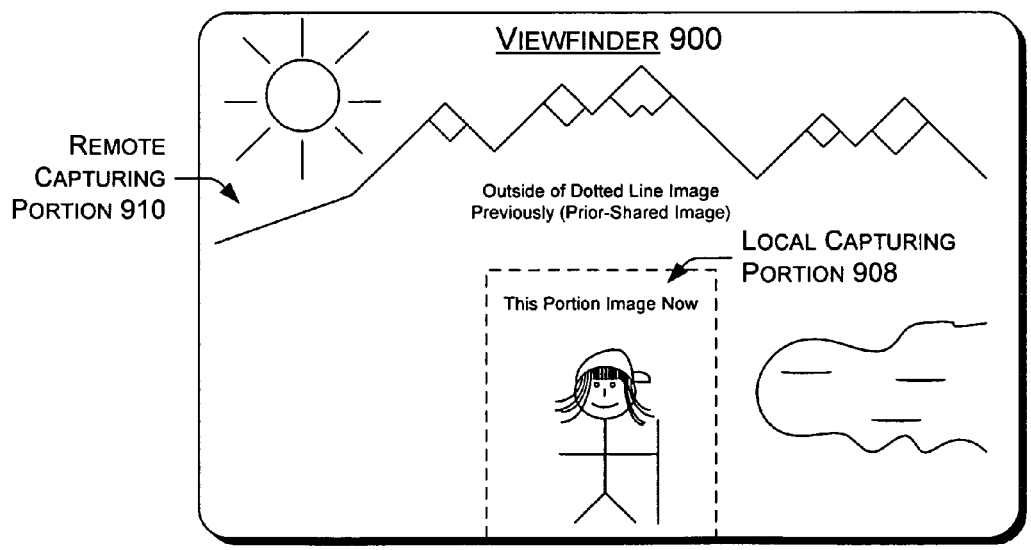
FIG. 27 shows a front view of yet another embodiment of viewfinder where an image that is being currently captured is being integrated into a number of previously-captured images and FIG. 28 shows one embodiment of a sharing menu display that act as a portion of a sharing mechanism.

Another embodiment of the viewfinder 900 displays the local capturing portion 908 within the remote capturing portion 910 as described with respect to FIG. 27. These embodiments of viewfinders can be used to provide a view of a combined image that can be captured. For example, the combined image that is captured by the shared image device largely reflects that provided within the viewfinder, in which a local subject contained within the local capturing portion 908, can be inserted into a remote capturing portion that may have been previously or remotely imaged. The combined image that is imaged can thereby, for example, be formed by combining at least a portion of a first image captured at a local capturing portion 908 (e.g., captured by a local shared image device) with at least a portion of a second image captured at a remote capturing portion 910 (e.g., captured either by the local or by a remote shared image device). For example, the viewfinder 900 as shown in FIG. 27 can illustrate the appearance of the combined image to a user over the viewfinder 900.

In one embodiment, the local shared image device can be provided with a panoramic vision. The panoramic view formed partially by including other shared images can be configured to appear in the viewfinder 900 as a ghosted feature or framing feature as displayed in FIG. 27 (e.g., that includes, for example, mountains or trees). For example, the area outside of the dotted lines in FIG. 27 might represent those images captured previously, such as with the same or another shared image device, of a picture of Mt. Rushmore, Yosemite, portions of New York, etc., perhaps on a sunny day, at sunset, or at some other particularly photogenic period. By using framing features, a shared image device can capture the user within a portion of an image, but not the entirety of the image. The remainder of the image can be considered as a framing portion, while the portion being captured can be considered as a framed portion. The currently-imaged portion that is shown within the dotted lines can include the local capturing portion 908, which in many cases includes the immediate subject (e.g., wife, family, etc.). It is to be understood that certain embodiments of the shared image devices may not only share substantially-simultaneously captured images, but they may also share multiple images that have been captured at different times, different days, and even at different locations compared to when one or more portions of the images have been taken.

A variety of graphical user interface (GUI) techniques (GUIs, in general, are commercially available) can be applied where the local capturing portion 908 is integrated within the remote capturing portion 910, as described with respect to FIG. 27. Such varying techniques of overlaying GUI windows, for example, are familiar to many users and designers of windows-based operating systems such as Windows or Mac.

It might be interesting, for example, to combine multiple ones of these shared images using a similar ghosted feature to provide a single shared image. Similarly, embodiment involves providing a three-dimensional shared image using multiple photographs (e.g., two, three, or more) of the same shared object from different angles. A variety of imaging applications, such as providing a driving or aircraft simulator, teleconferencing, etc. may be accomplished in which a variety of shared images are overlaying other shared images, at which certain of the overlaying shared images can include motion images to our present, for example, motion of instruments associated with such simulators. Such interlaying of images may provide a particularly realistic image.

From another aspect, such overlaying of static and/or motion images as associated with many embodiments of a share mechanism described within this disclosure relative to some description of where to place a particular shared room image device to achieve some multi-image effect with other shared image devices utilizing windowing or similar GUI techniques. Some software can be utilized to achieve the panoramic/3-dimensional/or other effects as desired. Certain embodiments of viewfinders for shared image devices involves using other people's shared image devices such as cameras, to insert old bookmarks at locations in where their cameras could have been located.

One viewfinder 900 embodiment involves using other people's shared image devices such as cameras, and put old bookmarks at locations in where their cameras could have been located.

In yet another embodiment, the viewfinder 900 of the shared image device can be provided with an indicator that provides positional information as to where the images have been captured. Such positional information can range from, but not be limited to, metadata that contains the latitude/longitude, GPS waypoint, within a known commercial location (e.g., at Sears, Starbucks, etc.), at some residential location (within the living room at the Jones'), etc.

Examples of Variable Resolution

Different embodiments of the shared image devices can provide images with different resolutions. In fact, certain shared image devices can alter the resolution of their images. Certain embodiments of shared image devices can increase the number of images that can be shared or imaged by adjusting the resolution of one or more of the images. In certain embodiments of shared image devices, the entirety of, portions of, or information relating to, the images captured during a sharing session can be viewed on the viewfinder of the shared image device. Conceivably, the ones that a user has captured, or that satisfy some other criteria, will be accepted at the highest resolution. Varying the image resolution therefore partially pertains to the capacity of the shared image device, as described above. Other images will be accepted at low resolutions. In certain embodiments, the lower resolution images can be kept, rejected, or selected having a corresponding higher resolution image obtained or retained in the future.

Commercially available technology can provide always-on video, for certain embodiments of shared image devices. Such always-on technology can likely be applied to shared image devices. As such, actuating the sharing mechanism may be one technique for determining interest of a particular shared image, wherein another user of a shared image device can provide feedback via audio as to how a shared image can be altered (e.g., modify the subject, vary the resolution or zoom of the image, etc.). If the current image appears interesting, one user of a shared image device can turn on an audio microphone to communicate with another shared image device, and either capture a current image and/or a current sound. Additionally, if there is one image of particular interest, it may be desirable to obtain or retain five images chronologically on either side of that image that had been captured by that particular shared image device.

Consider a shared image device application such as a friend providing live pictures of a ski resort, a beach area, and/or a snowy pass that have been captured using a share mechanism, wherein the current weather conditions make a difference. The sharing mechanism 102 can be used to access such information on a near-real-time basis. The images that can be accessed on a near-real-time basis may have reduced highest resolution. As such, it may be desirable to reduce the resolution for certain imaging applications.

The variable resolution control represents another embodiment of a capacity-control device. Consider that lower-resolution images (e.g., thumbnails and/or metadata) generally require less memory storage than higher-resolution images. As such, for a given memory, a larger number of lower-resolution images can be stored than higher-resolution images. In addition, capturing higher-resolution images often utilizes more battery life than with lower-resolution images. All of these factor into the type of image that is to be stored.

In many embodiments of shared image devices, converting the resolution of images may utilize considerable device energy, such as battery life. As such, to reduce the drain on the energy expended by certain battery-powered devices during resolution conversion processes; it may be desired to transfer images to another shared image device(s) so that the other shared image device (that presumably has greater energy, such as a printer or computer that may be plugged in) can vary the resolution of the images.

Further consider those instances where a user of a shared image device has filled their device with high-resolution images. This user will be able to utilize capacity control by storing further images as thumbnails and/or metadata that in certain embodiments can be accessed later when the user obtains or retains their current image, or otherwise obtains more memory. In certain embodiments, the user will be able to access the high-resolution versions of all of the desired images from home, or some other location, via a network.

Many shared image devices that are configured to capture images and/or otherwise process images in different resolutions. Within this disclosure, the term "resolution" provides a measurement of image detail, such as can be expressed as pixels per inch, dots per inch, or samples per inch, etc. In certain embodiments, the files size of an image is a function of its resolution, and with certain embodiments of relatively limited storage-capability cameras, relatively few high resolution images can be captured. It may be desired to convert the resolution of certain images depending upon their particular application and/or the configuration of the particular device.

A variety of devices including, but not limited to, shared image devices can be configured to perform a variety of functions including, but not limited to, imaging, capturing, obtaining, retaining, storing, storing and forwarding, and/or otherwise processing images depending upon the particular resolution(s) for that device, which may differ from resolutions of other devices.

Changing the resolution of an image represents one example of an image transformation that utilizes processing of the shared image device. A number of shared image devices that process images can therefore be configurable for performing one or more image transformations. Within this disclosure, examples of such image transformations include, but are not limited to, changing the resolution of one or more images, resampling one or more images, adjusting an exposure of one or more images, adjusting some image content recognition of the one or more images, adjusting image composition of one or more images, and/or modifying at least some metadata associated with the one more images. This disclosure provides a number of embodiments of a resolution conversion portion that can be integrated within the shared image device, or alternatively can be located outside of the shared image device and operatively coupled thereto.

The resolution conversion portion can in certain embodiments, but not others, act to alter the resolution of images that have been captured or otherwise obtained. As described within this disclosure, certain embodiments of the resolution conversion portion are configurable to increase or decrease the resolution of the image such as by utilizing pixel-interpolation and/or combination of multiple images. As also described within this disclosure, certain embodiments of the resolution conversion portion are configurable to decrease or increase the resolution of the image. Different embodiments of the resolution conversion portion are described herein. Within this disclosure, the terms "resolution conversion" and "resampling" can in many instances but not others be considered similar, since both can involve similar processes of altering image intensity and/or color values. Resampling can in certain embodiments, but not others, be equated to sizing the resolution of an image upward or downward; and can in certain embodiments but not others can be implemented by respectively adding or removing pixels from a given image as described in this disclosure.

Within this disclosure, the term "changing the resolution" of an image may pertain in certain embodiments, but not others, to altering the color values and/or the color intensities of a particular image. As such "increasing the resolution" of an image may pertain to increasing the density of pixels that can be provided with distinctly variable color values or color intensities. Decreasing the resolution of an image may pertain to decreasing the density of the pixels forming the image. During a resolution conversion process, in certain embodiments of a display or projector, the footprint of pixels can actually be suitably altered to effectively change the resolution of the at least one image.

In certain embodiments of display devices or projectors, a single pixel intensity can be implemented utilizing a plurality of neighboring pixels, in which each of the neighboring pixels can each have a substantially identical color value and intensity. As such, the plurality of pixels can act as a single pixel with a footprint that corresponds to the planar area encompassing the plurality of pixels.

Within this disclosure, shared image devices are considered those devices that are configurable to image or capture at least one image such as digital cameras or camcorders. The utilization of capturing shared image devices has recently changed considerably (and is expected to continue to change) as the expense of digital storage media continues to decrease while the technology and ease of operation of the digital storage media improves. Capturing images using digital cameras or camcorders can each be equated with photography as performed by conventional film cameras.

Certain embodiments of this disclosure thereby provide a mechanism or technique by which an image capturing shared image device, such as a digital camera or camcorder, can resample or perform resolution conversion of images contained therein. Such resolution conversion or resampling techniques can be energy intensive, and therefore can utilize a considerable amount of energy from the battery of the digital camera. In many embodiments, such resampling by a device may thereby alter the number of pixels that can be set within an image. Images captured at different resolutions can be optimized for different purposes. For example, if one or more particular images are intended to be displayed over a computer monitor, and the resolution of the computer monitor is a limiting factor on the displayed resolution, than a relatively low resolution for the image may be completely satisfactory for its intended purpose. If a particular image is being printed on a relatively large sheet of paper as a print, then it may be desired to have a considerably higher resolution image for its intended purpose.

Additionally, certain images can be utilized by more than one user, and/or for more than one purpose. For example, one user may wish to have both a copy of an image at a particular resolution to be used for one media, e.g., a computer monitor; and another copy of the same image at another resolution to be used for another media, e.g., a printed copy. As such, it may be desired to resample or convert the resolution of a particular image based upon the intended use or desires of each particular user. In those instances where a camera's memory can only store a prescribed number of images, it may be desired to decrease the resolution of certain images, or alternatively increase the resolution of certain images, depending upon the particular use of, and/or the device utilizing, those images. As such, certain embodiments of this disclosure provide a mechanism by which a single image, or a group of images of a fixed or controllable size can be resampled therein.

Advances in technology to shared image devices (such as flash memory) provide for data storage of a relatively large amount of image data within shared image devices. Such increases in the amount of image data that can be stored can be reflected by more images being stored and/or at least some of the images that are being stored having a greater resolution. In many embodiments of the shared image device as described within this disclosure, it is envisioned that the shared image device can be provided with relatively sophisticated processing capabilities, which will allow for image processing that will allow for resampling and/or resolution conversion.

Such resolution conversion, or resampling, as performed by the resolution conversion portion of the shared image devices, can utilize a considerable amount of device energy capacity. Such device energy capacity is especially important for those devices that have a limited energy sources, such as batteries. Within this disclosure, the shared image device energy capacity can be can represent a variety of techniques including internal battery life estimate, replaceable battery life estimate, auxiliary battery life estimate, or the like. As such, in this disclosure, the term "energy capacity" as applied to the shared image device is intended to apply to the capacity of batteries or other energy sources that supply electrical power to the shared image device, regardless where the energy device is located or mounted with respect to the shared image device. Some other power source from a battery, such as a continual energy supply or an uninterruptible or other energy supply, can also be applied to the shared image device while remaining within the scope of the present invention.

In one embodiment, this disclosure provides a number of techniques by which the amount of energy that is utilized by the shared image device to perform the resolution conversion is estimated or monitored. The user of certain embodiments of the shared image device can include an indicator that provides an indication of the energy necessary to perform the conversion, in many embodiments of which can then be compared on the indicator to the amount of energy currently included in the shared image device. Other embodiments of the shared image device can commence conversion of resolution of one or more images only in those circumstances that the shared image device has sufficient energy to perform the conversion.

In certain embodiments of the shared image device, the shared image device energy capacity can thereby act as one limiting factor for imaging or resolution conversion for the shared image device, based on whether the shared image device has sufficient energy to perform the operation on one or more images. As such, other device capacity techniques or mechanisms can include, but are not limited to, a processing power capacity, a storage memory capacity, or an available computation time capacity. In actuality, many of the device capacities are related. For example, an available computation time capacity for a particular shared image device may relate to an energy capacity for that shared image device, such that increasing the device's energy capacity leads to an increase in the devices computation time capacity and/the devices storage memory capacity.

Certain shared image device capacities can therefore, in certain embodiments, be considered as a limit on some prescribed process that can be performed by that shared image device. For example, if a shared image device has a limited energy supply that is sufficient to capture some limited number of images, than the shared image device may not be able to be utilized after imaging that number of images without an energy source charge, insertion of new batteries, etc. Different examples of a prescribed process that may be of interest to the user of the shared image device therefore include, but are not limited to, altering a resolution of an image, capturing or imaging an image, operating a flash mechanism, obtaining an image, retaining an image, storing and/or forwarding an image, etc. As such, it is to be understood that many of the shared image device's operational capacity capabilities can be heavily burdened by performing typical imaging and other processor intensive operations.

This disclosure thereby provides for a number of different embodiments of a mechanism or technique to estimate one or more operational resources of a shared image device that are utilized to perform an image transformation. The mechanism or technique thereby estimates whether the shared image device has adequate operational capacity to perform the image transformation to transform the one or more images. Different embodiments of the image transformation estimator can include, but are not limited to, and image resolution conversion estimator, and image exposure adjustment estimator, and image metadata modification on estimator, an image content recognition estimator, and an image composition adjustment estimator.

By estimating whether the shared image device has adequate device operational capacity to perform a particular image transformation allows the shared image devices to perform the image transformation if it does, indeed, have sufficient operational capacity. However, if the shared image device does not have adequate device operational capacity to perform the particular image transformation, the shared image device can transfer the image information to another device, that does indeed have the capabilities to perform the image transformation. Another option is to indicate the amount of device capacity (e.g., energy) that would be required by the shared image device to perform the particular image transformation, and compare that to the total device capacity for that shared image device. As such, if a particular image transformation will consume a large percentage of the total device capacity for a particular shared image devices, then the user may decide not to perform that image transformation.

Certain devices such as computers, PDAs, printers, display devices, processing devices, etc. can be provided with an electric cord or a relatively large battery, which represents a virtually infinite energy supply. There are a large variety of commercially-available shared image devices including, but not limited to: cameras, printers, facsimile machines, computers, personal display assistants (PDA), etc. Each shared image device includes some imaging program, such as produced with the hardware, software, or firmware, that is configured to perform some imaging process that is consonant with the intended purpose of the shared image device. Examples of imaging processing techniques include, but are not limited to, data compression, data decompression, resolution enhancement, resolution reduction, noise reduction, filtering, etc. As such, in certain instances users of shared image devices can consider that it often may be beneficial to transfer some or all of the images to such large-capacity devices.

One embodiment of a shared image network 100 is described with respect to FIG. 7. The shared image network 100 pertains to any motion picture imaging system or still picture imaging system that is within the described intended scope of the present disclosure, unless otherwise indicated. One embodiment of the shared image network 100 includes a shared image device 101, an optional peripheral shared image device 120, and an optional communication link 104.

The shared image device 101 is configurable to capture images. In different embodiments, the shared image device 101 can be configured as, but not limited to, a digital camera, a camcorder, a cellular phone with picture taking capabilities, a computer or PDA with picture taking capabilities, etc. The shared image device 101 can be operationally sub-divided into an imaging portion 615 and data storage portion 614. Different embodiments of the shared image device 101 can capture, or photograph, a variety of images including, but not limited to, still images, motion images, video, audio, thumbprints, or other information relating to the images such as metadata. Different embodiments of the shared image device 101 can be configured to capture, obtain, retain, or otherwise process a variety of images including, but not limited to, color images, grayscale images, etc.

One embodiment of the shared image device 101 is configured to convert to the resolution of images that have been captured, retained, or obtained to a different resolution. This disclosure describes a variety of illustrative image transformation techniques for shared image devices, that are not considered to limit the scope of the present disclosure. For different embodiments of the shared image device 101, depending upon the functional purpose of the shared image device 101 and other considerations; the resolution can be converted from either a higher resolution to a lower resolution, or alternatively from a lower resolution to a higher resolution. One aspect of such resolution conversion as may be performed by many embodiments while not other embodiments of the shared image devices 101, is that such resolution conversion techniques can consume a large amount of energy for the shared image devices such as battery life.

The resolution of the images within the shared image device 101 can be adjusted manually, automatically, or semi-automatically, utilizing the different embodiments of the resolution conversion techniques as described herein. Such manual adjustments of the shared image device can be performed, for example, by a user responding to input that is displayed on the viewfinder; and based on the users previous experience, understanding how much energy is necessary to perform such conversion. In other embodiments, altering of a resolution level can be performed substantially automatically utilizing the controller 603. For example, the controller 603 can receive input or monitor the current or recent energy state or life expectancy of the battery or other energy device, consider the amount of energy utilized by the shared image device 101 to convert the resolution of the at least one image based at least partially on the number of images whose resolution is to be converted. The shared image devices 101 can contain a wide variety of displays to provide this information to the user. In many embodiments, the device operational capacity indicator (e.g., an energy level indicator) of the shared image device can reduce the number of images that can be captured, and thereby increase the effective useful life of the shared image device. In many embodiments, but not others, it may be desirable to limit the energy consumed by the display similar to it being desirable to reduce the amount of energy utilized by the resolution conversion.

The image resolution conversion energy monitoring technique can also include a number of optional steps. If the shared image device does have sufficient energy to convert the resolution of the one or more images, then the shared image device can convert the one or more images from the first resolution to the second resolution. If the shared image device does not have sufficient energy to convert the resolution of the one or more images, then the shared image device can transfer the one or more images from the shared image device to a second device (such as the peripheral shared image device 120). The conversion of the resolution of the one or more images can be performed at the second device from the first resolution to the second resolution. Presumably, the energy level available to the second device that can be configured in certain embodiments as a peripheral shared image device 120 and in other embodiments as a device that does not necessarily capture or photograph images, but instead processes images. The ability to convert the resolution of the images is presumably greater in the second device than in the shared image device, for example, the peripheral shared image device 120 can be a device that is plugged into an electric outlet, or contain a larger battery, to receive a substantially continual supply of electricity.

Figure 8:
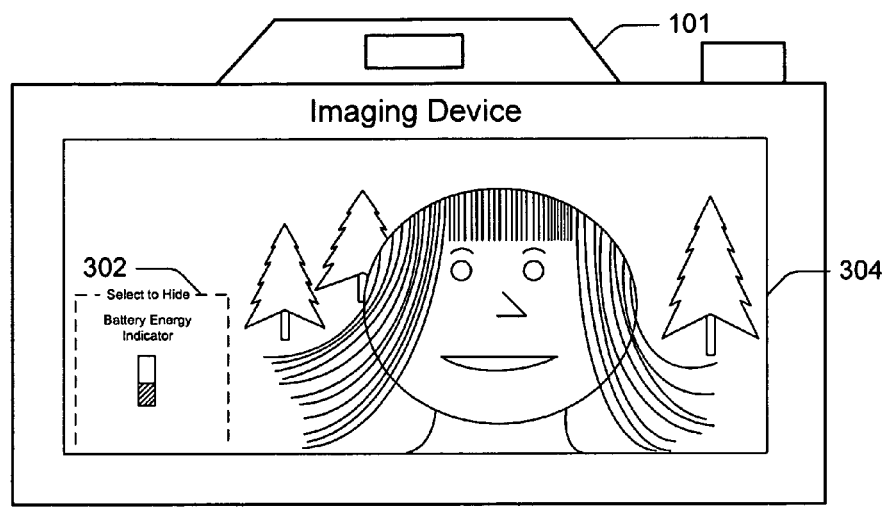
FIG. 8 is a front view of one embodiment of a shared image system that includes one embodiment of an energy level indicator.
Figure 9:
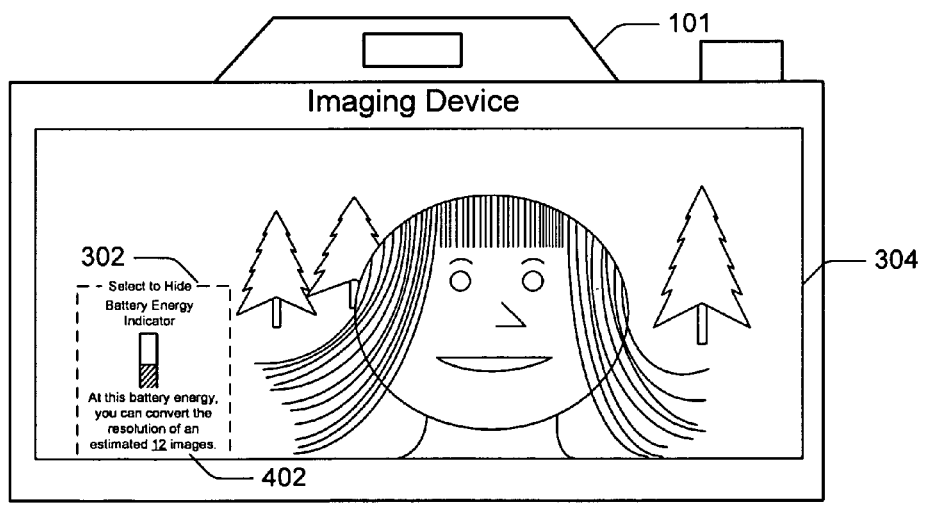
FIG. 9 is the front view of another embodiment of a shared image system that includes another embodiment of an energy level indicator.

FIGS. 8 and 9 illustrate front views of two embodiments of a shared image device 101 that includes energy level indicators 302. In this disclosure, the energy level of a particular device represents one embodiment of the device's operational capacity. As such, the energy level indicator 302 represents one embodiment of an operational capacity indicator. Therefore, the energy level indicator 302 can also be considered as an operational capacity indicator. Certain embodiments of the energy level indicator 302 or operational capacity indicator are configurable to indicate the total energy that the shared image device has remaining in its energy source such as, but not limited to: battery life, additional energy source life, etc. In one embodiment, the energy level indicator 302 is provided within a camera display or viewfinder 304 that is contained within the shared image device 101. Certain embodiments of the camera displays or viewfinders 304 can be provided for such shared image devices as digital cameras or camcorders, and can include liquid crystal display (LCD) displays, optical displays, and a variety of other displays. In certain embodiments of the energy level indicator 302, the energy level indicator can be temporarily provided in a manner that can be controlled by the user of the shared image device 101. As such, if the user sought to see, or visually monitor, the energy level, then a menu-driven option could be selected or alternatively a button could be pressed to display (or alternatively, to deselect to not display) the energy level. In other embodiments of the shared image device 101, the energy level indicator 302 can be provided separately from the camera display or viewfinder such as being built in, as a separate display, within the body of the shared image device.

In one embodiment of the shared image device 101, the amount of energy utilized by the shared image devices to perform an image resolution conversion process of one, or more of the images relating to the shared image device can generally be determined based either on prior device history, are generally on operations by similar shared image devices. For example, a user of the shared image device 101 may understand that resolution conversion of 15 images having a particular pixel dimension (and color value) may utilize 20 percent of the energy of the shared image device. As such, in one embodiment, the energy level indicator 302 can indicate the number of images that can be imaged by the shared image device based upon the current energy level of the shared image device. Within this disclosure, the amount of energy necessary to perform a particular resolution conversion is intended to be illustrative in nature, and not limiting in scope. As an illustrative example, if the energy level indicator 302 indicates that the shared image device has 40% of its energy remaining, the user may not desire to perform a resolution conversion on a relatively large number of images (e.g., 50 images).

Such resolution conversion depending, at least in part, on energy of the shared image devices 101 can be automated, or semi-automated, as well by suitable programming within the controller 603. It may be desired in certain embodiments of the shared image device to illustrate the number of images that have their resolution converted, based on the particular energy level from the energy level indicator 302 of the shared image device 101. For example, FIG. 9 shows one embodiment of an image resolution conversion numerical indicator 402 that indicates, based on the particular energy level indicated by the energy level indicator 302, that twelve images can have their resolution converted as indicated by the image resolution conversion numerical indicator 402. Since, in certain embodiments of the shared image device 101 while not in others, the structure and operation of the image resolution conversion numerical indicator 402 and the energy level indicator 302 can be associated with each other, and such association can be indicated on the camera display or viewfinder based largely upon their relative positioning such as, for example, positioning the two indicators 302, and 402 near to each other within a shared image device display or viewfinder 304, or in another portion of the shared image device for different embodiments of the shared image device.

The particular configuration of the energy level indicator 302 and to the image resolution conversion numerical indicator 402, as illustrated with respect to FIG. 9, is intended to be illustrative in nature, while not limiting in scope. For example, the image resolution conversion numerical indicator 402 can also be a bar graph that indicates the number of similar images to those that are being considered to be resampled, that can be resampled, based upon the current energy level of the shared image device. As such, depending on the particular operation, dimension, and desired appearance of the image resolution conversion numerical indicator 402 or the energy level indicator 302, either of the indicators 402 or 302 can be configured as a numeric indicator, as text, as a bar graph, as a graph, as a percentage indicator, or as any other numerical or percentage indicator as desired. It is also to be understood that the indicators 302 or 402 can be configured to appear as desired based upon user input, device utilization, and device condition, and be non-visible during other times. For example, when a user is providing input to alter the resolution, it is likely that both indicators 302 and 402 should be made visible over the camera display or viewfinder. During other periods, the indicators 302 or 402 may not be shown in certain embodiments of the shared image device 101.

As described in this disclosure, there are a number of embodiments of resolution conversion to be performed by certain embodiments of the shared image device 101. Such imaging conversion processes can be generally categorized as either increasing the resolution or decreasing the resolution of images being captured by, contained within, or retained within the shared image device 101.

Examples of Image Transformations

Within this disclosure, examples of such image transformations and other transformation processes include, but are not limited to, changing the resolution of one or more images, resampling one or more images, adjusting an exposure of one or more images, adjusting some image content recognition of the one or more images, adjusting image composition of one or more images, and/or modifying at least some metadata associated with the one more images. This disclosure provides a number of embodiments of a resolution conversion portion that can be integrated within the shared image device, or alternatively can be located outside of the shared image device and operatively coupled thereto.

Figure 10:
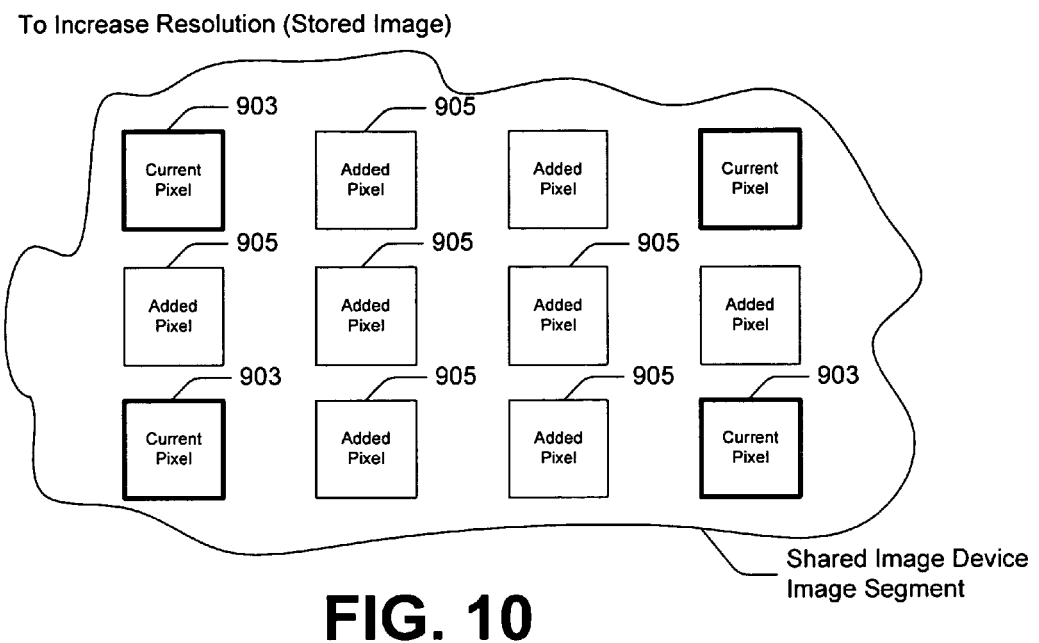
FIG. 10 is a schematic diagram of one embodiment of a resolution conversion technique that increases resolution.

FIG. 10 shows one embodiment of a resolution conversion process that increases the resolution of the images. Considering this resolution conversion technique, a number of current pixels 903 (four shown) are contained in the original image prior to the resolution conversion process. A number of added pixels 905 (eight shown) are added by the resolution conversion process. A color value is assigned to each added pixel 905 depending upon the position of the added pixel with respect to one or more other current pixels 903. For example, and in one embodiment, if an added pixel is located between two current pixels, than each color value (the color value may be subdivided into three color values including red, green, and blue in one embodiment, or grayscale in another embodiment) can be determined as a mathematical function based at least in one part on the distance between the current pixels, in the color values of each current pixel. For illustrative purposes only, assume that in the upper row of FIG. 10, the top left current pixel has a blue-color value of six, and the top right current pixel has the blue color value of nine. Since there are two added pixels between the two current pixels in the upper row, following mathematical operations such as may be performed by calculator, and/or by computer, or by other techniques in certain embodiments, wherein the lefthanded added pixel in the upper row of FIG. 10 might be expected to have a blue color value of seven assigned thereto, while the right handed added pixel in the upper row might be expected to have a blue color value of eight. Such mathematical computations can be applied to data storage in one dimension, or two dimensions in different embodiments.

In those instances that the color value does not mathematically round off evenly, in certain embodiments but not others, the color value can be assigned to the next-closest integer or fractional value provided by the shared image device. Similar numerical computation can be preformed for each of the green color value, red color value, and/or gray-scale color value and supplies to the particular image(s) whose resolution is being converted. Such mathematical functions that are utilized to derive the color values of the added pixels can depend, at least in part, on well-known and established mathematical weighing operations that could be performed within the controller 603 and as described with respect to FIG. 7.

While one embodiment of the resolution conversion process, that is utilized to increase at the resolution of a stored image, is described with respect to the upper row of current pixels and added pixels in FIG. 10 along a single axis (e.g., in the horizontal direction), such techniques can also be applied along another axis, or even along a diagonal, utilizing generally known weighing techniques such as described in a large variety of textbooks and articles, and commercially available in a variety of products and textbooks.

In a number of embodiments of the resolution conversion techniques of certain shared image devices 101, the actual dimension (e.g., footprint) or the intensity of light generated by the pixel can be modified by the conversion. For example, even though FIG. 10 shows a number of embodiments of current pixels having a number of pixels added therebetween during a resolution conversion technique, in certain embodiments, the current dimensions of the pixels may utilize a considerable amount of space, such that the display or viewfinder would not allow the addition of added pixels of the same dimension in between the current pixels. In those embodiments, the footprint of each current pixel over the display may be decreased in dimension, in such a manner that the added pixels can be inserted within an existing pixel array. In certain embodiments, to increase a resolution, the color intensity of the current pixels can be reduced, and a color intensity of the remaining pixels can compensate for the reduced intensity. As such, the overall color intensity values of the image can be maintained, the resolution of the image can be improved, and the final image can appear sharper following the increase of resolution in many embodiments of the shared image devices 101.

Figure 11:
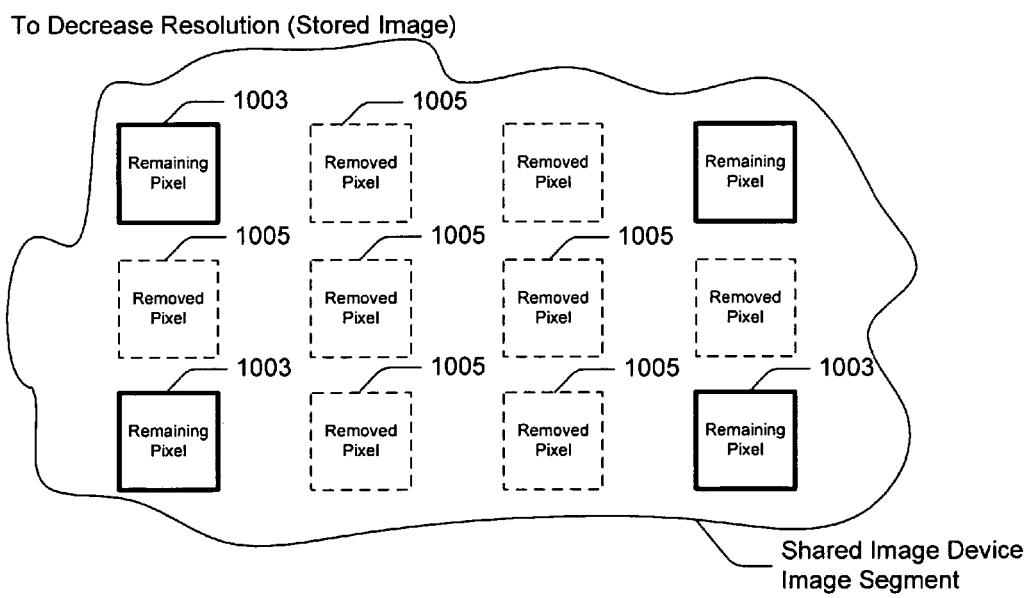
FIG. 11 is a schematic diagram of another embodiment of a resolution conversion technique that decreases resolution.

Another embodiment of resolution conversion process such as can be performed by the controller 603 of FIGS. 7 and/or 15 is described with respect to FIG. 11. The FIG. 11 embodiment of resolution conversion process acts to decrease the resolution of an original image. For example, the original image will contain the remaining pixels 1003 as well as the removed pixels 1005 as shown in FIG. 11. One embodiment of the resolution conversion process acts to remove any illumination or color projected by the removed pixels 1005 from the original indenture to produce the decreased resolution image. As such, in certain embodiments, only certain pixels are selected to be the remaining pixels 1003 whose color values are maintained, while the color values of the removed pixels 1005 are effectively discarded.

In another embodiment of the resolution conversion process that acts as a resolution reduction technique, as described with respect to FIG. 11, at least certain ones of the color values of the removed pixels are not discarded, however they may be stored for latter computational or display use. Such embodiments of resolution reduction techniques can utilize stored color values for the removed pixels to, at least partially, reconstruct the original image. As such, certain embodiments of resolution conversion processes (including both the resolution reduction and resolution increasing techniques) would utilize a non-trivial amount of energy to perform.

In certain embodiments of the shared image device, during certain embodiments of the decreasing resolution technique such as described with respect to FIG. 11, the actual dimension of the remaining pixels can be modified, and/or the intensity of each of the pixels can be adjusted, to compensate for the removal of the remote pixels. For example, in one embodiment, as described with respect to FIG. 11, the color intensity information pertaining to each of the removed pixels can mirror one or more of the color value for the remaining pixels. For example, in one embodiment, assuming that the remaining pixel in the upper left-hand side of the array of pixels has given color value, and five removed pixels can be assigned the same value as the upper-left remaining pixel (or any other selected remaining pixel). In another embodiment, each pixel area corresponding to a removed pixel can be assigned by a new color intensity pixel value, relating to some weighted value pertaining to distances to proximate remaining pixels.

In yet other embodiments, the dimension of a particular remaining pixel can be applied to similar areas as an original remaining pixel, wherein the actual dimensions of the image is produced. As such, in the image as described with respect to FIG. 11, the final image may be e.g., some fraction as wide and another fraction as high as the original image.

By decreasing the resolution, and in certain embodiments of the shared image device, a relatively large number of images can be stored and/or reviewed. In many embodiments, the resolution can be reduced without seriously altering the resulting images, depending partially on the intended use of the image. For example, assume that a shared image device is being utilized to capture images of a house being sold. Under these instances, the resulting images of relatively low-resolution images are perfectly satisfactory to convey the desired information about that particular application. As technology improves, many embodiments of shared image devices are provided with high resolution capabilities. The present disclosure thereby provides a number of mechanisms to be able to modify the resolution (either increase or decrease the resolution), after a particular image has been captured depending upon the particular resolution.

Figure 12:
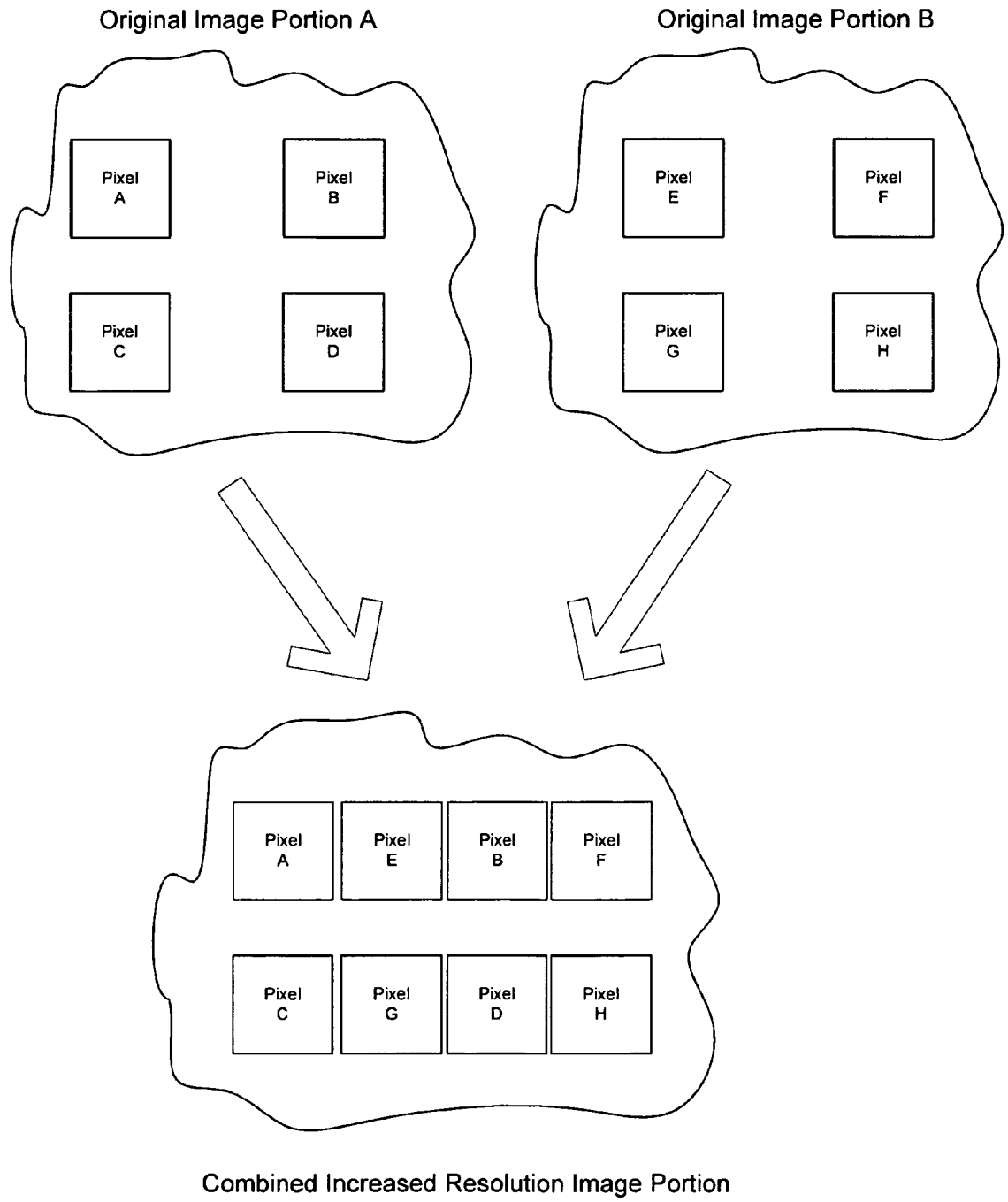
FIG. 12 is a schematic diagram of yet another embodiment of a resolution conversion technique that increases resolution.

Another embodiment of resolution conversion process such as can be performed by the controller 603 of FIGS. 7 and/or 15 is described with respect to FIG. 12. The FIG. 12 embodiment of the resolution conversion process acts to increase the resolution of the original image that is being processed to the combined image. In general, the FIG. 12 embodiment of the resolution conversion process combines original image A with original image B to produce the combined image. The resolution conversion process relies upon interleaving the pixels from the original image A with the pixels from the original image B. While the original image A and the original image B is shown in FIG. 12 as having similar resolution, it is to be understood that the resolution of the original images can vary in many embodiments of the resolution conversion process. The pixels from the different original images can be interleaved within the same row, within the same column, on the diagonal basis, and/or any combination thereof. The embodiment of the resolution conversion process as described with respect to FIG. 12 therefore does not destroy any of the color values as described in this disclosure, but in fact interleaves the pixels while maintaining their color value to produce the combined image.

Certain embodiments of the resolution enhancement techniques as described with respect to FIG. 12 therefore may not utilize the amount of mathematical computation to derive the color values in certain embodiments of the resolution enhancement techniques as described with respect to FIG. 10. In many embodiments, it is important that at least portions of the original image portions be captured of the same general image. In certain embodiments, however the original image portions can be captured at different angles, at different times, from different locations, etc. as desired by the user to create a desired image. Such combining of original images to derive a desired combined image may, in certain embodiments, be utilized to provide more of an impression of depth, or three-dimensionality, to the combined image as well as increasing the resolution of the combined image.

One aspect of the shared image device can involve the use of a reference image from one shared imaging device to perform a transformation on an image taken with (at least one) an other shared image device. For example, consider where a first shared image device takes a photo of a subject; and a second shared image device captures another image (or set of images) of a standard color reference card (e.g., Gretag-Macbeth ColorChecker) or object with known color properties. The standard reference card images from the second shared image device is used to adjust the white balance of the image captured by the first shared image device.

Consider that (a) the second shared image device could be a pretty rudimentary imaging device and that (b) the images from the first shared image device and the second shared image device, used in this way, could be associated by a variety of contextual information. For example, in one scenario, the first shared image device might be one of several high quality stadium or concert cameras that can be accessed by certain shared image devices to users either attending the concert, or outside thereof, depending upon the particulars of the sharing session. The high quality first shared image device can then be used to take photos of the performance in response to user control. The second shared image device might represent one or more single small rudimentary shared image devices that is aimed during each lighting change at an index card sized color test pattern exposed to the same lighting conditions as the rest of the stage, at each lighting queue or detected change in natural lighting. The second shared image device thereupon captures a new image. During sharing processing of each image captured by the first shared image device, a shared image provided by the second shared image device with an appropriate timestamp (the most recent one before the timestamp of the image provided by the first shared image device) is used to perform color balancing (e.g., white balance transformation) such as provided by the first shared image device.

This disclosure thereby provides for a number of different embodiments of a mechanism or technique to estimate one or more operational resources of a shared image device that are utilized to perform an image transformation. The mechanism or technique thereby estimates whether the shared image device has adequate operational capacity to perform the image transformation to transform the one or more images. Different embodiments of the image transformation estimator can include, but are not limited to, and image resolution conversion estimator, and image exposure adjustment estimator, and image metadata modification on estimator, an image content recognition estimator, and an image composition adjustment estimator.

Conclusion

This disclosure provides a number of embodiments of the sharing mechanisms that can allow images that are located on one device to be transferred to another device. Different configurations of peripheral shared image devices and/or capturing shared image devices may be combined using networking techniques. Different embodiments of the sharing mechanisms can be included in such embodiments of the shared image network 100 as telecommunication systems, computer systems, audio systems, video systems, teleconferencing systems, driving or aircraft simulators, and/or hybrid combinations of certain ones of these systems. The embodiments of the shared image devices as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method, comprising:
   receiving at least one motivating event at least partially at a processing shared image device;
   transmitting at least one designated attribute at least partially from the processing shared image device, wherein the at least one designated attribute can be effected at least partially in response to the receiving the at least one motivating event at least partially at the processing shared image device;
   obtaining an obtained shared image at the processing shared image device that is obtained in accordance with the at least one motivating event, and is obtained at least partially in response to the transmitting the at least one designated attribute; and
   processing the obtained shared image to derive an at least one processed shared image at least partially at the processing shared image device, wherein the receiving at least one motivating event at least partially at the processing shared image device comprises: receiving an indication of a camera shutter closing from an at least one shared image device.

2. The method of claim 1, wherein the receiving at least one motivating event at least partially at the processing shared image device comprises:
   obtaining at least one shared image by at least one image obtaining shared image device.

3. The method of claim 1, wherein the receiving at least one motivating event at least partially at the processing shared image device comprises:
   receiving an at least one image processing goal at least partially at the processing shared image device.

4. The method of claim 1, wherein the receiving at least one motivating event at least partially at the processing shared image device comprises:
   receiving an indication of capturing images from an at least one shared image device.

5. The method of claim 1, wherein the transmitting at least one designated attribute at least partially from the processing shared image device further comprises:
   transmitting at least one format designated attribute at least partially from the processing shared image device.

6. The method of claim 1, wherein the transmitting at least one designated attribute at least partially from the processing shared image device further comprises:
   transmitting at least one event designated attribute at least partially from the processing shared image device.

7. The method of claim 1, wherein the transmitting at least one designated attribute at least partially from the processing shared image device further comprises:
   transmitting at least one cost designated attribute at least partially from the processing shared image device.

8. The method of claim 1, wherein the transmitting at least one designated attribute at least partially from the processing shared image device further comprises:
   transmitting at least one creator designated attribute at least partially from the processing shared image device.

9. The method of claim 1, wherein the transmitting at least one designated attribute at least partially from the processing shared image device further comprises:
   transmitting at least one feature designated attribute at least partially from the processing shared image device.

10. The method of claim 1, wherein the transmitting at least one designated attribute at least partially from the processing shared image device further comprises:
    transmitting at least one use designated attribute at least partially from the processing shared image device.

11. The method of claim 1, wherein the transmitting at least one designated attribute at least partially from the processing shared image device further comprises:
    transmitting at least one attachment designated attribute at least partially from the processing shared image device.

12. The method of claim 1, wherein the transmitting at least one designated attribute at least partially from the processing shared image device further comprises:
    transmitting at least one promotion designated attribute at least partially from the processing shared image device.

13. The method of claim 1, wherein the obtaining an obtained shared image at the processing shared image device that is obtained in accordance with the at least one motivating event, and is obtained at least partially in response to the transmitting the at least one designated attribute further comprises:
    obtaining the obtained shared image that has been captured at least partially in response to the receiving the at least one motivating event at least partially at the processing shared image device.

14. The method of claim 1, wherein the obtaining an obtained shared image at the processing shared image device that is obtained in accordance with the at least one motivating event, and is obtained at least partially in response to the transmitting the at least one designated attribute further comprises:
    obtaining the obtained shared image that has been captured by a capturing shared image device at least partially in response to the receiving the at least one motivating event at least partially at the processing shared image device.

15. The method of claim 1, wherein the obtaining an obtained shared image at the processing shared image device that is obtained in accordance with the at least one motivating event, and is obtained at least partially in response to the transmitting the at least one designated attribute further comprises:
    obtaining the obtained shared image that has been retrieved at least partially in response to the receiving the at least one motivating event at least partially at the processing shared image device.

16. The method of claim 1, wherein the processing the obtained shared image to derive an at least one processed shared image at least partially at the processing shared image device further comprises:

receiving an automated request from at least part of a computer-based program at least partially from the processing shared image device.

17. The method of claim 1, further comprising:
receiving a request at the processing shared image device to share the at least one processed shared image with at least one shared image device.

18. The method of claim 1, further comprising:
associating at least one image obtaining shared image device with the processing shared image device, wherein the at least one image obtaining shared image device can share the at least one processed shared image with the processing shared image device.

19. The method of claim 1, further comprising:
defining a beginning or an ending of a sharing session at least partially based on a timing of an event.

20. The method of claim 1, further comprising:
establishing a membership of the processing shared image device in a sharing session.

21. The method of claim 1, further comprising:
establishing a sharing region at least partially using the processing shared image device.

22. The method of claim 1, further comprising:
overlapping a first field of view obtained at least partially from the processing shared image device with a second field of view obtained at least partially from at least one image obtaining shared image device.

23. The method of claim, wherein the receiving at least one motivating event at least partially at the processing shared image device comprises:
receiving an indication of retrieving images from an at least one shared image device.

24. The method of claim 1, wherein the receiving at least one motivating event at least partially at the processing shared image device further comprises:
receiving an at least one image at least partially at the processing shared image device.

25. The method of claim 1, wherein the receiving at least one motivating event at least partially at the processing shared image device further comprises:
receiving both an at least one image processing goal and an at least one image at least partially at the processing shared image device.

26. The method of claim 1, wherein the transmitting at least one designated attribute at least partially from the processing shared image device further comprises:
transmitting a plurality of the at least one designated attribute at least partially from the processing shared image device.

27. The method of claim 1, wherein the transmitting at least one designated attribute at least partially from the processing shared image device further comprises:
transmitting at least one pixel-depth designated attribute at least partially from the processing shared image device.

28. The method of claim 1, wherein the transmitting at least one designated attribute at least partially from the processing shared image device further comprises:
transmitting at least one subject designated attribute at least partially from the processing shared image device.

29. The method of claim 1, wherein the transmitting at least one designated attribute at least partially from the processing shared image device further comprises:
transmitting at least one capture-region designated attribute at least partially from the processing shared image device.

30. The method of claim 1, wherein the transmitting at least one designated attribute at least partially from the processing shared image device further comprises:
transmitting at least one rights designated attribute at least partially from the processing shared image device.

31. The method of claim 1, wherein the transmitting at least one designated attribute at least partially from the processing shared image device further comprises:
transmitting at least one owner designated attribute at least partially from the processing shared image device.

32. The method of claim 1, wherein the transmitting at least one designated attribute at least partially from the processing shared image device further comprises:
transmitting at least one size designated attribute at least partially from the processing shared image device.

33. The method of claim 1, wherein the transmitting at least one designated attribute at least partially from the processing shared image device further comprises:
transmitting at least one audio designated attribute at least partially from the processing shared image device.

34. The method of claim 1, wherein the transmitting at least one designated attribute at least partially from the processing shared image device further comprises:
visibly pointing at least partially using a visible pointing device to reference at least a portion of a user interface at least partially within the processing shared image device.

35. The method of claim 1, wherein the transmitting at least one designated attribute at least partially from the processing shared image device further comprises:
visibly pointing at least partially using a visible pointing device to reference at least a portion of a user interface at least partially within at least one image obtaining shared image device.

36. The method of claim 1, wherein the processing the obtained shared image to derive an at least one processed shared image at least partially at the processing shared image device further comprises:
receiving a user selection information.

37. The method of claim 1, further comprising:
obtaining at least one shared image at least partially using at least one image obtaining shared image device.

38. The method of claim 1, further comprising:
synchronizing the processing shared image device with a sharing session at least partially during the sharing session.

39. The method of claim 1, further comprising:
synchronizing the processing shared image device with a sharing session at least partially following the sharing session.

40. The method of claim 1, further comprising:
defining an ending of a sharing session at least partially based on when a subscriber's time runs out.

41. The method of claim 1, further comprising:
sharing the at least one processed shared image at least partially at the processing shared image device.

* * * * *

UNITED STATES PATENT AND TRADEMARK OFFICE
CERTIFICATE OF CORRECTION

PATENT NO.        : 9,082,456 B2
APPLICATION NO.   : 11/190516
DATED             : July 14, 2015
INVENTOR(S)       : Edward K. Y. Jung et al.

Page 1 of 1

It is certified that error appears in the above-identified patent and that said Letters Patent is hereby corrected as shown below:

In the claims

Column 77, Line 28, Claim 23: claim number missing and should read -- The method of claim 1, wherein the --

Signed and Sealed this
Eighth Day of December, 2015

Michelle K. Lee
*Director of the United States Patent and Trademark Office*